United States Patent
Ishii

(10) Patent No.: US 9,578,564 B2
(45) Date of Patent: Feb. 21, 2017

(54) METHOD AND APPARATUS AT THE PHYSICAL AND LINK LAYER FOR MOBILE COMMUNICATIONS

(71) Applicant: NTT DOCOMO, INC., Tokyo (JP)

(72) Inventor: Hiroyuki Ishii, Palo Alto, CA (US)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/872,924

(22) Filed: Oct. 1, 2015

(65) Prior Publication Data

US 2016/0057670 A1 Feb. 25, 2016

Related U.S. Application Data

(62) Division of application No. 14/344,570, filed as application No. PCT/US2012/054912 on Sep. 12, 2012, now Pat. No. 9,226,206.

(Continued)

(51) Int. Cl.
*H04B 1/00* (2006.01)
*H04W 36/04* (2009.01)
(Continued)

(52) U.S. Cl.
CPC ............ *H04W 36/04* (2013.01); *H04W 8/082* (2013.01); *H04W 16/14* (2013.01); *H04W 36/22* (2013.01);
(Continued)

(58) Field of Classification Search
CPC .. H04W 84/045; H04W 92/02; H04W 76/025; H04W 88/08; H04W 92/20; H04W 76/02; H04W 16/32
(Continued)

(56) References Cited

U.S. PATENT DOCUMENTS 6,829,479 B1 12/2004 Chang et al.
8,493,887 B2 7/2013 Palanki et al.
(Continued)

FOREIGN PATENT DOCUMENTS

JP 2009-218638 A 9/2009
JP 2011-523329 A 8/2011
(Continued)

OTHER PUBLICATIONS

3GPP TSG-RAN WG4 Meeting #58, R4-111298, Taipei, Taiwan, Feb. 21-25, 2011, "Handling of 3.4-3.6 GHz FDD Duplex GAP," 4 pages.
(Continued)

*Primary Examiner* — Ronald Eisner
(74) *Attorney, Agent, or Firm* — Osha Liang LLP

(57) ABSTRACT

In a cellular telecommunications network, a mobile communication system to offload data traffic from base stations to small-node devices, includes a radio base station, a plurality of small-node devices, a macro-base-station-to-the-small-node-device (BS2D) communication section configured to receive a first control-plane message from the radio base station over a BS2D communication link, a small-node-device-to-user-equipment (D2UE) communication section configured to transmit user-plane data to a user equipment over a wireless D2UE communication link established responsive to the first control-plane message, and a center small-node device. The center small-node device includes a buffer section, a backhaul communication section configured to receive the user-plane traffic data from a server over a backhaul link, and is configured to manage D2UE connections between the plurality of small-node devices and the mobile station, buffer data to be transmitted in downlink and uplink for the plurality of small-node devices, and conduct a link adaptation for the D2UE connections.

3 Claims, 49 Drawing Sheets

Related U.S. Application Data

(60) Provisional application No. 61/616,309, filed on Mar. 27, 2012, provisional application No. 61/607,901, filed on Mar. 7, 2012, provisional application No. 61/533,382, filed on Sep. 12, 2011.

(51) Int. Cl.
*H04W 8/08* (2009.01)
*H04W 76/04* (2009.01)
*H04W 16/14* (2009.01)
*H04W 76/02* (2009.01)
*H04W 76/06* (2009.01)
*H04W 36/22* (2009.01)
*H04W 36/38* (2009.01)
*H04W 84/04* (2009.01)

(52) U.S. Cl.
CPC ............. *H04W 36/38* (2013.01); *H04W 76/02* (2013.01); *H04W 76/04* (2013.01); *H04W 76/06* (2013.01); *H04W 84/045* (2013.01)

(58) Field of Classification Search
USPC ...................................................... 455/7–25
See application file for complete search history.

(56) References Cited

U.S. PATENT DOCUMENTS

| | | |
|---|---|---|
| 2002/0089949 A1 | 7/2002 | Bjelland et al. |
| 2006/0172742 A1 | 8/2006 | Chou et al. |
| 2009/0059790 A1 | 3/2009 | Calvert et al. |
| 2009/0232019 A1* | 9/2009 | Gupta .................. H04L 12/287 370/252 |
| 2009/0310554 A1 | 12/2009 | Sun et al. |
| 2009/0310561 A1 | 12/2009 | Grob et al. |
| 2010/0056160 A1 | 3/2010 | Kim et al. |
| 2010/0128697 A1 | 5/2010 | Choi-Grogan |
| 2010/0135251 A1 | 6/2010 | Sambhwani et al. |
| 2010/0149347 A1 | 6/2010 | Kim et al. |
| 2010/0265867 A1 | 10/2010 | Becker et al. |
| 2010/0322146 A1 | 12/2010 | Liu et al. |
| 2010/0323745 A1 | 12/2010 | Chen et al. |
| 2011/0003597 A1 | 1/2011 | Budic et al. |
| 2011/0019634 A1 | 1/2011 | Fujii et al. |
| 2011/0044244 A1 | 2/2011 | Etemad |
| 2011/0075557 A1 | 3/2011 | Chowdhury et al. |
| 2011/0075675 A1 | 3/2011 | Koodli et al. |
| 2011/0076985 A1 | 3/2011 | Chami et al. |
| 2011/0188481 A1 | 8/2011 | Damnjanovic et al. |
| 2011/0237231 A1 | 9/2011 | Horneman et al. |
| 2012/0015660 A1 | 1/2012 | Kawaguchi |
| 2014/0079026 A1 | 3/2014 | Dimou et al. |
| 2014/0161055 A1 | 6/2014 | Chitrapu et al. |

FOREIGN PATENT DOCUMENTS

| | | |
|---|---|---|
| WO | 2009/151871 A2 | 12/2009 |
| WO | 2010/002100 A2 | 1/2010 |
| WO | 2010/027308 A1 | 3/2010 |
| WO | 2011/041623 A1 | 4/2011 |
| WO | 2012/134567 A1 | 10/2012 |
| WO | 2012/166975 A1 | 12/2012 |
| WO | 2013/055430 A2 | 4/2013 |

OTHER PUBLICATIONS

International Search Report issued in PCT/US2012/054856, mailed on Feb. 11, 2013 (4 pages).
Written Opinion issued in PCT/US2012/054856, mailed on Feb. 11, 2013 (8 pages).
Extended European Search Report issued in corresponding EP Application No. 12831801.1, mailed on Jun. 17, 2015 (8 pages).
3GPP TR 23.829 V10.0.0, Mar. 2011, "Local IP Access and Selected IP Traffic Offload," 43 pages.
International Search Report issued in PCT/US2012/054912, mailed on Jan. 11, 2013 (3 pages).
Written Opinion issued in PCT/US2012/054912, mailed on Jan. 11, 2013 (11 pages).
Extended European Search Report issued in corresponding EP Application No. 12831966.2, mailed on Jun. 15, 2015 (9 pages).
International Search Report for corresponding International Application No. PCT/US2012/040279, mailed Aug. 27, 2012 (2 pages).
Written Opinion for corresponding International Application No. PCT/US2012/040279, mailed Aug. 27, 2012 (12 pages).
Extended European Search Report in counterpart European Application No. 12 79 451 issued Apr. 22, 2015 (9 pages).
International Search Report for corresponding International Application No. PCT/US2012/040288, mailed Sep. 7, 2012 (2 pages).
Written Opinion for corresponding International Application No. PCT/US2012/040288, mailed Sep. 7, 2012 (6 pages).
Extended European Search Report in counterpart European Application No. 12 79 2917 issued Apr. 29, 2015 (9 pages).
LG Electronics Inc.; "Measurement Restriction for Macro-Pico Scenario"; 3GPP TSG-RAN2 Meeting #72, R2-106579; Jacksonville, Florida; Nov. 5-19, 2010 (3 pages).
3GPP TS 36.331 V10.1.0, Mar. 2011, "Protocol specification," (290 pages).
3GPP TS 36.101 V10.2.0, Mar. 2011, "User Equipment (UE) radio transmission and reception," (225 pages).
3GPP TS 36.211 V10.1.0, Mar. 2011, "Physical Channels and Modulation," (103 pages).
3GPP TS 36.213 V11.1.0, Dec. 2012, "Physical layer procedures," (160 pages).
Extended European Seach Report in counterpart European Application No. 12 83 1966.2 issued Oct. 12, 2015 (24 pages).
3GPP TS 25.331 v10.4.0; "3rd Generation Partnership Project; Technical Specification Group Radio Access Network; Radio Resource Control (RRC); Protocol specification (Release 10)"; Jun. 2011 (1879 pages).
Notice of Reasons for Refusal in counterpart Japanese Patent Application No. 2014-530752 issued on Aug. 9, 2016 (9 pages).
Final Office Action issued in corresponding U.S. Appl. No. 14/344,492, mailed on Jan. 22, 2016 (26 pages).
Final Office Action issued in corresponding U.S. Appl. No. 14/118,473, mailed on Feb. 1, 2016 (67 pages).

* cited by examiner

METHOD AND APPARATUS AT THE PHYSICAL AND LINK LAYER FOR MOBILE COMMUNICATIONS

CROSS-REFERENCE TO RELATED APPLICATIONS

This application is a division of U.S. patent application Ser. No. 14/344,570, filed on Mar. 12, 2014, which is a National Stage of International Application No. PCT/US2012/054912, filed on Sep. 12, 2012, which claims priority to U.S. Provisional Application No. 61/616,309 filed on Mar. 27, 2012, U.S. Provisional Application No. 61/607,901 filed on Mar. 7, 2012, and U.S. Provisional Application 61/533,382 filed on Sep. 12, 2011. The contents of the priority applications are incorporated by reference in their entirety.

BACKGROUND OF THE DISCLOSURE

Technical Field of the Disclosure

One or more embodiments of the present disclosure relate to the operation of the Physical and Link Layer design of systems such as that of 3GPP's Long Term Evolution (LTE). Specifically, the one or more embodiments focus on the Physical (PHY) and Link Layer design of systems such as 3GPP's Long Term Evolution (LIE). A design according to one or more of the embodiments uses a hybrid Device to UE (D2UE) and Macro to UE (Macro2UE) architecture wherein some functions are maintained by the Macro2UE link and others are supported by the D2UE link.

Background Art

One possible way to increase capacity in a wireless network is to increase the density (number of devices per unit area) of deployed base-stations or remote antenna units. Hereinafter, such deployed base station or remote antenna unit is called "small cell unit". If the density of the small-cell units increases, the cell capacity increases due to frequency reuse effects. However, there are some difficulties that come with increasing the deployment density, especially if such small cell units must be able to operate as conventional base stations on their own.

For example, as the deployment density increases, the number of handovers increases because the user equipment changes the serving unit (base station) frequently. As a result, quality of connectivity/mobility performance is expected to be degraded.

One possible way to improve the connectivity and mobility is carrier aggregation. That is, conventional carrier aggregation operations of the Macro base station and such small cell units can achieve high-quality interworking, because the Macro2UE link can be maintained while UE communicates with small-cell units. As a result, network operators can achieve the same quality of connectivity/mobility as the conventional Macro network.

However, the conventional carrier aggregation operations need to be operated under the single Macro base station. That is, such small-cell units have to be remote radio heads or remote antennas which are perfectly controlled by the Macro base station, i.e. cells wherein small-cell units provide radio communication services must belong to the Macro base station. From a user data point of view, multiple component carriers of the conventional carrier aggregation operations are not visible to the packet data convergence protocol (PDCP) and radio link control (RLC) layers, and therefore the Macro base station handles the PDCP/RLC operations for the small-cell units in addition to the Macro cell base station itself. From a physical layer/MAC layer point of view, some cross-carrier operations need to be supported in the conventional carrier aggregation operations.

For example, HARQ Acknowledge information for a secondary cell sometimes needs to be transmitted in a primary cell. Furthermore, physical control channel transmitted in a primary cell sometimes notifies the user equipment of the downlink control information for a secondary cell and vice versa in cross-carrier scheduling. That is, very tight inter-working among component carriers is required in the conventional carrier aggregation, and so the conventional carrier aggregation operations need to be operated under the single base station (the single baseband processing equipment). In other words, the conventional carrier aggregation operations between the Macro base station and the conventional Pico/Femto base station are impossible, because the Pico/Femto base station is a node different from the Macro base station. In the scenarios where remote radio heads or remote antennas which are perfectly controlled by the Macro base station are utilized, signal processing complexity of the Macro base station increases as the number of remote radio heads or remote antennas increases, because centralized control is conducted by the Macro base station. Such increasing complexity results in high cost. As a result, it is difficult to easily increase the number of the small-cell units due to high complexity and cost.

In general, the above operations, where remote radio heads or remote antennas which are perfectly controlled by the Macro base station, are called "carrier aggregation of macro cells and remote radio head cells". The operations are described in Annex J.1 of 36.300, V a.4.0 in 3GPP specification. The operations are called "RRH CA operation" hereinafter.

The RRH CA operation has the some drawbacks. FIG. 26 illustrates a system architecture for conventional remote radio head (RRH) CA operations. In this architecture, a 2 GHz carrier (Macro2UE link) provides macro coverage and remote radio heads (RRHs) are used to improve throughput at hot spots in a 3.5 GHz carrier (RRH2UE link). Mobility is performed based on the 2 GHz carrier. In this system architecture, one common RLC layer and PDCP layer operation is conducted at Macro base stations (the base station 200A and the base station 200B) for both Macro2UE link and RRH2UE link. Very tight inter-working between Macro2UE link and RRH2UE link is also conducted from a physical layer/MAC layer point of view. This is because the remote radio head is an amplifier, and other operations including, but not limited to, coding/decoding in physical layer and MAC layer operations are conducted in the base station.

As shown in FIG. 27, however, in case that the user equipment 100 is located on the outside of the base station 200A coverage area, the user equipment 100 cannot be served by the carrier aggregation of the 2 GHz carrier and the 3.5 GHz carrier. Especially in the case where a new-type carrier, where common signals such as CRS, PSS/SSS and broadcast signals are not transmitted, is utilized in the 3.5 GHz carrier, the user equipment 100 cannot be served neither by the base station 200A, nor by the remote radio head 500A-4, because in general the user equipment 100 cannot communicate with the remote radio head 500A-4, which does not transmit such common signals, without valid connections with the base station 200A. It is noted that the new type carrier which does not contain some of common signals or broadcast signals may be called "new carrier" or "additional carrier type" in the standardization.

The user equipment 100 can communicate with the base station 200B instead of the base station 200A in FIG. 27, but it cannot be served by the carrier aggregation of the 2 GHz carrier served by the base station 200B and the 3.5 GHz carrier served by the remote radio head 500A-4. This is because the remote radio head 500A-4 does not belong to the base station 200B, and the remote radio head 500A-4 and the base station 200B cannot have a single RLC layer and PDCP layer operation. Furthermore, the remote radio head 500A-4 and the base station 200B cannot have very tight inter-working from a physical layer and MAC layer point of view.

It clearly indicates that the conventional RRH CA operation may be cumbersome from a deployment point of view, because network operators need to align the macro cell coverage area with the RRH coverage area very accurately.

In general, the base station transmits control signals such as broadcast signals, and the user equipment communicates with the base station after receiving the control signals. That is, the user equipment cannot transmit any signals before receiving the control signals. Therefore the user equipment cannot start communications because the user equipment cannot camp on the cell, where the base station provides communication services, in idle state. That is, the user equipment cannot conduct random access procedures which are required for the initiation of the communications. This is called the principle of "transmit after receive". This concept can prevent the user equipment from transmitting signals without any control of the network, and therefore unnecessary interference can be avoided.

However, control signals such as broadcast signals sometimes cause some backward compatibility issues. For example, network signaling, which is called "Additional-SpectrumEmission," is defined in TS 36.331 and in Section 6.2.4 of TS 36.101 in 3GPP specification. When the user equipment receives the network signaling, it must transmit uplink signals in order to meet additional spectrum emission requirements, which is specified in Section 6.2.4 of TS 36.101. Here, if the user equipment receives unknown network signaling in the control signals, it cannot communicate with the base station, because the user equipment may violate regulatory requirements which are related to the unknown network signaling. Especially in case that the user equipment is in idle state, the user equipment cannot camp on the cell which transmits unknown network signaling and cannot connect to the network. It means that new network signaling cannot be added after the user equipment is distributed in the market. In other words, if new network signaling is added after the user equipment is distributed in the market, a backward compatibility issue, in which the user equipment cannot communicate with the base station after that, happens.

SUMMARY OF CLAIMED SUBJECT MATTER

In a cellular telecommunications network, a mobile communication system to offload data traffic from radio base stations to small-node devices may include at least one macro-base-station-to-the-small-node-device (BS2D) communication section in communication with a radio base station through a first link, a plurality of small-node-device-to-user-equipment (D2UE) communication sections in wireless communication with a mobile station through a second link, a buffer section to buffer data, and a backhaul communication section in communication with a server through a third link. The BS2D communication section may receive, through the first link, a first control signal from the radio base station to establish the second link. The plurality of D2UE communication sections may establish the second link upon receiving the first control signal, where the plurality of D2UE communication sections may receive a first data through the second link which is sent by the mobile station to the server. The backhaul communication section may transmit the first data to the server through the third link, where the backhaul communication section may receive a second data which is sent by the server to the mobile station, where the plurality of D2UE communication sections transmit the second data to the mobile station. The buffer section buffers the first data and the second data for the plurality of D2UE communication sections.

A mobile communication system may further include a center small-node device comprising the buffer section and the backhaul communication section, and a plurality of small-node devices configured to communicate with the center small-node device and the mobile station. The center small-node device may be configured to manage D2UE connections between the plurality of small-node devices and the mobile station, and buffer data to be transmitted in downlink and data received in uplink for the plurality of small-node devices. The radio base station may notify the center small-node device of identification numbers of each of the plurality of small-node devices in a small-node device group, and the center small-node device may select one or more of the plurality of small-node devices in the small-node device group for communication with the mobile station, and the selection is made based on the quality of each associated D2UE connection. The buffer section in the center small-node device may include multiple buffer sections; each of the plurality of small-node devices may include one of the plurality of D2UE communication sections. The plurality of small-node devices and the center small-node device may each include a portion of the plurality of D2UE communication sections. The plurality of small-node devices may handle transmitting/receiving data in form of radio frequency signals, and the center small-node device handles baseband processing, and the plurality of small-node devices may handle processing for physical layer, MAC layer and RLC layer, and the center small-node device handles processing for PDCP layer and buffering data. At least one of the plurality of D2UE communication sections may transmit the second data to the mobile station at a time frame, and the first data and the second data may be scrambled by a sequence specific to the mobile station in the second link. Identification numbers of the plurality of D2UE communication sections may be included in the first control signal.

In a cellular telecommunication network, a method to offload data traffic from radio base stations to small-node devices, may include communicating with a radio base station through a first link with at least one macro-base-station-to-the-small-node-device (BS2D) communication section, buffering data with a buffer section, communicating wirelessly with a mobile station through a second link with a plurality of small-node-device-to-user-equipment (D2UE) communication sections, communicating with a server through a third link with a backhaul communication section, and receiving from the radio base station through the first link a first control signal to establish the second link at the BS2D communication section. The method may also include establishing the second link upon receiving the first control signal at the plurality of D2UE communication sections, receiving at the plurality of D2UE communication sections a first data through the second link which is sent by the mobile station to the server, and wherein the backhaul communication section transmit the first data to the server through the third link, receiving at the backhaul communication section a second data which is sent by the server to the mobile station, wherein the plurality of D2UE communication sections transmit the second data to the mobile station, and buffering with the buffer section the first data and the second data for the plurality of D2UE communication sections.

In a cellular telecommunications network, a mobile station to receive offloaded data from multiple small-node devices, may include at least one macro-base-station-to-the-user-equipment (BS2UE) communication section to receive both control-plane data and first user-plane data from a base station over a wireless BS2UE communication link; and a small-node-device-to-the-user-equipment (D2UE) communication section to receive second user-plane data from a server through a plurality of small-node devices using a wireless D2UE communication link, wherein the BS2UE communication section receives a first control-plane message from the base station over the wireless BS2UE communication link, the D2UE communication section establishes the wireless D2UE communication link responsive to the first control-plane message; and the second user-plane data is scrambled by a sequence specific to the mobile station in the wireless D2UE communication link.

In a cellular telecommunications network, a radio base station to control a user equipment (UE) and a plurality of small-node devices, may include a macro-base-station-to-the-UE (BS2UE) communication section exchanges user-plane and first control-plane data with the UE using a wireless BS2UE communication link, a macro-base-station-to-the-small-node-device (BS2D) communication section exchanges second control-plane data with at least one of the plurality of small-node devices using a BS2D communication link; and a D2UE control unit controls an establishment and also a release/reconfiguration/handover of a small-node-device-to-the-UE (D2UE) communication link through a first control-plane data and/or a second control-plane data transmitted to at least one of the UE and the plurality of small-node devices using one of the BS2UE and BS2D communication links, wherein data in the D2UE communication link is scrambled by a sequence specific to a mobile station.

In a cellular telecommunications network, a small-node device to offload data traffic from radio base stations to the small-node device and a center-small-node device, may include a macro-base-station-to-the-small-node-device (BS2D) communication section in communication with a radio base station through a first link, and a small-node-device-to-user-equipment (D2UE) communication section in wireless communication with a mobile station through a second link, wherein the BS2D communication section receives, through the first link, a first control signal from the radio base station to establish the second link, the D2UE communication section establish the second link upon receiving the first control signal, the D2UE communication section receive a first data through the second link which is sent by the mobile station to a server, and wherein the D2UE communication section transmit the first data to the center-small-node device. Further the small-node device may transmit the first data to the server through the third link, wherein the center-small-node device receives a second data through the third link which is sent by the server to the mobile station, and wherein the center-small-node device transmits the second data to the D2UE communication section, the D2UE communication section transmits the second data to the mobile station through the second link, and the center-small-node device buffers the first data and the second data for the D2UE communication section.

In a cellular telecommunications network, a center-small-node device to offload data traffic from radio base stations to a plurality of small-node devices and the center-small-node device, may include a buffer section to buffer data and to communicate with a plurality of small-node devices, and a backhaul communication section in communication with a server through a first link, wherein the plurality of small-node devices communicate with a mobile station through a second link, the plurality of small-node devices receive a first data through the second link which is sent by the mobile station to a server, and wherein the plurality of small-node devices transmit the first data to the buffer section. The backhaul communication section may transmit the first data to the server through the third link, wherein the backhaul communication section receives a second data which is sent by the server to the mobile station, and wherein the buffer section transmits the second data to the plurality of small-node devices. The small-node devices may transmit the second data to the mobile station, and the buffer section buffers the first data and the second data.

In a cellular telecommunications network, a mobile station to receive offloaded data from a small-node device, may include at least one macro-base-station-to-the-user-equipment (BS2UE) communication section to receive both control-plane data and first user-plane data from a base station over a wireless BS2UE communication link, and a small-node-device-to-the-user-equipment (D2UE) communication section to receive second user-plane data from a server through the small-node device using a wireless D2UE communication link, wherein the BS2UE communication section receives a first control-plane message from the base station over the wireless BS2UE communication link. The D2UE communication section may establish the wireless D2UE communication link in response to the first control-plane message, and the D2UE communication section may release the wireless D2UE communication link when the radio link failure of the wireless BS2UE communication link is detected by the BS2D communication section.

In a cellular telecommunications network, a mobile station to receive offloaded data from a small-node device, may include at least one macro-base-station-to-the-user-equipment (BS2UE) communication section to receive both control-plane data and first user-plane data from a base station over a wireless BS2UE communication link, and a small-node-device-to-the-user-equipment (D2UE) communication section to receive second user-plane data from a server through the small-node device using a wireless D2UE communication link. The BS2UE communication section may receive a first control-plane message from the base station over the wireless BS2UE communication link, and the D2UE communication section may establish the D2UE communication link responsive to the first control-plane message. The D2UE communication section may stop transmitting signals in the wireless D2UE communication link when the radio link failure of the wireless BS2UE communication link is detected by the BS2D communication section.

Other aspects and advantages of the invention will be apparent from the following description and the appended claims.

DETAILED DESCRIPTION

Figure 1:
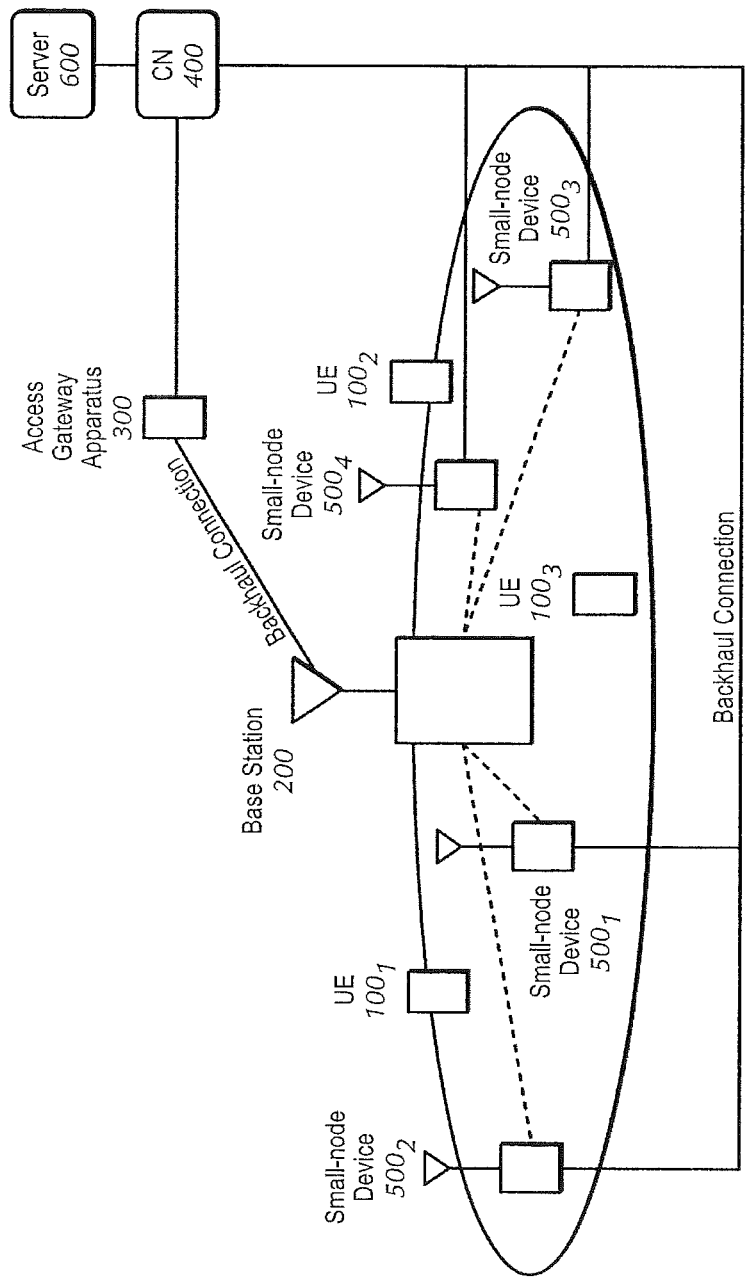
FIG. 1 is an explanatory view showing a communication system according to one or more embodiments of the present disclosure.

In embodiments of the invention, numerous specific details are set forth in order to provide a more thorough understanding of the invention. However, it will be apparent to one with ordinary skill in the art that the invention may be practiced without these specific details. In other instances, well-known features have not been described in detail to avoid obscuring the invention.

One or more embodiments of the present disclosure relate generally to a system concept, and physical and link layer design, to allow for increasing the cell capacity by increasing the small-cell units at low cost/complexity and without the above drawbacks, such as connectivity/mobility issues, issues in carrier aggregation operations, and backward compatibility issues. This invention will be particularly well suited to deployments with large carrier frequencies with very large densities (very small cells).

The system concept is a low cost hybrid D2UE and BS2UE system which allows D2UE connections to be opportunistically used to offload traffic from the Macro System (BS2UE system). Here, Macro corresponds to Macro base station. High density and low cost/complexity are achieved by the deployment of inexpensive "Small Node" devices which supports the D2UE connections. The small-node device may be regarded as a femto/pico base station with which the mobile station (i.e., user equipment) communicates simultaneously with communicating with the macro base station. It is noted that it is impossible for the user equipment to communicate with a femto/pico base station simultaneously with the macro base station using the conventional carrier aggregation operations, because the Pico/Femto base station is a node different from the Macro base station as mentioned above.

Each of these small-node devices conducts offloading for the Macro2UE (BS2UE) system by the D2UE link. The concept of offloading is explained as follows:

Each of these small-node devices has a backhaul connection, which is connected to the Internet or the core network, communicates with a server in the Internet or the core network, and transfers some of data, which should be transferred between UE and a server, utilizing the backhaul link and the D2UE connections. For example, according to one or more embodiments of the present disclosure, best effort packets, such as web browsing data, e-mail data, and the like, are transferred in the D2UE connections, and control signaling, such as RRC messages, NAS messages and the like, or Voice packets are transferred in the BS2UE connections.

The D2UE connections are controlled by the Macro base station. More specifically, basic radio resource control, such as connection establishment, handover, connection release, call admission control and the like, for the D2UE connections are controlled by the Macro base station. Furthermore, the BS2UE connections between UE and the Macro base station are maintained while the D2UE connections are configured.

As a result, high quality interworking between Macro2UE (BS2UE) and D2UE connections are achieved, and data offloading can be conducted in the small-node devices. Because the signal processing for the data in the D2UE connections are conducted by the small-node devices, instead of the Macro base station, the complexity/cost of the Macro base station can be reduced.

Figure 27:
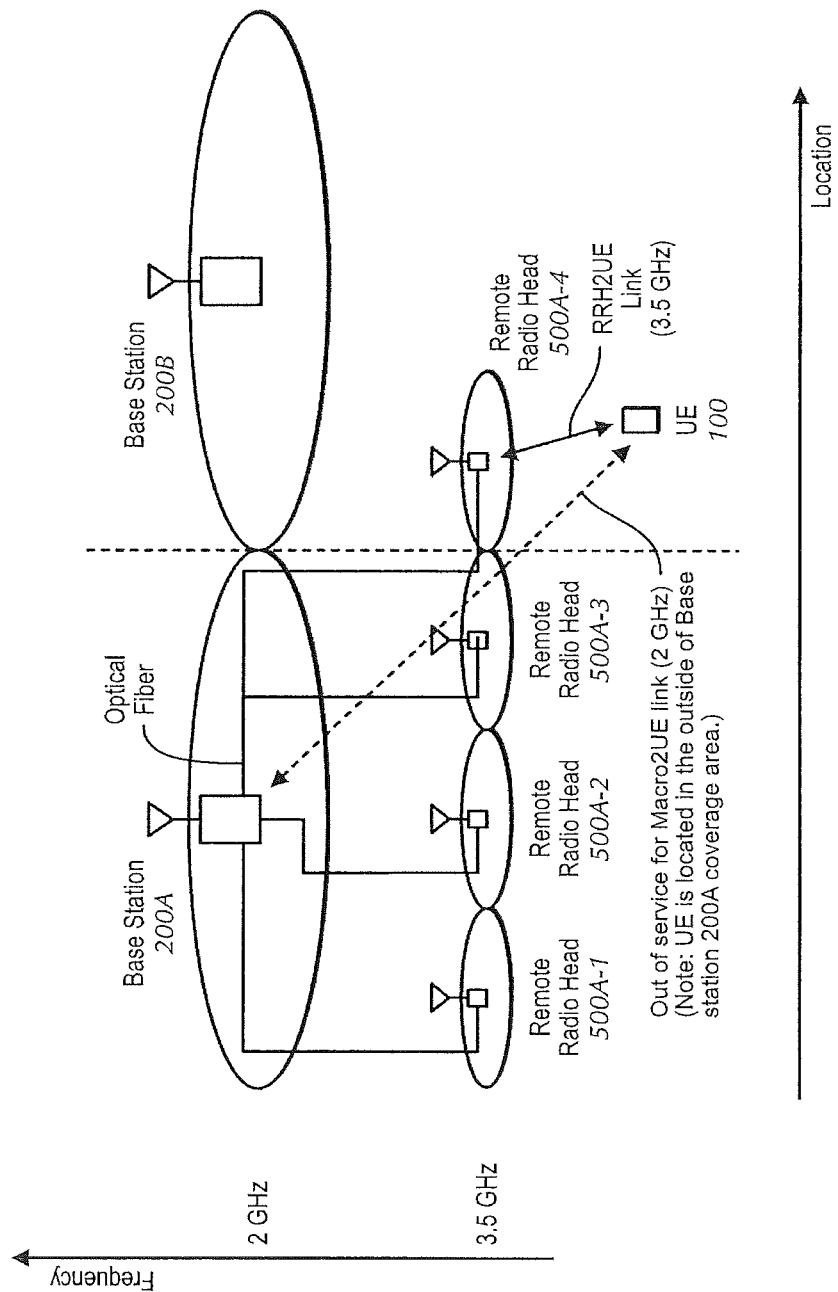
FIG. 27 is an explanatory view showing conventional remote-radio-head based carrier aggregation operations.
Figure 27A:
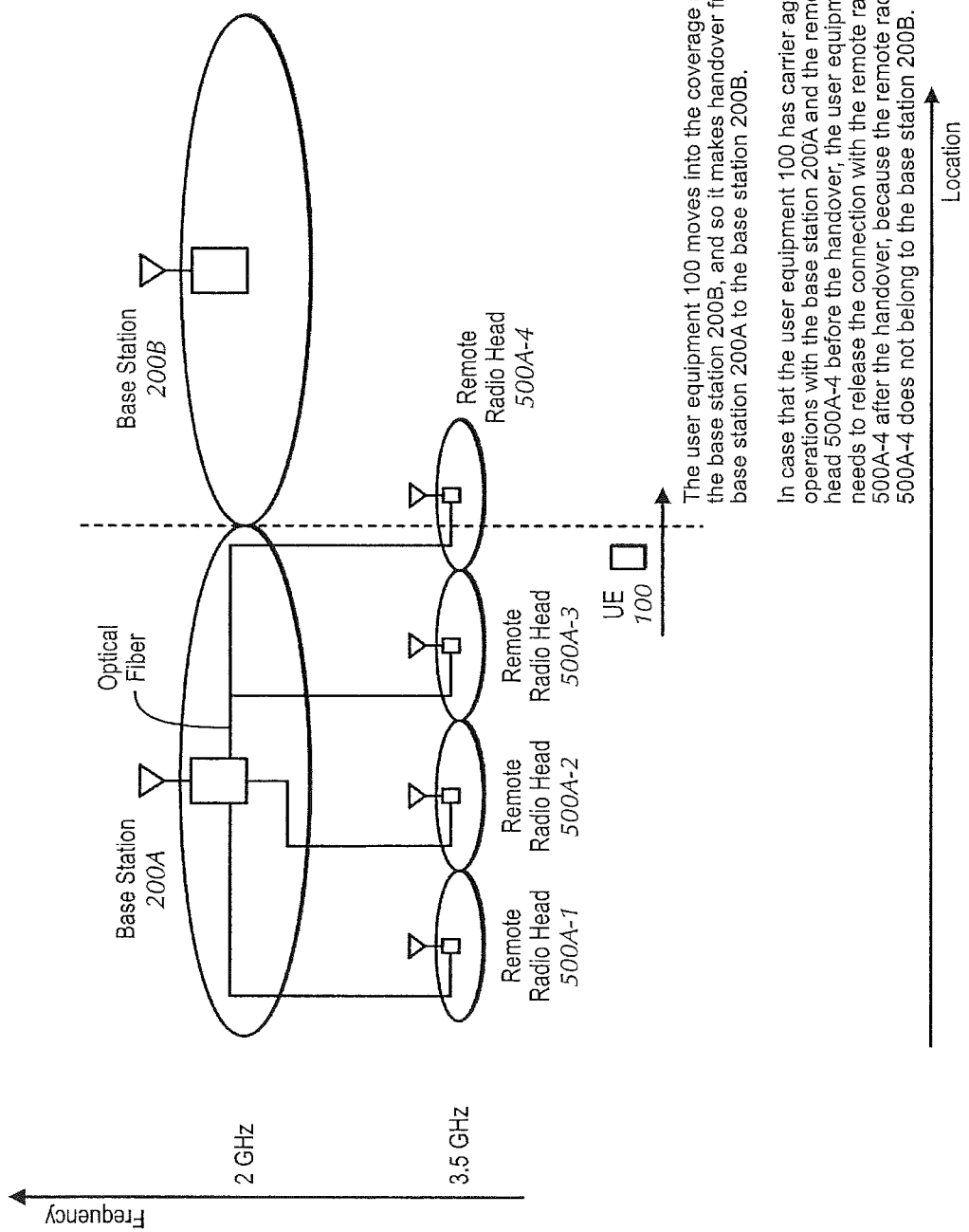
FIG. 27A is an explanatory view showing conventional remote-radio-head based carrier aggregation operations.
Figure 28:
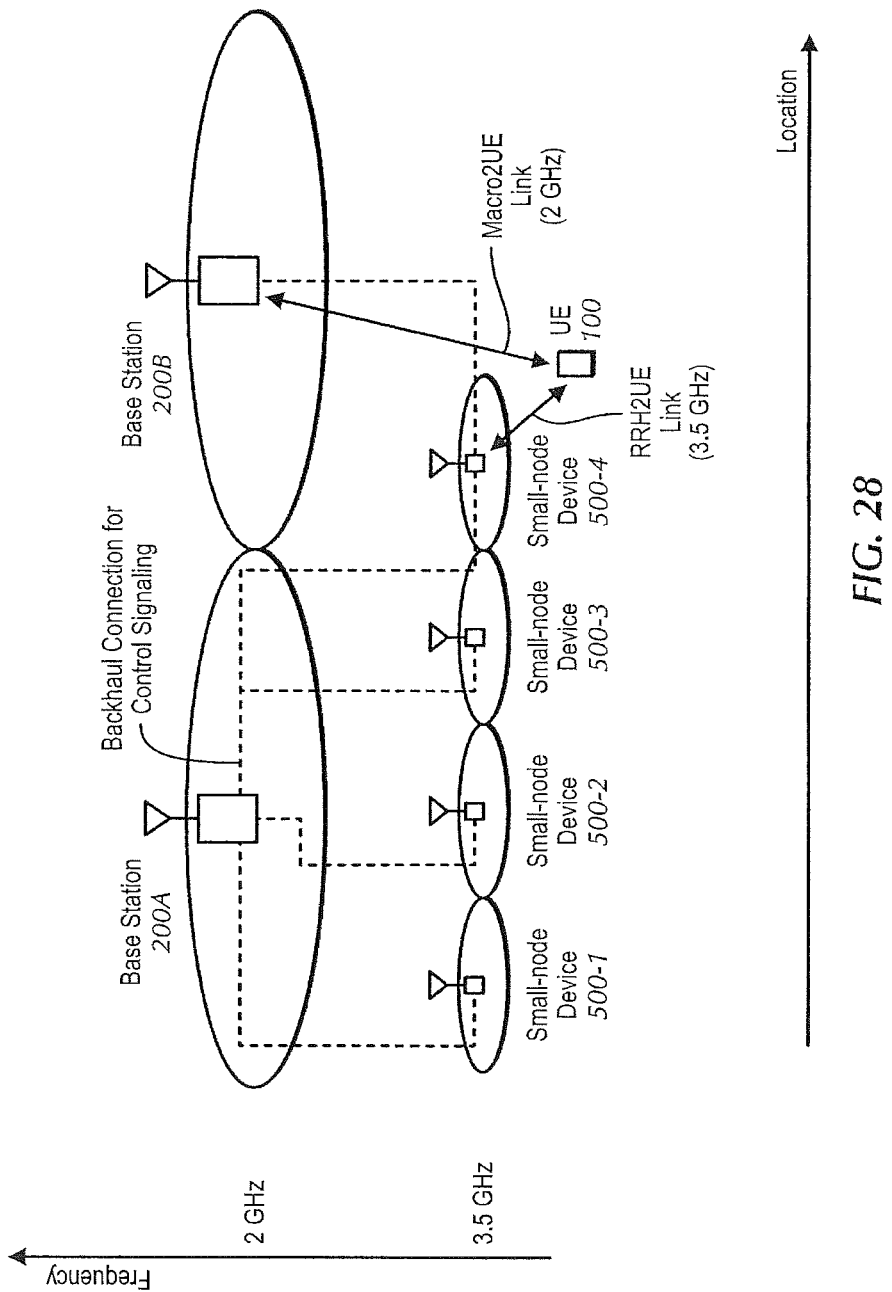
FIG. 28 is an explanatory view showing operations in the hybrid D2UE and BS2UE system according to one or more embodiments of the present disclosure.

Furthermore, the signal processing for the data in the D2UE connections is conducted by the small-node device which is different from the Macro base station, and therefore the scenario illustrated in FIG. 27 does not happen because the user equipment 100 can more flexibly select the small-node device irrespective of the serving Macro base station, as illustrated in FIG. 28. It means that network operators does not have to align the macro cell coverage area with the small-node coverage area very accurately and that efforts for small cell deployment can be reduced in the hybrid D2UE and BS2UE system.

Furthermore, the small-node device does not transmit the control signals such as broadcast signals, because they are transmitted by the macro base station. As a result, the aforementioned backward compatibility issues can be reduced because the macro base station can determine whether or not the user equipment can communicate with the small-node device based on the user equipment information, such as its version or its release.

A feature of one or more embodiments of the invention is that the Hybrid D2UE and Macro2UE (BS2UE) system that offloads Macro Traffic at a low cost and complexity. Another feature is that a small-node device has a backhaul link with a server and a D2UE link with UE, and transfer data, which should be transferred between the server and the UE, via the backhaul link and the D2UE link. Additionally, the D2UE connections are controlled by the Macro. Further, a protocol design for associating a UE to a small-node device and a physical layer design supporting D2UE connections may also be included.

One technical advantage of one or more embodiments of the invention is achieving effectively high deployment density at low cost. High density has benefits in increased capacity and improved channel conditions.

The system is robust. Note, the Macro2UE (BS2UE) connection is maintained by the macro and is always a backup to the D2UE connection. Furthermore, high-quality interworking between the Macro2UE and the D2UE connections is possible because the D2UE connection is controlled by the Macro.

For remote radio heads or remote antennas which are controlled by the Macro base station, as the number of remote radio heads or remote antennas increases, signal processing complexity in the Macro base station increases because the Macro base station needs to handle U-plane data transmitted/received by the remote radio heads or remote antennas. In one or more embodiments of the invention, however, the Macro base station does not have to handle the U-plane data transmitted in the D2UE connection, and the U-plane data handling can be shared by a lot of small-node devices. That is, distributed control can be achieved by the hybrid Macro2UE (BS2UE) and D2UE system. Therefore, the complexity of the Macro base station can be minimized.

The signal processing for the data in the D2UE connection is conducted by the small-node device which is different from the Macro base station. As a result, the user equipment 100 can more flexibly select the small-node device irrespective of the Macro base station. It means that network operators do not have to align the macro cell coverage area with the small-node coverage area very accurately and that efforts for small cell deployment can be reduced in the hybrid D2UE and BS2UE system.

The small-node device does not transmit the control signals such as broadcast signals, because they are transmitted by the macro base station in a macro base station frequency carrier different from the small-node device frequency carrier. As a result, the aforementioned backward compatibility issues can be reduced because the macro base station can determine whether or not the user equipment can communicate with the small-node device based on the user equipment information, such as its version or its release.

Therefore, according to one or more embodiments of the invention, it is possible to provide a radio communication system for enabling high capacity, high connectivity, low costs and low planning complexity.

One option to increase capacity in a wireless network is to increase the density (number of devices per unit area) of deployed base-stations or remote antenna units. Hereinafter, such deployed base station or remote antenna unit is called "small cell unit". If the density of the small-cell units increases, the cell capacity increases due to frequency reuse effects. However, there are some difficulties that come with increasing the deployment density, especially if such small cell units must be able to operate as conventional base stations on their own.

One or more embodiments of the invention relate to a system concept, and physical and link layer design, to allow for increasing the cell capacity by increasing the deployment density at low cost and complexity. It may be particularly well suited to deployments with large carrier frequencies with very large densities (very small cells).

The system concept is a low cost hybrid D2UE and BS2UE system which allows D2UE connections to be opportunistically used to offload traffic from the Macro System. High density and low cost/complexity are achieved by the deployment of small-node devices. Here, the user equipment communicates with the small-node device, while the user equipment simultaneously communicates with the macro base station. That is, the BS2UE connection is maintained while the data offloading is conducted in the D2UE connection. It is also noted that the small-node device is a node different from the macro base station and therefore conventional carrier aggregation operations cannot be conducted between the macro base station and the small-node device.

Each of these small-node devices will provide a D2UE link to UE in order to offload the traffic generated by UE. The concept of offloading is explained as follows:

Each of these small-node devices has a backhaul connection, which is connected to the Internet or the core network, and it communicates with a server in the Internet or the core network, and transfers some of the data, which should be transferred between UE and a server, utilizing the backhaul link and the D2UE connections. For example, according to one or more embodiments of the present disclosure, best effort packets, such as web browsing data, e-mail data, and the like, are transferred in the D2UE connections, and control signaling, such as RRC messages, NAS messages and the like, or Voice packets are transferred in the BS2UE connections.

The D2UE connections are controlled by the Macro base station. More specifically, basic radio resource control, such as connection establishment, handover, connection release, call admission control and the like, for the D2UE connections are controlled by the Macro base station. Furthermore, the BS2UE connections between UE and the Macro base station are maintained while the D2UE connections are configured.

A small-node device supports some sets of functionality in order to support D2UE transfer of data in terms of D2UE link A D2UE connection may be similar to a D2D connection.

The small-node device supports Macro2D (BS2D) link and the D2UE link is controlled by Macro. In terms of UE, UE supports Macro2UE (BS2UE) link and the D2UE link is controlled by Macro as well. Control signaling for the D2UE connections can be transmitted to the UE via the Macro2UE connection, and another control signaling for the D2UE connections can be transmitted to the small-node device via the Macro2D (BS2D) connection.

In addition to the D2UE link, the small-node device supports a backhaul link, such as wired connection to the Internet or the core network. The backhaul link is not limited to the wired connection to the Internet or the core network, but may be wireless connection including WiFi and cellular system, but not limited to, to the Internet or the core network.

To achieve high quality connectivity, more important functions such as RRC connection state control and NAS control are maintained by the Macro2UE (BS2UE) link. Control for radio interface of D2UE connections is conducted by the Macro2D (BS2D) and the Macro2UE (BS2UE). The control may include, but is not limited to, at least one of connection establishment, connection management, connection reconfiguration, handover, connection release, radio resource selection management, power control, link adaptation, call admission control, radio bearer assignment, traffic measurement, radio measurement control, bearer management, security association and so on.

In some embodiments, D2UE and Macro2UE (BS2UE) transmissions can operate in different bands exploiting Carrier Aggregation Functions in terms of Radio Frequency (RF) components. The Carrier Aggregation Functions of RF components means a function in which the transmitter can transmit signals and the receiver can receive signals in more than one carrier simultaneously. D2UE transmissions can operate in one band, and Macro2UE (BS2UE) transmissions can operate in another band, simultaneously in time.

In some embodiments, D2UE and Macro2UE (BS2UE) transmissions can operate in different bands exploiting time division multiplexing functions, wherein the D2UE transmission occur only at selected time and the Macro2UE (BS2UE) transmissions occur at the remaining time.

A radio communication system according to one or more embodiments of the invention will be described with reference to FIGS. 1 and 2.

A radio communication system (mobile communication system) 1000 includes a base station 200, a plurality of user equipment (UE, or referred to as a mobile station) 100 (100₁, 100₂, 100₃, . . . , 100n, n is an integer where n>0), and a plurality of small-node devices 500 (500₁, 500₂, 500₃, . . . , 500m, m is an integer where m>0).

Figure 2:
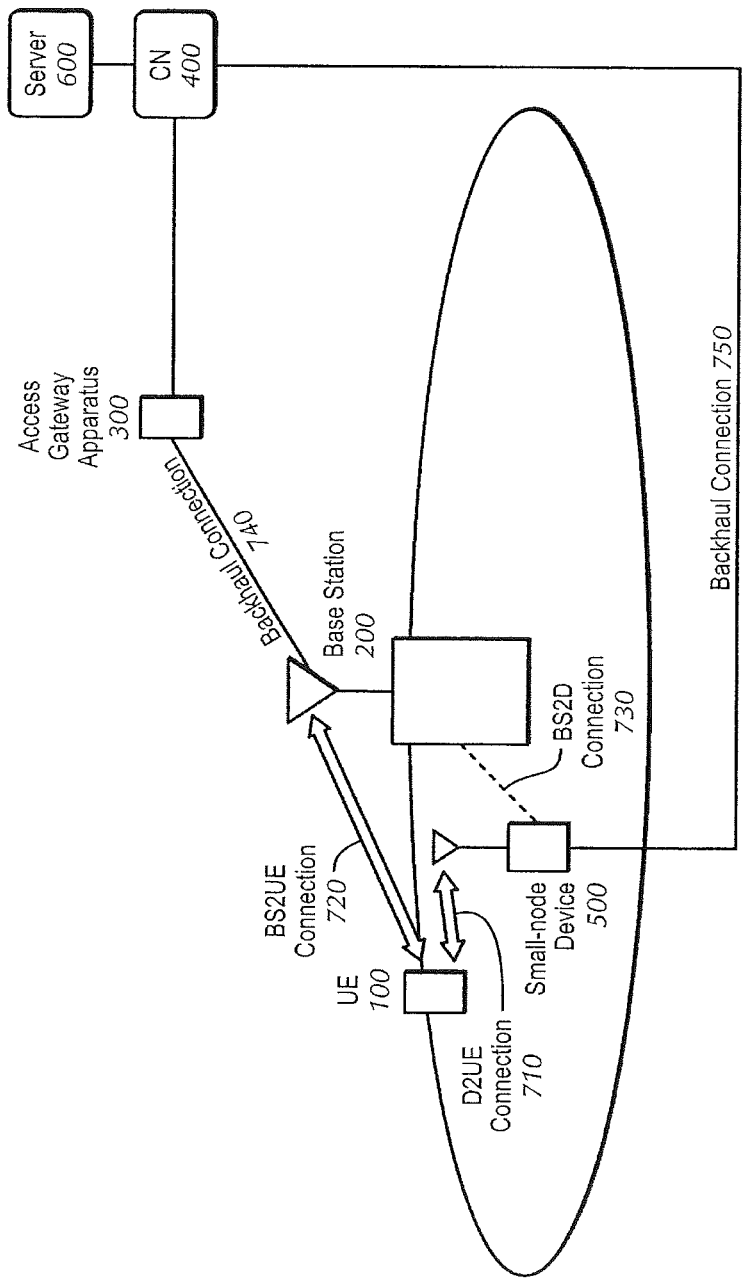
FIG. 2 is an explanatory view showing D2UE connection 710, and BS2UE connection 720, BS2D connection 730, Backhaul connection 740, and Backhaul connection 750 according to one or more embodiments of the present disclosure.

FIG. 2 illustrates a connection between the small-node device 500 and the user equipment 100 (D2UE connection 710), a connection between the base station 200 and the user equipment 100 (BS2UE connection 720), and a connection between the base station 200 and the small-node device 500 (BS2D connection 730). The D2UE connection 710 may be called a D2UE link. The BS2UE connection 720 may be called a BS2UE link. The BS2D connection 730 may be called a BS2D link.

In FIG. 2, backhaul connections are also illustrated, i.e. a backhaul connection between the base station 200 and access gateway apparatus (Backhaul connection 740) and a backhaul connection between the small-node device 500 and core network (CN) 400 (Backhaul connection 750) are shown. As described later, the backhaul connection 750 may be a connection between the small-node device 500 and the base station 200, or a connection between the small-node device 500 and the access gateway apparatus 300, instead of the connection between the small-node device 500 and the core network 400. The backhaul connection 740 may be called Backhaul link 740. The backhaul connection 750 may be called Backhaul link 750.

In the following description, the user equipment 100 ($100_1$, $100_2$, $100_3$, ..., $100n$) has the same configuration, function and state, and is descried as the user equipment 100 below to give an explanation unless otherwise specified.

In the following description, the small-node device 500 ($500_1$, $500_2$, $500_3$, ..., $500m$) has the same configuration, function and state, and is descried as the small-node device 500 below to give an explanation unless otherwise specified.

The base station 200 communicates with the user equipment 100 in a cell 50 utilizing Evolve UTRA and UTRAN (alias: Long Term Evolution (LTE)) in the BS2UE link. It is noted that the communication system between the base station 200 and the user equipment 100 may not be limited to LTE. The communication system may include, but is not limited to, LTE Advanced or WiMAX or WiFi or any other system. The communication system may use Frequency Division Duplex (FDD) or Time Division Duplex (TDD).

The base station 200 is connected to a higher layer station, for example, according to one or more embodiments of the present disclosure, access gateway apparatus 300 in the backhaul connection 740, and the access gateway apparatus 300 is connected to a core network (CN) 400. The access gateway may be also referred to as MME/SGW (Mobility Management Entity/Serving Gateway). A server 600 may also be connected to the core network 400.

The base station 200 is connected to the small-node device 500 in the BS2D connection 730.

The small-node device 500 communicates with the base station 200 in a cell 50 utilizing BS2D connection 730. For example, according to one or more embodiments of the present disclosure, an X2 link defined in 3GPP may apply to the BS2D connection 730. Alternatively, an enhancement of the X2 link may apply to the BS2D connection 730. Alternatively, a wired or wireless link, which is different from the X2 link, may apply to the BS2D connection 730.

Alternatively, a LTE link may apply to the BS2D connection 730. In this case, the small-node device 500 may behave as user equipment when it communicates with the base station 200 and may behave as base station when it communicates with the user equipment 100.

The small-node device 500 communicates with the user equipment 100 utilizing D2UE connection 710. A LTE link or a simplified LTE link applies to the D2UE connection 710. That is, the small-node device 500 communicates with the user equipment 100 utilizing the LTE link or the simplified LTE link in the D2UE connection 710. It is noted that the communication system between the small-node device 500 and the user equipment 100 is not limited to LTE. The communication system may be LTE Advanced or WiMAX or WiFi or any other system. The system may use FDD, or TDD.

The small-node device 500 is connected to the core network (CN) 400 in the backhaul connection 750.

The user equipment 100 communicates with the base station 200 in the BS2UE connection 720 and communicates with the small-node device 500 in the D2UE connection 710.

Figure 3:
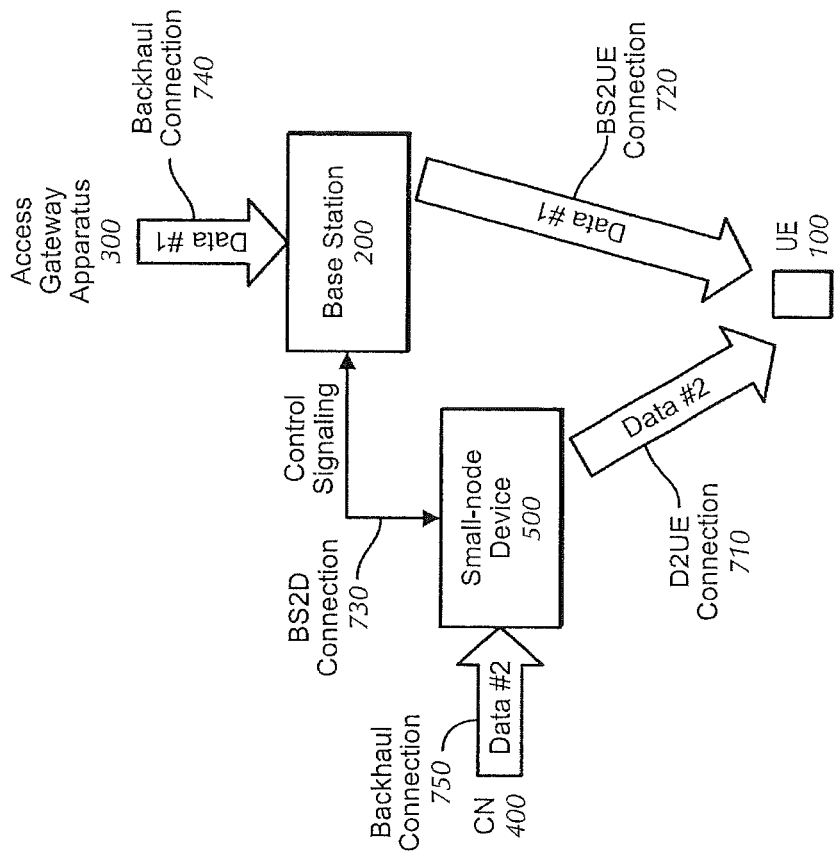
FIG. 3 is an explanatory view showing data flow for D2UE connection 710 and BS2UE connection 720 according to one or more embodiments of the present disclosure.

FIG. 3 illustrates data flow in the radio communication system. Data #1 is transferred from the access gateway apparatus 300 to the base station 200 in the backhaul connection 740 and then transmitted to the user equipment 100 in the BS2UE connection 720 in downlink (DL), and vice versa in uplink (UL). It is the same as data flow in a conventional radio communication system. In addition to Data #1, Data #2 is transferred from the core network 400 to the small-node device 500 in the backhaul connection 750 and then transmitted to the user equipment 100 in the D2UE connection 710 in DL, and vice versa in UL, for offload purpose. Control signaling for D2UE connection 710 is transmitted in the BS2D connection 730 so that the base station 200 can control communication in the D2UE connection 710. Control signaling for D2UE connection 710 is transmitted also in the BS2UE connection 720 so that the base station 200 can control the communication in the D2UE connection 710. The control signaling in the BS2UE connection 720 may be radio resource control (RRC) signaling. More specifically, Data #1 may be RRC signaling, NAS signaling, Voice packets and the like, and Data #2 may be best effort packets, FTP data, Web browsing packets and the like. That is, it may be determined by data bearers what kinds of data are transferred as Data #1 or Data #2. As a result, connectivity can be maintained by the BS2UE connection 720, and simultaneously U-plane data offload can be achieved in the D2UE connection 710.

It is noted that the small-node device 500 is a node different from the base station 200, and therefore the radio communication system cannot use a conventional carrier aggregation. The base station 200 does not have to process coding, decoding, modulation, demodulating and the like for the U-plane data (Data #2), and therefore complexity for the base station 200 can be reduced, compared to the conventional carrier aggregation.

It is also noted that Data #1 is transferred between the small-node device 500 and the core network 400 for offload purpose, and therefore the radio communication system is different from conventional soft handover. Furthermore, the BS2UE connection 720 uses a frequency carrier different from the one utilized in the D2UE connection 710, and therefore the radio communication system is different from conventional soft handover. Furthermore, there is no difference between two links in the conventional soft handover, but the D2UE connection 710 is different from the BS2UE connection 720, in terms of radio bearers conveyed in each connection and connection control handling.

According to the above mentioned hybrid D2UE and BS2UE system, network operators can easily increase the number of small-node devices without increasing signal processing complexity in the base station 200, and as a result they can increase the cell capacity.

Figure 4:
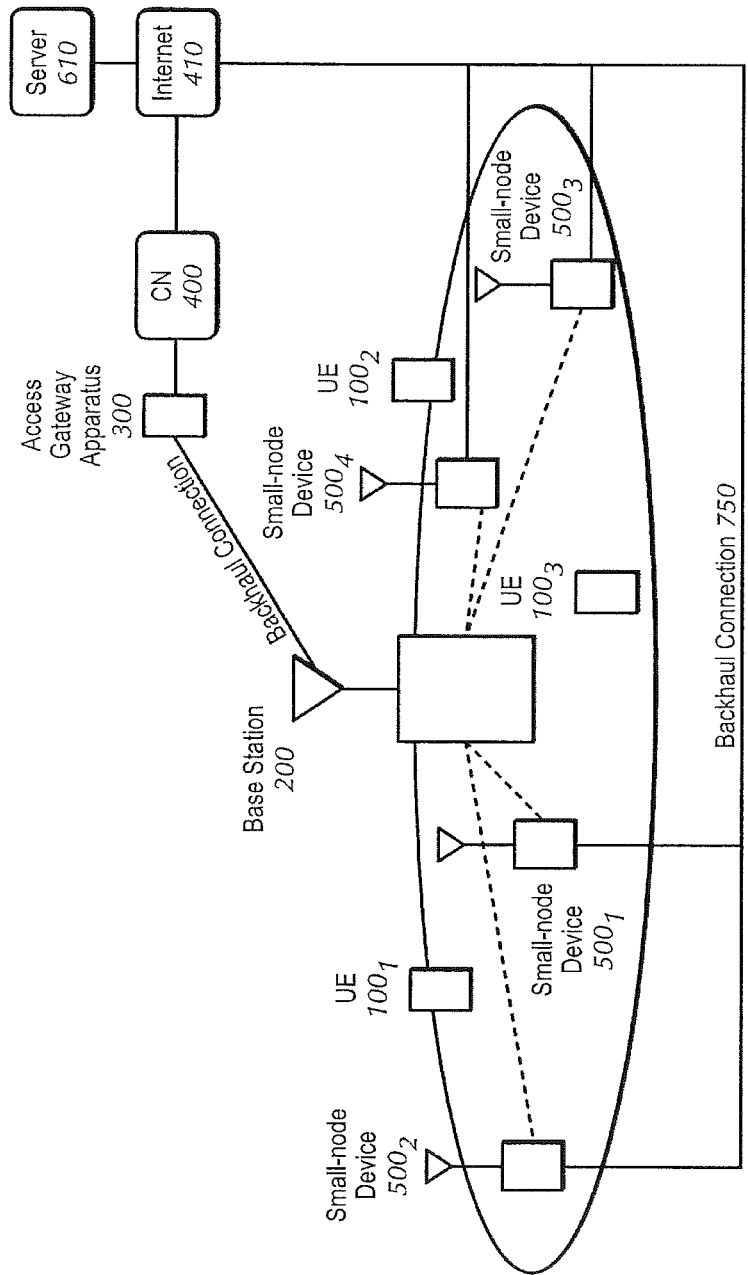
FIG. 4 is an explanatory view showing a communication system according to one or more embodiments of the present disclosure.

There may be various embodiments for system architecture of the radio communication system. For example, according to one or more embodiments of the present disclosure, the small-node device 500 is connected to the core network (CN) 400 in the backhaul connection 750 in FIG. 1, but it may be connected to the Internet 410 in the backhaul connection 750, as shown in FIG. 4. That is, the small-node device 500 may be connected to a server 610 via the Internet 410, instead of being connected to the server 600 via the core network 400. In the radio communication system illustrated in FIG. 4, the core network 400 may be regarded as a network controlled by a network operator. The core network 400 may include MME, S/P-GW, Node for billing system, HLS (database for customers) and the like.

Figure 5:
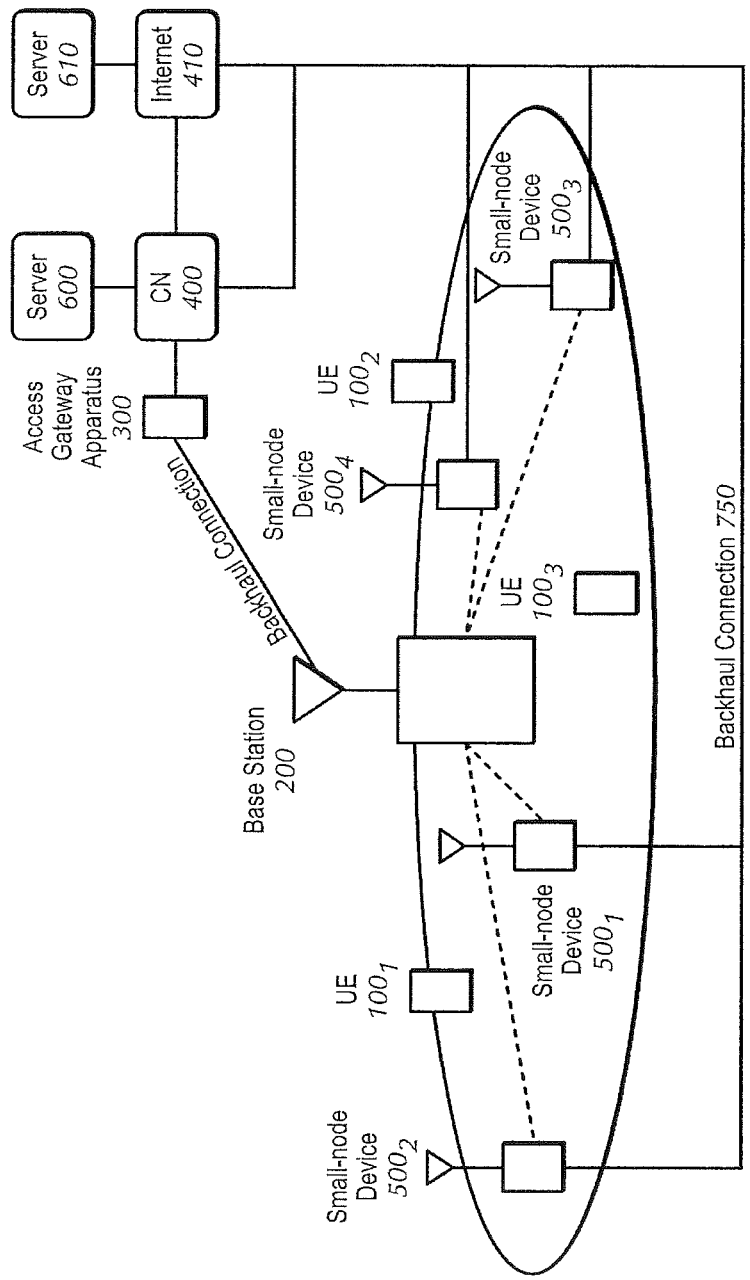
FIG. 5 is an explanatory view showing a communication system according to one or more embodiments of the present disclosure.

Alternatively, as illustrated in FIG. 5, the system may be a mixture of FIG. 1 and FIG. 4. The small-node device 500 may be connected to the server 600 via the core network 400 or to the server 610 via the Internet 410 in the backhaul connection 750. It may be determined by data bearers whether data should be transferred via the small-node device 500 and the Internet 410 or via the small-node device 500 and the core network 400. The data bearers may be logical channels or logical channel types.

Figure 6:
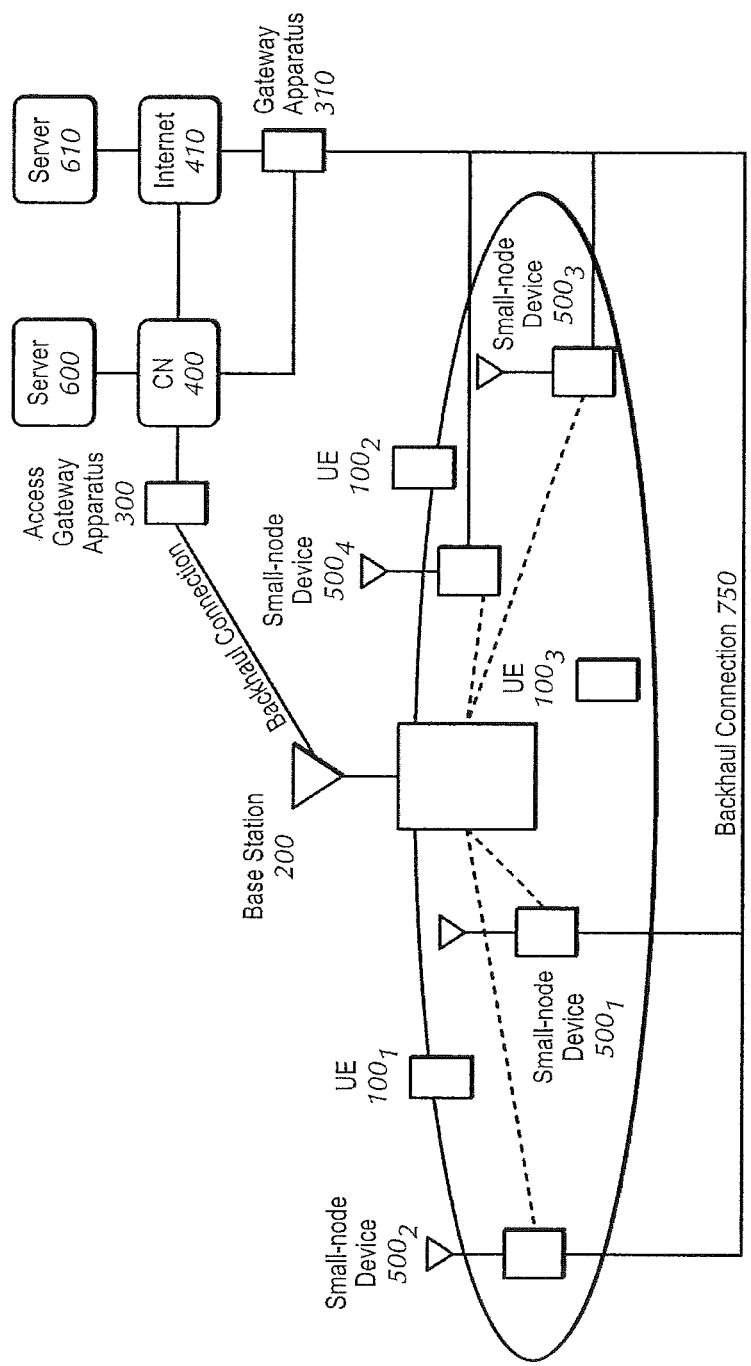
FIG. 6 is an explanatory view showing a communication system according to one or more embodiments of the present disclosure.
Figure 7:
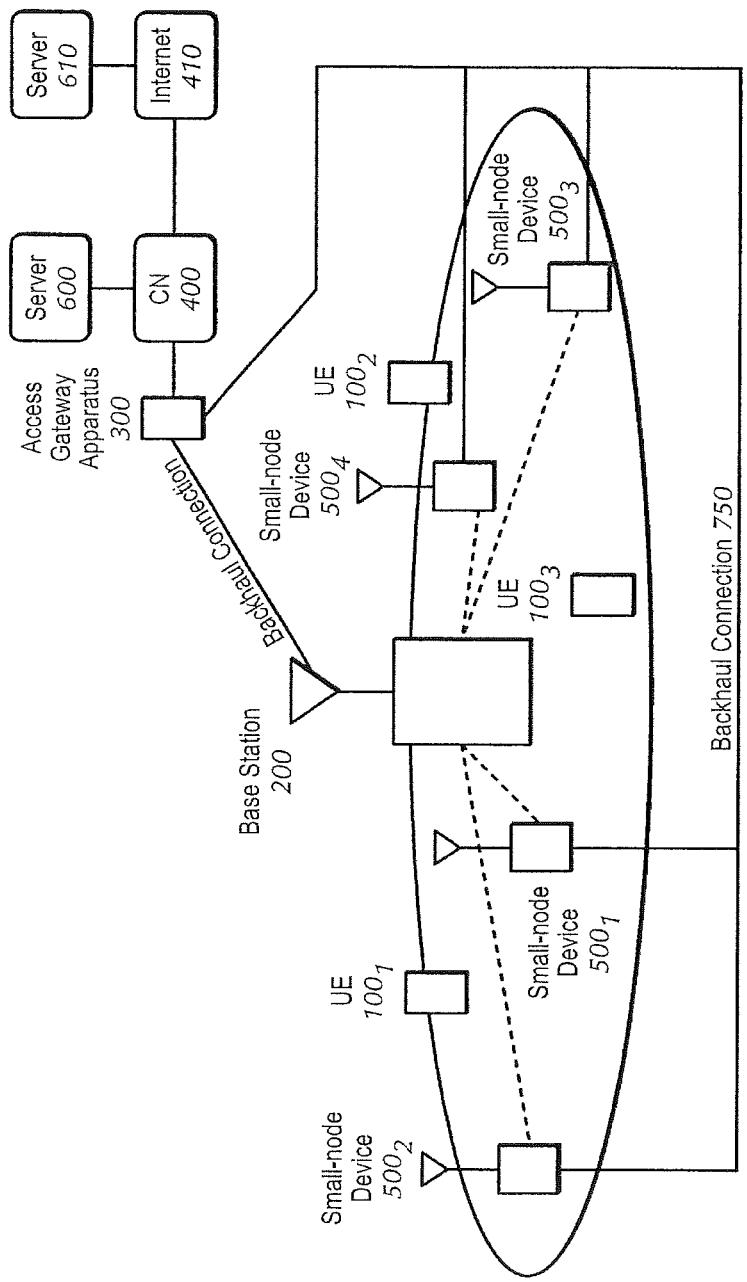
FIG. 7 is an explanatory view showing a communication system according to one or more embodiments of the present disclosure.

Alternatively, as illustrated in FIG. 6, the small-node device 500 may be connected to the gateway apparatus 310 in the backhaul connection 750, and the gateway apparatus 310 may be further connected to the core network 400 or the Internet 410. The gateway apparatus 310, which the small-node device 500 communicates with, may be a gateway, which is specifically deployed for connection with the small-node 500. Alternatively, as illustrated in FIG. 7, the small-node device 500 may be connected to the gateway apparatus 300 in the backhaul connection 750, similarly to the base station 200.

Figure 8:
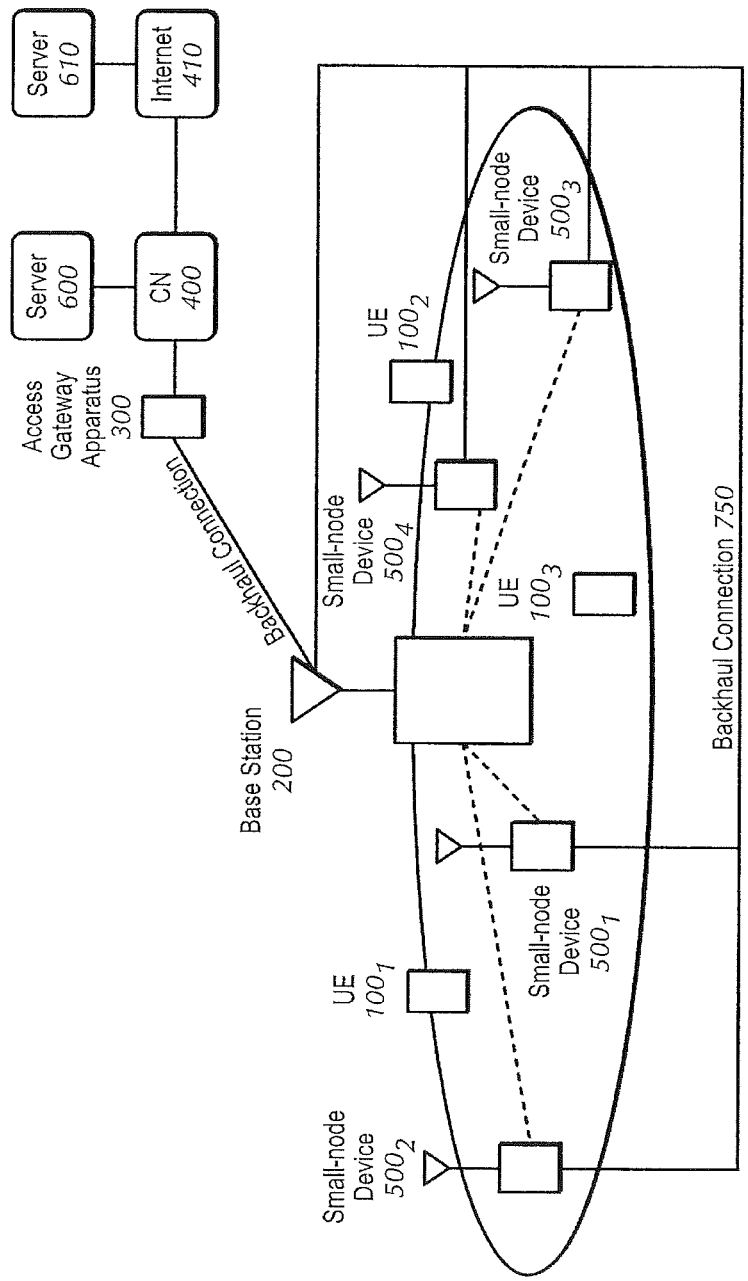
FIG. 8 is an explanatory view showing a communication system according to one or more embodiments of the present disclosure.

Alternatively, as illustrated in FIG. 8, the small-node device may be connected to the base station 200 in the backhaul connection 750. In this case, the BS2D connection 730 may be the same as the backhaul connection 750.

Figure 9:
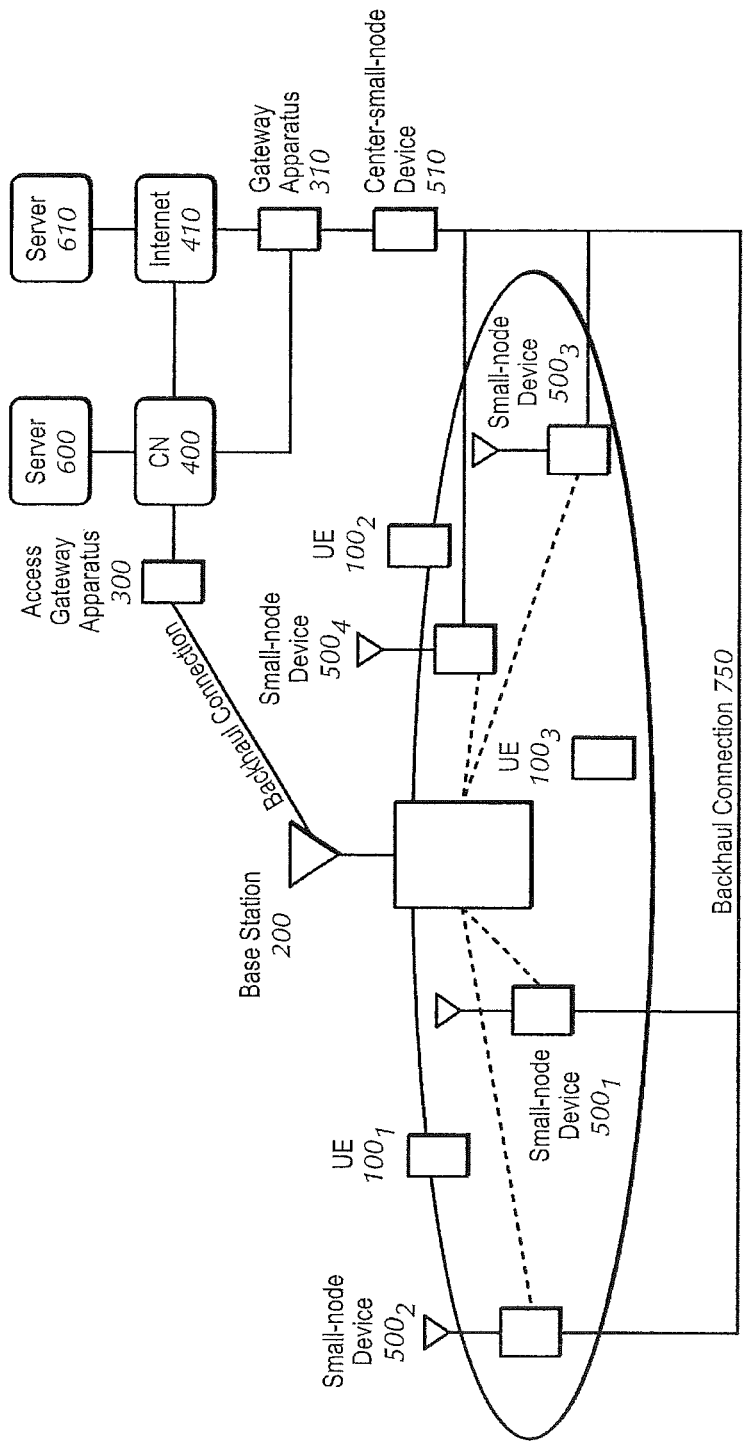
FIG. 9 is an explanatory view showing a communication system according to one or more embodiments of the present disclosure.

Alternatively, as illustrated in FIG. 9, the small-node device 500 may be connected to a center-small-node device 510, and the center-small-node device 510 may be connected to the core network 400 or the Internet 410 via the gateway apparatus 310. The gateway apparatus may be omitted. The protocol layers may be shared by the center-small-node device 510 and the small-node device 500. For example, according to one or more embodiments of the present disclosure, the center-small-node device 510 may handle RLC/PDCP layer and the small-node device 500 may handle Physical/MAC layer. Other methods to share the layers may be applicable. This architecture will be described in details later.

That is, the user equipment 100 has a capability of communicating with the base station 200 utilizing LTE (the BS2UE connection 720) simultaneously with communicating with the small-node device 500 utilizing the D2UE connection 710. The base station 200 is a node different from the small-node device 500, the D2UE connection 710 is controlled by the base station 200 and some data is transferred in the BS2UE connection 720 and others are transferred in the D2UE connection 710 for offload purposes.

The small-node device 500 has a capability of communicating with the user equipment 100 utilizing the D2UE connection 710, a capability of communicating with the base station 200 utilizing the BS2D connection 730, a capability of communicating with the core network 400 utilizing the backhaul connection 750. The base station 200 is a node different from the small-node device 500, the D2UE connection 710 is controlled by the base station 200 and some of data, which is transferred between the user equipment 100 and the server 600, is transferred in the D2UE connection 710 for offload purposes.

The base station 200 has a capability of communicating with the user equipment 100 utilizing the BS2UE connection 720, a capability of controlling the D2UE connection 710 utilizing the BS2UE connection 720 and the BS2D connection 730, and a capability of communicating with the access gateway apparatus 300 and the core network 400 utilizing the backhaul connection 740. The base station 200 is a node different from the small-node device 500, and some data is transferred in the BS2UE connection 720 and others are transferred in the D2UE connection 710 for offload purpose.

The carrier frequency in the D2UE connection 710 may be different from the one in the BS2UE connection 720. Alternatively, the carrier frequency in the D2UE connection 710 may be the same as the one in the BS2UE connection 720.

In some embodiments of the present invention, it is assumed that the carrier frequency in the D2UE connection 710 is 3.5 GHz. TDD applies to the D2UE connection 710. Furthermore, it is also assumed that the carrier frequency in the BS2UE connection 720 is 2 GHz. FDD applies to the BS2UE connection 720.

In other embodiments, carrier frequency other than 3.5 GHz may be used in the D2UE connection 710 and carrier frequency other than 2 GHz may be used in the BS2UE connection 720. Furthermore, FDD may be used in the D2UE connection 710 or TDD may be used in the BS2UE connection 720 in other embodiments.

When the user equipment 100 communicates with the server 600, the base station 200 configures the D2UE connection 710 in addition to the BS2UE connection 720 so that some of data to be transferred between the user equipment 100 and the server 600 can be offloaded.

More detailed examples, according to one or more embodiments of the present disclosure, for configuring the BS2UE connection 720 and the D2UE connection 710 are shown below. First, the user equipment 100 sends an RRC connection request to the base station 200 at the beginning of the communication, and the base station 200 configures the BS2UE connection 720. Alternatively, the base station sends a paging signal to the user equipment 100, the user equipment 100 sends an RRC connection request corresponding to the paging signal to the base station 200, and the base station 200 configures the BS2UE connection 720. Then, the base station 200 configures the connection between the user equipment 100 and the server 600 via the base station 200, the access gateway apparatus 300, and the core network 400.

The BS2D connection 730 is always configured between the base station 200 and the small-node device 500.

Alternatively, the base station 200 may configure the BS2D connection 730 in some embodiments, similarly to the BS2UE connection 720 described above. That is, the small-node device 500 may have the ability to power-down or enter a sleep state when not in use. The base station 200 may be able to send the small-node device 500 a signal to wake up over wireless network. Alternatively, the base station 200 may be able to send the small-node device 500 the signal to wake up over wired network and configure BS2D connection 730, instead of the wireless network. This may be supported by a protocol design in the BS2D connection 730. More specifically, the protocol design may be X2 interface or another kind of interface.

In some other embodiments, the protocol design may be LTE interface. Furthermore, the small-node device may be able to use power-saving modes, such as stand-by modes, equivalent to user equipment. In this case, exiting such power-saving modes may be done in the same fashion as the user equipment 100 and possibly in response to signals expected or sent by the base-station 200. The signals may be a paging signal or a control signaling such as MAC control signaling or physical layer signaling.

Alternatively, the BS2D connection 730 may be always configured between the base station 200 and the small-node device 500, and the small-node device 500 may be in a discontinuous reception mode in the BS2D connection 730, when the D2UE connection 710 is not configured between the small-node device 500 and the user equipment 100. In this case, the small-node device 100 may not transmit signals or may transmit signals extremely infrequently when the D2UE connection 710 is not configured between the small-node device 500 and the user equipment 100. For example, according to one or more embodiments of the present disclosure, even when the D2UE connection 710 is not configured between the small-node device 500 and the user equipment 100, the small-node device 500 may transmit only pilot signals infrequently so that the user equipment 100 can detect the small-node device 500. The periodicity of the pilot signals may be for example 100 ms or 1 second or 10 seconds. Alternatively, even when the D2UE connection 710 is not configured between the small-node device 500 and the user equipment 100, the small-node device 500 may transmit pilot signals based on a request from the base station 200 so that the user equipment 100 can detect the small-node device 500.

Secondly, the base station 200 orders for the user equipment 100 to configure the D2UE connection 710, using control signaling in the BS2UE connection 720. Furthermore, the base station 200 may order for the small-node device 500 to configure the D2UE connection 710, using control signaling in the BS2D connection 730. Configuring the D2UE connection 710 may be called establishing the D2UE connection 710.

Furthermore, the base station 200 controls the D2UE connection 710. For example, according to one or more embodiments of the present disclosure, the base station 200 may order for the user equipment 100 and the small-node device 500 to re-configure or re-establish the D2UE connection 710. The base station 200 may order for the user equipment 100 and the small-node device 500 to release the D2UE connection 710. The base station 200 may order for the user equipment 100 to change the D2UE connection 710 to the one with other small-node device. That is, the base station 200 may order for the user equipment 100 to conduct the handover to the other small-node device in a carrier, in which communication in the D2UE connection 710 is conducted. The base station 200 may control the above procedures utilizing RRC signaling in the BS2UE connection 720. The base station 200 may control the above procedures utilizing the control signaling in the BS2D connection 730.

Furthermore, when the D2UE connection 710 is dropped, the base station 200 may maintain the communications between the user equipment 100 and the server 600 utilizing the BS2UE connection 720.

Furthermore, the base station 200 may control radio resource for the D2UE connection 710. The details of the radio resource control for the D2UE connection 710 are shown below. Alternatively, the small-node device 500 may control the radio resource for the D2UE connection 710. Alternatively, the radio resource for the D2UE connection 710 may be controlled by both the base station 200 and the small-node device 500.

The base station 200 configures one or more radio bearers for the communications. Control signaling for configuring the radio bearers is transmitted to the user equipment 100 in the BS2UE connection 720. Control signaling for configuring the radio bearers is transmitted to the small-node device 500 in the BS2D connection 730.

The radio bearer may be called a logical channel. The base station 200 configures radio bearers for the BS2UE connection 720 and radio bearers for the D2UE connection 710. The radio bearers for the BS2UE connection 720 may be the same as the ones for the D2UE connection 710. Alternatively the radio bearers for the BS2UE connection 720 may be different from the ones for the D2UE connection 710.

For example, according to one or more embodiments of the present disclosure, radio bearers for packets of non-real-time services, such as web browsing, e-mail, and FTP, may be configured in the D2UE connection 710. Radio bearers for packets of real-time services, such as VoIP and streaming, may be configured in the BS2UE connection 720.

Alternatively, the radio bearers for the packets of non-real-time services are configured both in the D2UE connection 710 and in the BS2UE connection 720, and the packets of non-real-time services may be transmitted preferentially in the D2UE connection 710.

Alternatively, the radio bearers for the packets of real-time services are configured both in the D2UE connection 710 and in the BS2UE connection 720, and the packets of real-time services may be transmitted preferentially in the BS2UE connection 720. Alternatively, the packets of real-time services may also be transmitted preferentially in the D2UE connection 710.

Such prioritization or priority for the packets may be configured by the base station 200. That is, the base station 200 may configure for each radio bearer which connection, the D2UE connection 710 or the BS2UE connection 720, should be preferentially utilized.

C-plane signaling, such as NAS signaling and RRC signaling, may be transmitted in the BS2UE connection 720. For example, according to one or more embodiments of the present disclosure, RRC signaling includes signaling messages for RRC connection establishment, initial security activation, RRC connection reconfiguration, RRC connection release, RRC connection re-establishment, Radio resource configuration, measurement report, Handover command and so on. A radio bearer for C-plane signaling may be called Signaling radio bearer.

In some embodiments, C-plane signaling may be transmitted also in the D2UE connection 710.

Alternatively, one part of data for one radio bearer may be transmitted in the D2UE connection 710 and the other part of the data for the one radio bearer may be transmitted in the BS2UE connection 720.

The small-node device 500 may transmit common channels/common signals, such as Primary Synchronization signals (PSS), Secondary Synchronization signals (SSS), Common Reference Signals, Broadcast channels and the like, in the D2UE connection 710. Alternatively, the small-node device 500 may not transmit any common channels/signals or may transmit common channels/signals extremely infrequently. For example, according to one or more embodiments of the present disclosure, the small-node device 500 may transmit pilot signals infrequently so that the user equipment 100 can detect the small-node device 500. The periodicity of the pilot signals may be, for example, 1 second or 10 seconds. Alternatively, the small-node device 500 may transmit pilot signals based on a request from the base station 200 so that the user equipment 100 can detect the small-node device 500.

The user equipment 100 conducts communication in the D2UE connection 710 and communication in the BS2UE connection 720 simultaneously. The user equipment 100 may have two sets of radio frequency devices to conduct communication in the D2UE connection 710 and communication in the BS2UE connection 720 simultaneously. In other words, the user equipment 100 conducts communication in the D2UE connection 710 and communication in the BS2UE connection 720 simultaneously utilizing carrier aggregation functions (simultaneous transmissions and receptions in two carriers).

Figure 10:
FIG. 10 is a diagram explaining time division multiplexing for D2UE and Macro2UE transmissions according to one or more embodiments of the present disclosure.

Alternatively, the user equipment 100 may conduct communication in the D2UE connection 710 and communication in the BS2UE connection 720 in a time division multiplexing manner. For example, according to one or more embodiments of the present disclosure, two sets of time durations, Duration #A and Duration #B, are defined as shown in FIG. 10, and the user equipment 100 may conduct the communication in the BS2UE connection 720 in one set of the time durations (Duration #A in FIG. 10) and may conduct the communication in the D2UE connection 710 in the other set of the time durations (Duration #B in FIG. 10). The time duration for the D2UE connection 710 may be larger than the one for the BS2UE connection 720 so that the data offload effects can be increased. For example, according to one or more embodiments of the present disclosure, the length of Duration #A may be 8 msec (milliseconds), and the length of Duration #B may be 1.28 sec.

The time duration for the BS2UE connection 720 (Duration #A in FIG. 10) may correspond to on-duration in DRX control in the BS2UE connection 720. The time duration for the D2UE connection 710 may correspond to off-duration in DRX control in the BS2UE connection 720. The off-duration means a sleep mode in DRX control, in which the user equipment 100 does not have to monitor physical control channels transmitted from the base station 200 in the BS2UE connection 720.

In case that the user equipment 100 conducts communication in the D2UE connection 710 and communication in the BS2UE connection 720 in a time division multiplexing manner, it does not have to support a capability of simultaneously communicating both in the D2UE connection 710 and in the BS2UE connection 720, i.e. it can switch the radio frequency device from the BS2UE connection 720 to the D2UE connection 710 and vice versa. As a result, the cost and complexity of the user equipment 100 can be reduced.

The base station 200 may control the radio resource for the D2UE connection 710. The radio resource may consist of at least one of time resource, frequency resource and code resource.

For example, according to one or more embodiments of the present disclosure, the base station 200 may configure the frequency resource in the D2UE connection 710. More specifically, the base station 200 may configure center frequency of a carrier used in the D2UE connection 710. The base station 200 may configure the frequency resource in the D2UE connection 710 so that it does not overlap with frequency resource utilized in other small-node devices. As a result, interference in the carrier used in the D2UE connection 710 can be mitigated.

For example, according to one or more embodiments of the present disclosure, the base station 200 may configure the time resource in the D2UE connection 710, which does not overlap with time resource utilized in other small-node devices. As a result, interference in the D2UE connection 710 can be mitigated.

For example, according to one or more embodiments of the present disclosure, the base station 200 may configure the code resource in the D2UE connection 710, which does not overlap with code resource utilized in other small-node devices. As a result, interference in the D2UE connection 710 can be mitigated.

It may be noted that some parameters of the radio resource for the D2UE connection 710 may be configured by the base station 200 and the other parameters may be configured by the small-node device 710. More specifically, the frequency domain resource for the D2UE connection 710 may be configured by the base station 200 and the time domain resource for the D2UE connection 710 may be configured by the small-node device 500. Alternatively, the center carrier frequency for the D2UE connection 710 may be configured by the base station 200 and the other frequency domain resource, such as identification number of resource blocks, the number of resource blocks and the like, and the time domain resource for the D2UE connection 710 may be configured by the small-node device 500.

Alternatively, the base station 200 may configure several sets of the radio resource for the D2UE connection 710, and the small-node device 500 may configure one out of the several sets of the radio resource for the D2UE connection 710.

The base station 200 transmits control signaling to the user equipment 100 in the BS2UE connection 720 so that it configures the radio resource for the D2UE connection 710 as described above. Furthermore, the base station 200 transmits control signaling to the small-node device 500 in the BS2D connection 730 so that it configures the radio resource for the D2UE connection 710 as described above.

The base station 200 controls transmission power for DL in the D2UE connection 710. More specifically, the base station 200 may configure the maximum transmission power for DL in the D2UE connection 710. Furthermore, the base station 200 controls transmission power for UL in the D2UE connection 710. More specifically, the base station 200 may configure the maximum transmission power for UL in the D2UE connection 710.

The base station 200 may set the maximum transmission power for DL or UL in the D2UE connection 710 based on the number of the user equipment 100 in the cell where the small-node device 500 provides radio communication service. For example, according to one or more embodiments of the present disclosure, the base station 200 sets the maximum transmission power to be higher in case that the number of the user equipment 100 in the cell is relatively small. As a result, in case that there are a lot of user equipment 100, interference level in the carrier used in the D2UE connection 710 can be reduced by making the maximum transmission power low. In case that there is not a lot of user equipment, coverage area of the D2UE connection 710 can be increased by making the maximum transmission power high.

Alternatively, the base station 200 may set the maximum transmission power in the D2UE connection 710 based on the frequency where communications in the D2UE connection 710 are conducted. More specifically, in case that the frequency where the communications in the D2UE connection 710 are conducted is closed to the one which is utilized by other system, interference level with the system can be reduced by making the maximum transmission power low. In case that the frequency where the communications in the D2UE connection 710 are conducted is not closed to the one which is utilized by other system, coverage area of the D2UE connection 710 can be increased by making the maximum transmission power high.

The user equipment 100 has a capability of making measurements and detecting the nearest small-node device 500 so that the data throughput in the D2UE connection 710 can be maximized and the interference caused by the D2UE connection 710 can be minimized. Furthermore, the user equipment 100 has a capability of reporting results of the measurements and the detected nearest small-node device to the base station 200. The base station controls the D2UE connection 710 based on the results and the detected nearest small-node device, which are reported by the user equipment 100. For example, according to one or more embodiments of the present disclosure, when the nearest small-node device is changed, the base station 200 may order for the user equipment to stop communications with currently serving small-node device, and start new communication with the nearest small-node device, which is newly detected.

The small-node device 500 according to this embodiment will be described with reference to FIG. 11.

The small-node device 500 according to this embodiment has a BS2D communication section 502, D2UE communication section 504, and a Backhaul communication section 506. The BS2D communication section 502, the D2UE communication section 504, and the Backhaul communication section 506 are connected to each other.

The BS2D communication section 502 communicates with the base station 200 utilizing the BS2D connection 730.

More specifically, the BS2D communication section 502 receives control signaling for the D2UE connection 710 from the base station 200, and transmits control signaling for the D2UE connection 710 to the base station 200. The control signaling includes signaling for establishing/configuring/re-configuring/re-establishing/releasing the D2UE connection 710. Signaling for D2UE connection handover may also be included in the control signaling. The control signaling is transmitted to the D2UE communication section 504.

As described above, the LTE link may apply to the BS2D connection 730. In this case, the control signaling may be RRC layer signaling in LTE. Alternatively, the control signaling may be MAC layer signaling in LTE. Alternatively, some of the control signaling may be RRC signaling and others may be MAC layer signaling.

The control signaling may include parameters for at least one of physical layer, MAC layer, RLC layer, PDCP layer, or RRC layer in the D2UE connection 710. The control signaling may include information for the radio bearers in the D2UE connection 710.

Furthermore, the control signaling may include information of radio resource control for the D2UE connection 710. As described above, the information of the radio resource control for the D2UE connection 710 may include information for radio resource which can be utilized by the D2UE connection 710 or may include information for radio resource which cannot be utilized by the D2UE connection 710. The radio resource may include at least one of time domain resource, frequency domain resource, and code domain resource. The information of the radio resource control is also transmitted to the D2UE communication section 504.

Furthermore, the control signaling may include information of link adaptation for the D2UE connection 710. More specifically, the link adaptation may be one of power control and adaptive modulation and coding. The information of the power control may include information on the maximum transmission output power in the D2UE connection 710.

Furthermore, the control signaling may include measurement results for the D2UE connection 710. More specifically, the BS2D communication section 502 may transmit measurement results, which are conducted by the D2UE communication section 504. The measurement results may include radio link quality for UL in the D2UE connection 710. The radio link quality may include at least one of path loss between the small-node device 500 and the user equipment 100, received signal-to-interference ratio (SIR) for UL, and the like. Furthermore, the measurement results may include interference power for UL in the D2UE connection 710.

The D2UE communication section 504 communicates with the user equipment 100 utilizing the D2UE connection 710.

More specifically, the D2UE communication section 504 manages the D2UE connection 710 between the small-node device 500 and the user equipment 100, i.e. the D2UE communication section 504 establishes/configures/re-configures/re-establishes/releases the D2UE connection 710 between the small-node device 500 and the user equipment 100. The management of the D2UE connection 710 may be based on the control signaling transmitted by the base station 200.

The D2UE communication section 504 may conduct a link adaptation for the D2UE connection 710, such as power control and adaptive modulation and coding. The link adaptation may be conducted based on parameters which are signaled from the base station 200.

The D2UE communication section 504 transmits data to the user equipment 100 and receives data from the user equipment 100 utilizing the D2UE connection 710 for offload purposes. As described above, data for some of the radio bearers may be transmitted in the D2UE connection 710.

Hereinafter, data transferred from the user equipment 100 to the server 600 is called "uplink data" and data transferred from the server 600 to the user equipment 100 is called "downlink data".

The D2UE communication section 504 transmits the downlink data to the user equipment 100 using the D2UE connection 710. The downlink data is transferred from the server 600 via the core network 400 and the Backhaul communication section 506.

The D2UE communication section 504 receives the uplink data from the user equipment 100 using the D2UE connection 710. The uplink data is transferred to the server 600 via the Backhaul communication section 506 and the core network 400.

The D2UE communication section 504 also conducts measurements for the D2UE connection 710. More specifically, the D2UE communication section 504 make measurements of radio link quality for the D2UE connection 710 between the small-node device 500 and the user equipment 100. The radio link quality may be at least one of pilot signal received power, path loss, signal-to-interference ratio (SIR), channel state information, channel quality indicator, received signal strength indicator for UL in the D2UE connection 710. The radio link quality may be calculated by the pilot signal transmitted by the user equipment 100. The path loss is the one between the small-node device 500 and the user equipment 100. The measurements may include interference power level in the frequency band, in which the communications in the D2UE connection 710 operates.

The D2UE communication section 504 reports the measurement results to the base station 200 via the BS2D communication section 502 and the BS2D connection 730.

The Backhaul communication section 506 is connected to the core network 400 via a backhaul link. The backhaul link may be a wired connection or a wireless connection or a mixture of a wired connection and a wireless connection. The wireless connection may be a connection provided by WiFi (Wireless LAN) or cellular system.

The Backhaul communication section 506 transmits to the D2UE communication section 504 the downlink data, which is transferred via the backhaul link from the core network 400. The Backhaul communication section 506 transmits the core network 400 the uplink data via the backhaul link, which is transferred from the D2UE communication section 504.

The user equipment 100 according to this embodiment will be described with reference to FIG. 12.

The user equipment 100 according to this embodiment has a BS2UE communication section 102 and D2UE communication section 104. The BS2UE communication section 102 and the D2UE communication section 104 are connected to each other.

The BS2UE communication section 102 communicates with the base station 200 utilizing the BS2UE connection 720. As described above, data for some of the radio bearers are transmitted in the BS2UE connection 720. For example, according to one or more embodiments of the present disclosure, control signaling such as RRC signaling and NAS signaling and MAC layer signaling may be transmitted in the BS2UE connection 720. Furthermore, packets for Voice over IP (VoIP) may also be transmitted in the BS2UE connection 720. Data for some other data bearers may also be transmitted in the BS2UE connection 720.

As described above, the BS2UE communication section 102 may transmit/receive data for all radio bearers to/from the base station 200, when the D2UE connection 710 is dropped or not available.

Furthermore, the BS2UE communication section 102 receives control signaling for the D2UE connection 710 from the base station 200, and transmits control signaling for the D2UE connection 710 to the base station 200. The control signaling includes signaling for establishing/configuring/re-configuring/re-establishing/releasing the D2UE connection 710. Signaling for D2UE connection handover may also be included in the control signaling. The control signaling is transmitted to the D2UE communication section 104. The control signaling may be RRC layer signaling in LTE. Alternatively, the control signaling may be MAC layer signaling in LIE. Alternatively, some of the control signaling may be RRC signaling and others may be MAC layer signaling.

The control signaling may include parameters for at least one of physical layer, MAC layer, RLC layer, PDCP layer, or RRC layer in the D2UE connection 710. The control signaling may include information for the radio bearers in the D2UE connection 710.

Furthermore, the control signaling may include information of radio resource control for the D2UE connection 710. As described above, the information of the radio resource control for the D2UE connection 710 may include information for radio resource which can be utilized by the D2UE connection 710 or may include information for radio resource which cannot be utilized by the D2UE connection 710. The radio resource may include at least one of time domain resource, frequency domain resource, and code domain resource. The information of the radio resource control is also transmitted to the D2UE communication section 504.

Furthermore, the control signaling may include information of link adaptation for the D2UE connection 710. More specifically, the link adaptation may be one of power control and adaptive modulation and coding. The information of the power control may include information on the maximum transmission output power in the D2UE connection 710.

Furthermore, the control signaling may include measurement results for the D2UE connection 710. More specifically, the BS2UE communication section 102 may transmit measurement results, which are conducted by the D2UE communication section 104. The measurement results include DL radio link quality between small-node device and the user equipment 100. The small-node device may be the serving small-node device or may be the neighbor small-node device. The serving small-node device corresponds to the one which communicates with the user equipment 100 using the D2UE connection 710. Details of the DL radio link quality will be described below.

The D2UE communication section 104 communicates with the small-node device 500 utilizing the D2UE connection 710.

More specifically, the D2UE communication section 104 manages the D2UE connection 710 between the small-node device 500 and the user equipment 100, i.e. the D2UE communication section 104 establishes/configures/re-configures/re-establishes/releases the D2UE connection 710 between the small-node device 500 and the user equipment 100. The management of the D2UE connection 710 may be based on the control signaling transmitted by the base station 200.

The D2UE communication section 104 may conduct a link adaptation for the D2UE connection 710, such as power control and adaptive modulation and coding. The link adaptation may be conducted based on parameters which are signaled from the base station 200.

The D2UE communication section 104 transmits data to the small-node device 500 in UL and receives data from the small-node device 500 in DL utilizing the D2UE connection 710 for offload purposes. As described above, data for some of the radio bearers may be transmitted in the D2UE connection 710.

That is, the D2UE communication section 104 receives the downlink data from the small-node device 500 using the D2UE connection 710. The downlink data is transferred from the server 600 via the core network 400 and the small-node device 500. The D2UE communication section 104 transmits the uplink data to the small-node device 500 using the D2UE connection 710. The uplink data is transferred to the server 600 via the small-node device 500 and the core network 400.

The D2UE communication section 104 also conducts measurements for D2UE connection. More specifically, the D2UE communication section 104 make measurements of the DL radio link quality for the serving small-node device 500 or for the neighbor small-node device. The DL radio link quality may be at least one of pilot signal received power, path loss, signal-to-interference ratio (SIR), channel state information, channel quality indicator, received signal strength indicator. The radio link quality may be calculated by the pilot signal transmitted by the serving small-node device or the neighbor small-node device. The path loss is the one between the user equipment 100 and the serving small-node device or the one between the user equipment 100 and the neighbor small-node device.

The D2UE communication section 104 reports the measurement results to the base station 200 via the BS2UE communication section 102 and the BS2UE connection 720.

The base station 200 according to this embodiment will be described with reference to FIG. 13.

The base station 200 according to this embodiment has a BS2UE communication section 201, a BS2D communication section 202, D2UE communication control section 204, and a Backhaul communication section 206. The BS2UE communication section 201, the BS2D communication section 202, the D2UE communication control section 204, and the Backhaul communication section 206 are connected to each other.

The BS2UE communication section 201 communicates with the user equipment 100 utilizing the BS2UE connection 720. As described above, data for some of the radio bearers are transmitted in the BS2UE connection 720. For example, according to one or more embodiments of the present disclosure, control signaling such as RRC signaling and NAS signaling and MAC layer signaling may be transmitted in the BS2UE connection 720. Furthermore, packets for Voice over IP (VoIP) may also be transmitted in the BS2UE connection 720. Data for some other data bearers may also be transmitted in the BS2UE connection 720.

As described above, the BS2UE communication section 201 may transmit/receive data for all radio bearers to/from the user equipment 100, when the D2UE connection 710 is dropped or not available. Some parts of data, such as U-plane data, transmitted from the user equipment 100 are transferred to the core network 400 via the BS2UE communication section 201 and the Backhaul communication section 206. Some parts of data, such as U-plane data, transmitted from the server 400 are transferred to the user equipment 100 via the Backhaul communication section 206 and the BS2UE communication section 201.

Furthermore, the BS2UE communication section 201 receives control signaling for the D2UE connection 710 from the user equipment 100, and transmits control signaling for the D2UE connection 710 to the user equipment 100. Description for the control signaling is the same as the one for the user equipment 100, and therefore is omitted here.

The BS2D communication section 202 communicates with the small-node device 500 utilizing the BS2D connection 730. The BS2D communication section 202 receives control signaling for the D2UE connection 710 from the small-node device 500, and transmits control signaling for the D2UE connection 710 to the small-node device 500. Description for the control signaling is the same as the one for the small-node device 500, and therefore is omitted here.

The control signaling for the D2UE connection 710 is produced by the D2UE communication control section 204 as described below, and is transferred to the user equipment 100 via the Macro2UE communication section 201. The control signaling is transmitted also to the small-node device 500 via the BS2D communication section 202.

The D2UE communication control section 204 conducts radio link connection control for the D2UE connection 710. The radio link connection control includes at least one of establishing/configuring/re-configuring/re-establishing/re-leasing the D2UE connection 710. The parameters for the radio link connection control are transmitted to the user equipment 100 via the Macro2UE communication section 201. The parameters for the radio link connection control are transmitted also to the small-node device 500 via the BS2D communication section 202. The parameters may include at least one of physical layer, MAC layer parameters, RLC layer parameters, PDCP layer parameters, and RRC layer parameters. The parameters may include the information for the radio bearers. The radio link connection control may be referred to as radio resource control.

More specifically, the D2UE communication control section 204 may determine that the D2UE connection 710 should be released, when the path loss between the user equipment 100 and the small-node device 500 is larger than a threshold. That is, the D2UE communication control section 204 may send control signaling to release the D2UE connection 710. The D2UE communication control section 204 may conduct such determination based on the measurement reports which are transmitted by at least one of the user equipment 100 and the small-node device 500. More specifically, at least one of the user equipment 100 and the small-node device 500 may detect whether or not the path loss is larger than the threshold and send the measurement reports in case that the path loss is larger than the threshold. The D2UE communication control section 204 may send the control signaling to at least one of the user equipment 100 and the small-node device 500, after it receives the measurement reports. In the above examples, DL transmission power or UL transmission power in the D2UE connection 710 may be utilized instead of the path loss.

Furthermore, the D2UE communication control section 204 conducts control for handover of the D2UE connection between the user equipment 100 and the small-node device 500.

More specifically, the D2UE communication control section 204 receives the measurement reports, which are transmitted by the user equipment 100, and determines whether or not the user equipment 100 should hand over to the neighbor small-node device, which is more closed to the user equipment 100 than the serving small-node device. Here, the serving small-node device means the one which currently has the D2UE connection 710 with the user equipment 100.

Furthermore, the D2UE communication control section 204 may control the radio resource for the D2UE connection 710. More specifically, the D2UE communication control section 204 assigns the radio resource for the D2UE connection 710 so that it will not interfere D2UE connections in the neighbor small-node device. More specifically, the D2UE communication control section 204 assigns the radio resource for the D2UE connection 710 so that it will not overlap with the one of other D2UE connections in the neighbor small-node device. The radio resource includes at least one of time domain resource, frequency domain resource, and code domain resource.

The radio resource may be indicated to the user equipment 100 and the small-node device 500 by parts of the parameters for the radio resource control. The parameters may include at least one of ID of the frequency domain resource, ID of identification of the time domain resource, and ID of identification of the code domain resource.

The radio resource, which is assigned to the D2UE connection 710, may be determined based on the number of the user equipment in the cell where the small-node device 500 provides the radio communication service. Alternatively, the radio resource may be determined based on interference power level in the frequency band, in which the communications in the D2UE connection 710 operates.

Furthermore, the D2UE communication control section 204 may control the link adaptation for the D2UE connection 710. More specifically, the link adaptation may be one of power control and adaptive modulation and coding. The information of the power control may include information on the maximum transmission output power for DL or UL in the D2UE connection 710.

The control signaling, which is determined based on the above control in the D2UE communication control section 204, is transmitted to the user equipment 100 via the BS2UE communication section 201. The control signaling is transmitted to the small-node device via the BS2D communication section 202.

The Backhaul communication section 206 has a backhaul link which is connected to the core network 400. The Backhaul communication section 206 transmits to the BS2UE communication section 201 the downlink data, which is received from the core network 400, and transmits to the core network 400 the uplink data, which is received from the BS2UE communication section 201.

Figure 14:
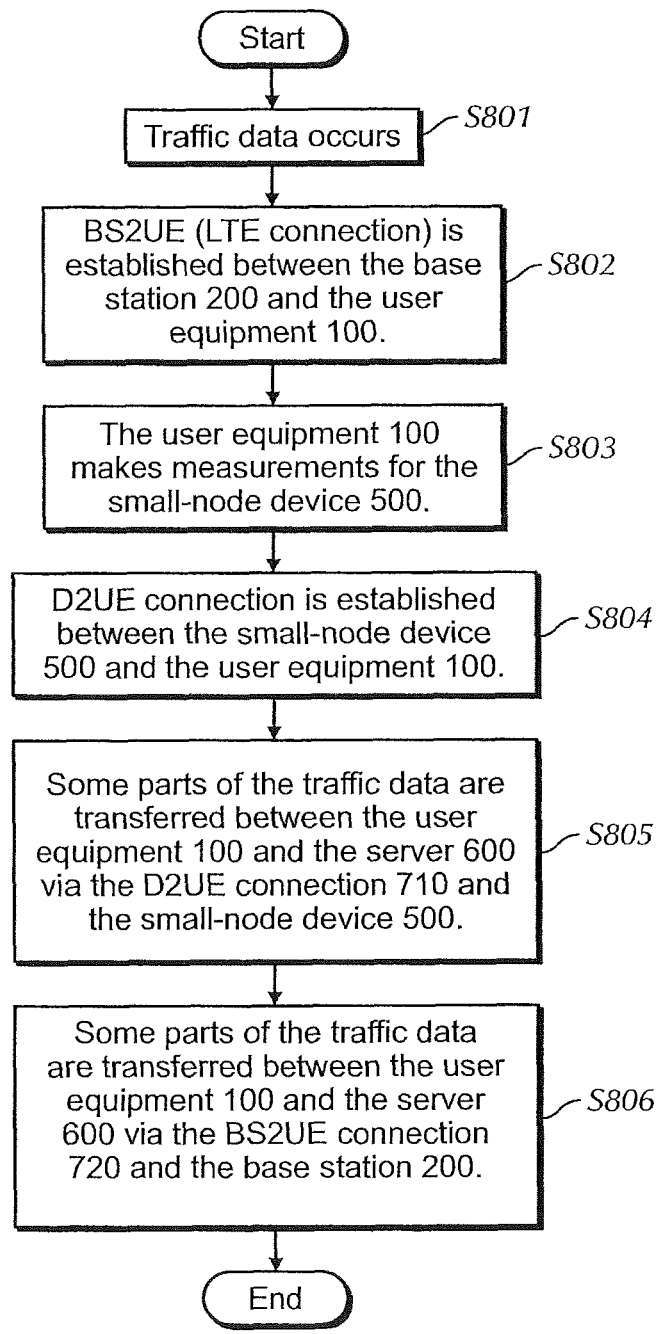
FIG. 14 is a flowchart showing operations in the radio communication system according to one or more embodiments of the present disclosure.
Figure 14A:
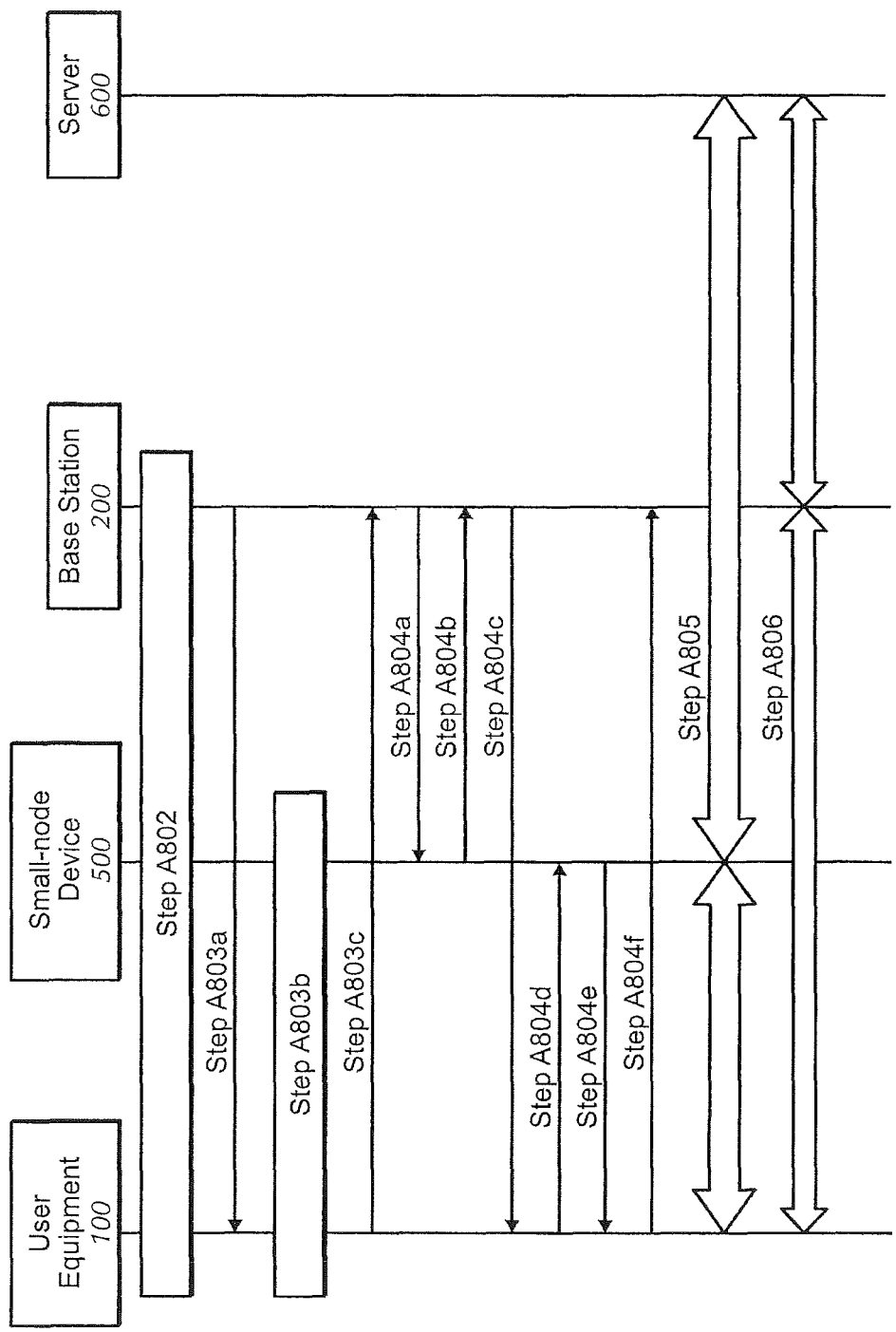
FIG. 14A is a figure showing operations in the radio communication system according to one or more embodiments of the present disclosure.

Referring to FIGS. 14 and 14A, an operation of the mobile communication system according to one or more embodiments of the present invention is described.

As shown in FIG. 14, in the step S801, traffic data, which should be transferred between the user equipment 100 and the server 600, occurs. The traffic data may be transmitted both in downlink and in uplink. Alternatively, it may be transmitted only in downlink or only in uplink. More specifically, traffic data occurring may correspond to sending/receiving e-mails, browsing web sites, downloading files, uploading files and the like. Traffic data may be referred to as "data".

In the step S802, LTE connection between the base station 200 and the user equipment 100 (the BS2UE connection 720 in FIG. 2) is established. When it is triggered by the user equipment, the user equipment 100 may initiate the connection by random access procedures. When it is triggered by the server 600, the base station may send a paging message to initiate the connection. Step S802 corresponds to Step A802 in FIG. 14A.

In this embodiment, it is assumed that the BS2D connection 730 is always configured between the base station 200 and the small-node device 500.

In some other embodiments, however, a connection between the base station 200 and the small-node device 500 (the BS2D connection 730) is established in the step S802 or just after the step S802. The establishment may be triggered by the base station 200 using control signaling. Furthermore, the small-node device 500 may start transmitting pilot signals for the D2UE connection 710 after it is requested by the base station 200 in the above establishment procedures. As a result, it may not cause significant interference with other communications in the frequency band when it does not transmit the pilot signals.

In the step S803, the user equipment 100 makes measurements for the D2UE connection, as described below. That is, the user equipment 100 makes measurements for the DL radio link quality in the D2UE connection. More specifically, the user equipment 100 transmits to the base station 200 a measurement report, which notifies the base station 200 of identification number of the small-node device having the best DL radio link quality.

More specifically, the measurements for the D2UE connection may be conducted as illustrated in the steps A803a, A803b and A803c in FIG. 14A.

In the step A803a, the base station 200 transmits control signaling to the user equipment 100 in the BS2UE connection 720 and orders for the user equipment 100 to make measurements for the D2UE connection so that the user equipment 100 detects small-node device with the best radio link quality.

The control signaling may include information for the measurements. For example, according to one or more embodiments of the present disclosure, the control signaling may include at least one of carrier frequency for the D2UE connection, bandwidth of the D2UE connection, identification number for small-node device, information on measurement quantity, information on the pilot signals transmitted by the small-node device and the like. The information on the measurement quantity may be an indicator of RSRP or RSRQ.

The information on the pilot signals may be the one for the radio resource of the pilot signals. More specifically, it may be at least one of the transmission periodicity of the pilot signals, the frequency-domain resource information of the pilot signals, the time-domain resource information of the pilot signals, and the like. As mentioned later, time offset between the D2UE connection and the BS2UE connection may also be included in the information on the pilot signals. Furthermore, transmission power of the pilot signals may be included in the information on the pilot signals.

Furthermore, rules for sending measurement reports to the base station 200 may also be included in the information for the measurements. The rules may include criteria, which are similar to the ones for LTE, such as Event A1, A2, A3, A4, A5 and the like, which is specified in TS 36.331. Threshold value or Layer-3 filtering coefficient, Time-to-trigger may also be included in the information for the measurements.

Furthermore, control signaling for cell selection/reselection may also be included in the information for the measurements. That is, control signaling for idle-mode measurements may also be included in the information for the measurements.

The control signaling may be transmitted in the dedicated control signaling or in the broadcast information.

Furthermore, the control signaling in the step S803A may include an indicator whether or not the D2UE connection is available in the cell wherein the base station 200 provides the radio communication system for the user equipment 100.

The control signaling may be transmitted in the step A802, instead of the step A803a.

In the step A803b, the user equipment 100 makes measurements for the DL radio link quality in the D2UE connection.

In the step A803c, the user equipment 100 transmits to the base station 200 a measurement report in the BS2UE connection 720, which notifies the base station 200 of identification number of the small-node device having the best DL radio link quality.

In the step S804, D2UE connection between the user equipment 100 and the small-node device 500 (the D2UE connection 710) is established. The base station 200 orders for the user equipment 100 and the small-node device 500 to configure the D2UE connection 710. The parameters for the D2UE connection 710 are transmitted from the base station 200 to the user equipment 100 and the small-node device 500 in the BS2UE connection 720 and in the BS2D connection 730, respectively. Furthermore, the establishment of the D2UE connection 710 may be reported to the base station 200 by the user equipment 100 and/or the small-node device 500. The step S804 corresponds to Steps A804a to A804f in FIG. 14A.

That is, the establishment of the D2UE connection 710 may be conducted as illustrated in the steps A804a, A804b, A804c, A804d, A804e, and A804f in FIG. 14A.

In the step A804a, the base station 200 transmits control signaling to the small-node device 500 in the BS2D connection 730 and orders the small-node device 500 to establish the D2UE connection 710 with the user equipment 100. In general, the small-node device 500 is the one which has the best DL radio link quality based on the measurement report. In the step A804b, the small-node device 500 may transmit acknowledgement about the order of the step A804a. The control signaling may include at least one of identification number of the user equipment 100, capability information of the user equipment 100, and the like.

In the step A804c, the base station 200 transmits control signaling to the user equipment 100 in the BS2UE connection 720 and orders the user equipment 100 to establish the D2UE connection 710 with the small-node device 500.

For example, according to one or more embodiments of the present disclosure, the control signaling of the step A804c may include at least one of the following parameters:

Radio bearer information for the D2UE connection 710
Carrier frequency information of the D2UE connection 710
Frequency band indicator of the D2UE connection 710
System bandwidth (Channel bandwidth) of the D2UE connection 710
Cell barred information on the D2UE connection 710
Identification number of the small-node device 500
UL Maximum transmission power in the D2UE connection 710
Information of DL and UL slots in the D2UE connection 710 (in case of TDD)
Information of random access channel for the D2UE connection 710
Information of uplink physical control channels, such as PUCCH for the D2UE connection 710
Information of downlink physical control channels, such as PDCCH, PHICH for the D2UE connection 710
Information of uplink physical shared channel for the D2UE connection 710
Information of downlink physical shared channel for the D2UE connection 710
Information of uplink sounding reference signal for the D2UE connection 710
Information of uplink power control information for the D2UE connection 710
Information of downlink or uplink cyclic prefix information for the D2UE connection 710
Information of time alignment control in uplink for the D2UE connection 710
Information of RLC or PDCP configuration for each radio bearer for the D2UE connection 710
Information of MAC configuration for the D2UE connection 710
Information of security for the D2UE connection 710
Part or all of the information in the step A804c may be transmitted to the small-node device 500 in the step A804a.

The radio bearer information may indicate what kind of radio bearers should be configured for the D2UE connection 710 or what kind of priority should be specified for each radio bearer.

Because the parameters for the D2UE connection 710 can be transmitted in the step A804c, the small-node device 500 may neither have to transmit broadcast channels, and therefore the complexity of the small-node device 500 can be reduced.

In the step A804d, the user equipment 100 transmits control signaling to establish a connection between the user equipment 100 and the small-node device 500 (the D2UE connection 710). The control signaling may be a random access signaling. Alternatively, the control signaling may be a pre-assigned access signaling. Radio resource information of the pre-assigned access signaling may be transmitted to the user equipment 100 by the base station 200 in the step A804c.

The radio resource information of the pre-assigned access signaling may be configured by the base station 200. In this case, the base station 200 may notify the small-node device 500 of it in the step A804a. Alternatively, the radio resource information of the pre-assigned access signaling may be configured by the small-node device 500. In this case, the small-node device 500 may notify the base station 200 of it in the step A804b.

In the step A804e, the small-node device 500 transmits acknowledgement of the control signaling transmitted in the step A804d. As a result, the D2UE connection 710 can be established.

In the step A804f, the user equipment 100 transmits control signaling to the base station 200 and notifies the base station 200 that the D2UE connection 710 has been successfully established.

In the step S805, some parts (Data #2 in FIG. 3) of the traffic data are transferred between the user equipment 100 and the server 600 via the D2UE connection 710 and the small-node device 500, as described in FIG. 3. The data transmitted in the D2UE connection 710 may be data for some parts of radio bearers, which are configured for the communication between the user equipment 100 and the server 600. More specifically, the data transferred via the D2UE connection 710 may be at least one of best effort packets, non-real time service packets, and real time service packets. The data transferred via the D2UE connection 710 may be U-plane data. The step S805 corresponds to Step A805 in FIG. 14A.

In the step S806, some parts (Data #1 in FIG. 3) of the traffic data are transferred between the user equipment 100 and the server 600 via the BS2UE connection 720 and the base station 200, as described in FIG. 3. C-plane data may also be transmitted in the BS2UE connection 720, instead of the D2UE connection 710. The step S806 corresponds to Step A806 in FIG. 14A.

The operations shown in FIG. 14 may be described in terms of the operations in the small-node device 500 in the following. The operations of the small-node device 500 comprise establishing the D2UE connection 710 with the user equipment 100 (step S804) and transferring some parts of data, which are transferred between the user equipment 100 and the server 600, using the D2UE connection 710 (step S805).

The operations shown in FIG. 14 may be described in terms of the operations in the user equipment 100 in the following. The operations of the user equipment 100 comprise establishing the LTE connection (the BS2UE connection 720) with the base station 200 (step S802), making measurements for the small-node device (step S803), establishing the D2UE connection 710 with the small-node device 500 (step S804), transferring some parts of data, which are transferred between the user equipment 100 and the server 600, via the D2UE connection 710 and the small-node device 500 (step S805), and transferring some parts of data, which are transferred between the user equipment 100 and the server 600, via the BS2UE connection 720 and the base station 200 (step S806).

The operations shown in FIG. 14 may be described in terms of the operations in the base station 200 as follows. The operations of the base station 200 comprise establishing the LTE connection (the BS2UE connection 720) with the user equipment 100 (step S802), transmitting control signaling for establishing the D2UE connection 710 (step S804), and transferring some parts of data, which are transferred between the user equipment 100 and the server 600, using the BS2UE connection 720 (step S806). In the D2UE connection 710, some parts of data, which are transferred between the user equipment 100 and the server 600, are transferred via the D2UE connection 710 and the small-node device 500.

Figure 15:
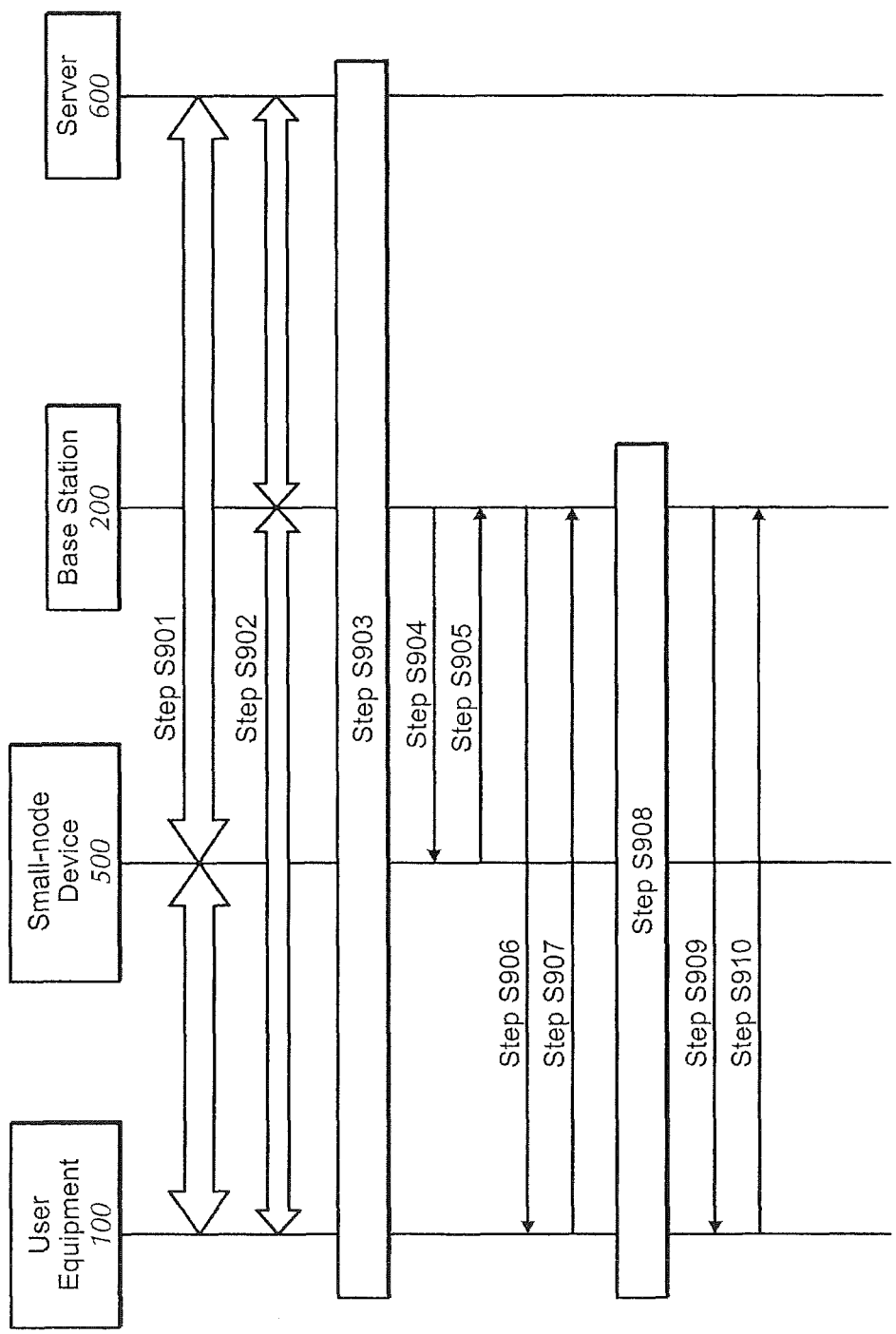
FIG. 15 is a figure showing operations in the radio communication system according to one or more embodiments of the present disclosure.

Referring to FIG. 15, an operation of the mobile communication system according to one or more embodiments of the present invention is described.

As shown in FIG. 15, in the step S901, some parts of the traffic data are transferred between the user equipment 100 and the server 600 via the D2UE connection 710 and the small-node device 500. In the step S902, some parts of the traffic data are transferred between the user equipment 100 and the server 600 via the BS2UE connection 720 and the base station 200. The steps S901 and S902 may be the same as the steps S805 and S806, respectively, i.e. the steps S901 and S902 may be a continuation of the steps S805 and S806.

In the step S903, traffic data, which should be transferred between the user equipment 100 and the server 600, disappears. More specifically, traffic data disappearing may correspond to the end of sending/receiving e-mails, browsing web sites, downloading files, uploading files and the like.

In the step S904, the base station 200 transmits control signaling to the small-node device 500 and notifies the small-node device 500 that the D2UE connection 710 should be released. In the step S905, the small-node device 500 transmits acknowledgement of the notification of the step S904.

In the step S906, the base station 200 transmits control signaling to the user equipment 100 and notifies the user equipment 100 that the D2UE connection 710 should be released. In the step S907, the user equipment 100 transmits acknowledgement of the notification of the step S906. The steps S906 and S907 may be conducted before the steps S904 and S905. Alternatively, the steps S906 and S907 may be conducted simultaneously with the steps S904 and S905.

According to the control signaling in the steps S904 and S906, the D2UE connection 710 is released in the step S908.

The steps S905 and S907 may be conducted after the step S908 so that the user equipment 100 or the small-node device 500 can report that the D2UE connection 710 is released.

In the step S909, the base station 200 transmits control signaling to the user equipment 100 and notifies the user equipment 100 that the BS2UE connection 720 is released. In the step S910, the user equipment 100 transmits acknowledgement of the control signaling of the step S909 to the base station 200. The steps S909 and S910 correspond to normal procedures to release a LTE connection.

In the embodiment described in FIG. 15, the base station 200 transmits the control signaling to notify releasing the D2UE connection 710, but alternatively, the user equipment 100 or the small-node device 500 may transmit the control signaling.

The operations shown in FIG. 15 may be described in terms of the operations in the small-node device 500 in the following. The operations of the small-node device 500 comprise transferring some parts of data, which are transferred between the user equipment 100 and the server 600, using the D2UE connection 710 (step S901), receiving the control signaling transmitted by the base station 200 (step S904), transmitting the acknowledgement of the control signaling to the base station 200 (step S905) and releasing the D2UE connection 710 with the user equipment 100 (step S908).

The operations shown in FIG. 15 may be described in terms of the operations in the user equipment 100 in the following. The operations of the user equipment 100 comprise transferring some parts of data, which are transferred between the user equipment 100 and the server 600, via the D2UE connection 710 and the small-node device 500 (step S901), transferring some parts of data, which are transferred between the user equipment 100 and the server 600, via the BS2UE connection 720 and the base station 200 (step S902), receiving the control signaling transmitted by the base station 200 (step S906), transmitting the acknowledgement of the control signaling to the base station 200 (step S907), releasing the D2UE connection 710 with the user equipment 100 (step S908), and releasing the LTE connection (the BS2UE connection 720) in the steps S909 and S910.

The operations shown in FIG. 15 may be described in terms of the operations in the base station 200 as follows. The operations of the base station 200 comprise transmitting to the small-node device 500 control signaling for releasing the D2UE connection 710 (step S904), transmitting to the user equipment 100 control signaling for releasing the D2UE connection 710 (step S906), and releasing the BS2UE connection 720 (steps S909 and S910).

Figure 16:
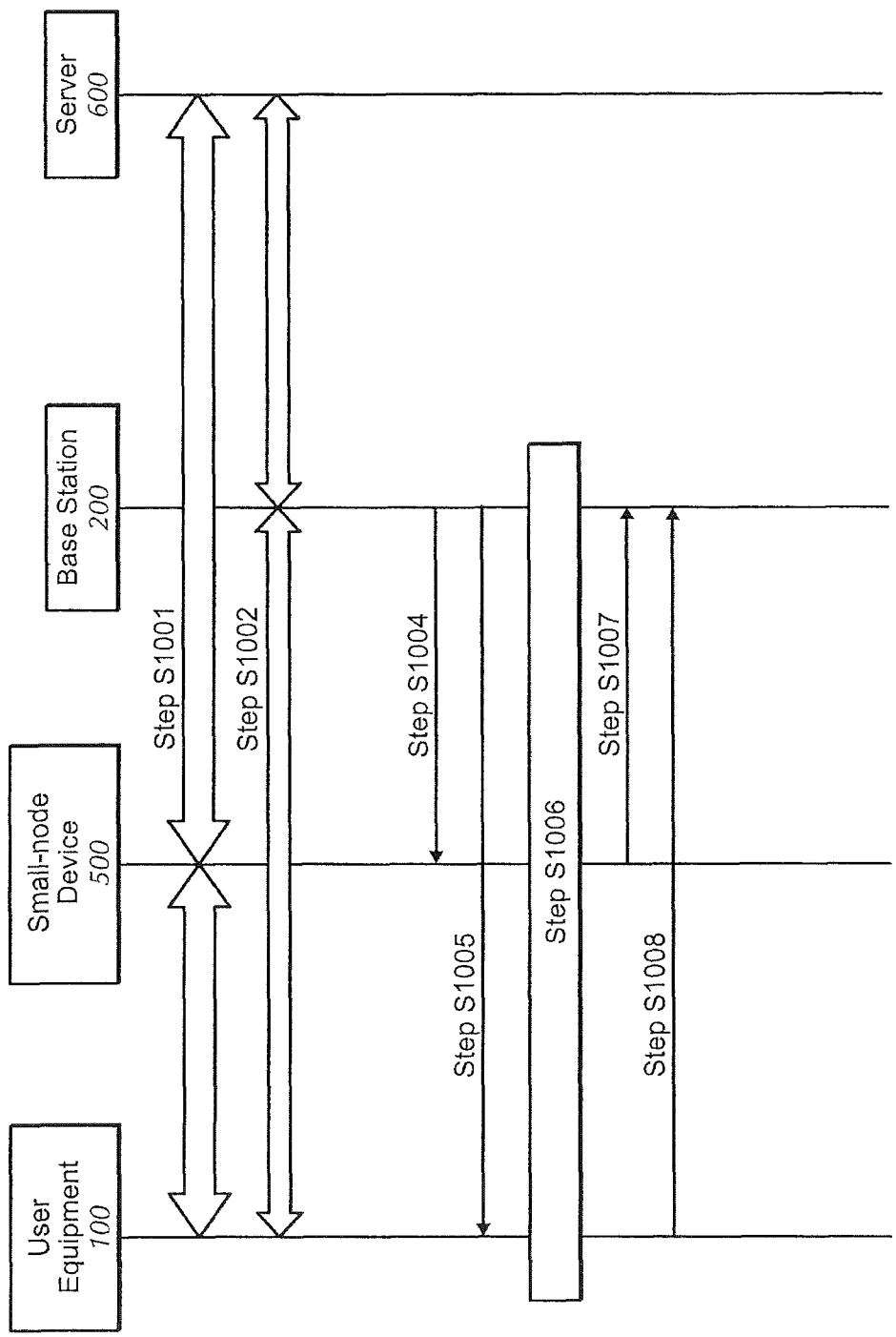
FIG. 16 is a figure showing operations in the radio communication system according to one or more embodiments of the present disclosure.

Referring to FIG. 16, an operation of the mobile communication system according to one or more the embodiments of the present invention is described.

As shown in FIG. 16, in the step S1001, some parts of the traffic data are transferred between the user equipment 100 and the server 600 via the D2UE connection 710 and the small-node device 500. In the step S1002, some parts of the traffic data are transferred between the user equipment 100 and the server 600 via the BS2UE connection 720 and the base station 200. The steps S1001 and S1002 may be the same as the steps S805 and S806, respectively, i.e. the steps S1001 and S1002 may be a continuation of the steps S805 and S806.

In the step S1004, the base station 200 transmits control signaling to the small-node device 500 and notifies the small-node device 500 that the D2UE connection 710 should be reconfigured. In the step S1005, the base station 200 transmits control signaling to the user equipment 100 and notifies the user equipment 100 that the D2UE connection 710 should be reconfigured.

More specifically, the parameters described for the step A804c may be included in the control signaling for the step 1004 or the step S1005.

In the step S1006, the D2UE connection 710 is re-configured. More specifically, some of the parameters for the D2UE connection 710 are changed. The parameters may include at least one of parameters for frequency domain resource, parameters for time domain resource, parameters for code domain resource, parameters for pilot signals for the D2UE connection 710, parameters for initial access for the D2UE connection 710, parameters for the radio bearers, parameters for the power control for the D2UE connection 710. The parameters for the power control include the information on the maximum transmission output power for DL or UL in the D2UE connection 710.

In the step S1007, the small-node device 500 transmits control signaling to the base station 200 and notifies the base station 200 that the D2UE connection 710 has successfully been reconfigured. In the step S1008, the user equipment 100 transmits control signaling to the base station 200 and notifies the base station 200 that the D2UE connection 710 has successfully been reconfigured.

The operations shown in FIG. 16 may be described in terms of the operations in the small-node device 500 in the following. The operations of the small-node device 500 comprise transferring some parts of data, which are transferred between the user equipment 100 and the server 600, using the D2UE connection 710 (step S1001), receiving control signaling to reconfigure the D2UE connection 710 (step S1004), reconfiguring the D2UE connection 710 (step S1006), and transmitting control signaling to report that the D2UE connection 710 has been reconfigured (step S1008).

The operations shown in FIG. 16 may be described in terms of the operations in the user equipment 100 in the following. The operations of the user equipment 100 comprise transferring some parts of data, which are transferred between the user equipment 100 and the server 600, using the D2UE connection 710 (step S1001), transferring some parts of data, which are transferred between the user equipment 100 and the server 600, using the BS2UE connection 720 (step S1002), receiving control signaling to reconfigure the D2UE connection 710 (step S1005), reconfiguring the D2UE connection 710 (step S1006), and transmitting control signaling to report that the D2UE connection 710 has been reconfigured (step S1008).

The operations shown in FIG. 16 may be described in terms of the operations in the base station 200 in the following. The operations of the base station 200 comprise transferring some parts of data, which are transferred between the user equipment 100 and the server 600, using the BS2UE connection 720 (step S1002), transmitting to the small-node device 500 control signaling to reconfigure the D2UE connection 710 (step S1003), transmitting to the user equipment 100 control signaling to reconfigure the D2UE connection 710 (step S1004), receiving control signaling to report that the D2UE connection 710 has been reconfigured (step S1007), and receiving control signaling to report that the D2UE connection 710 has been reconfigured (step S1008).

Figure 17:
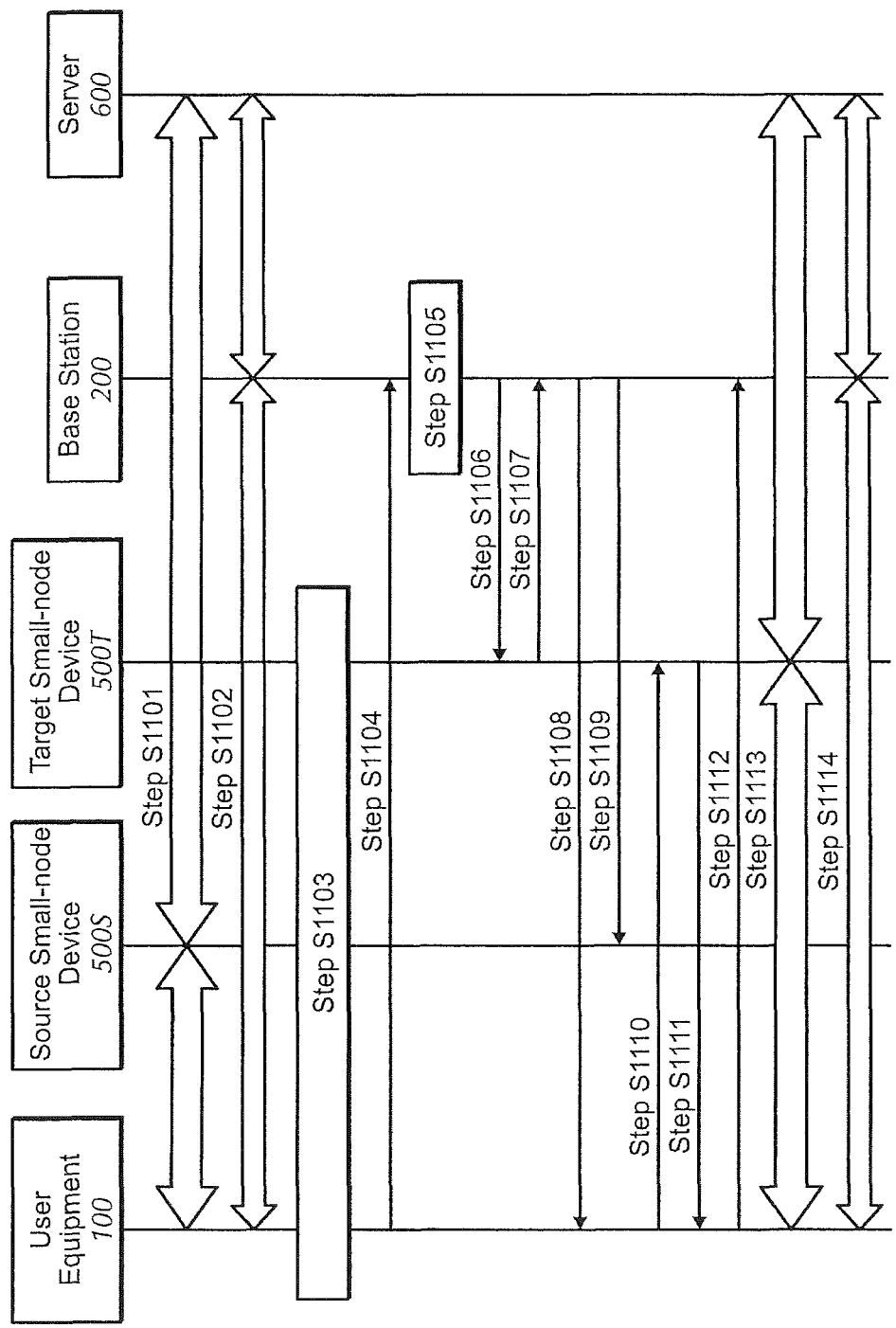
FIG. 17 is a figure showing operations in the radio communication system according to one or more embodiments of the present disclosure.

Referring to FIG. 17, an operation of the mobile communication system according to one or more embodiments of the present invention is described.

As shown in FIG. 17, in the step S1101, some parts of the traffic data are transferred between the user equipment 100 and the server 600 via the D2UE connection 710 and the source small-node device 500. In the step S1102, some parts of the traffic data are transferred between the user equipment 100 and the server 600 via the BS2UE connection 720 and the base station 200. The steps S1101 and S1102 may be the same as the steps S805 and S806, respectively, i.e. the steps S1101 and S1102 may be a continuation of the steps S805 and S806.

In the step S1103, the user equipment 100 makes measurements for the D2UE connection, as described below. That is, the user equipment 100 makes measurements for the DL radio link quality of the serving small-node device and the neighbor small-node device. The DL radio link quality may be at least one of pilot signal received power, path loss, signal-to-interference ratio (SIR), channel state information, channel quality indicator, received signal strength indicator, and the like.

Figure 17A:
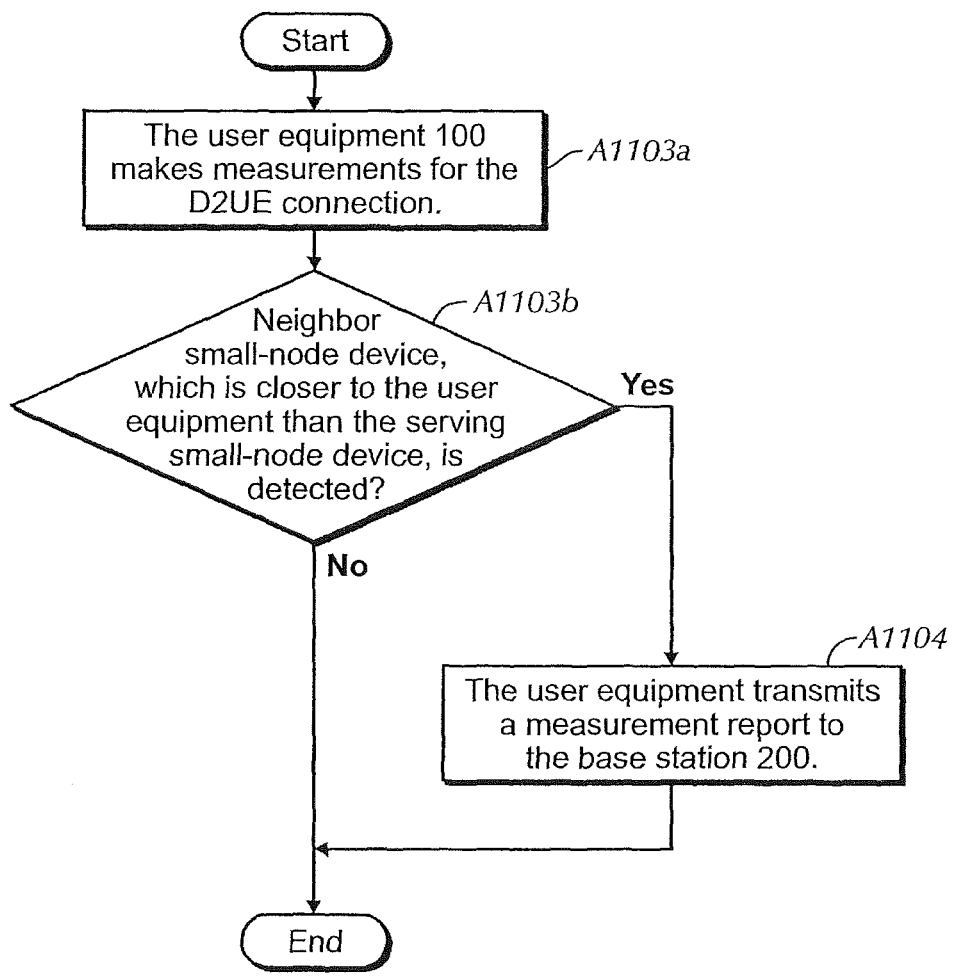
FIG. 17A is a flowchart showing operations in the radio communication system according to one or more embodiments of the present disclosure.

More specifically, the user equipment 100 determines whether or not the neighbor small-node device, which is closer to the user equipment 100 than the serving small-node device, is detected, and transmits to the base station a measurement report if the neighbor small-node device is detected, as illustrated in FIG. 17A.

That is, the user equipment 100 makes measurements for the D2UE connection in the step A1103a.

In the step A1103b, the user equipment 100 determines whether or not the neighbor small-node device, which is closer to the user equipment 100 than the serving small-node device, is detected. The serving small-node device means the small-node device (the source small-node device 500), which is currently communicating with the user equipment 100. More specifically, the radio link quality of the neighbor small-node device is higher than that of the serving small-node device, it may be determined that the neighbor small-node device is closer to the user equipment 100 than the serving small-node device.

In a case where the neighbor small-node device, which is closer to the user equipment than the serving small-node device, is detected (step A1103b: YES), the user equipment 100 transmits a measurement report to the base station 200 so as to notify the base station that the neighbor small-node device is detected. The step A1103b corresponds to the step S1104 in FIG. 17.

In a case where the neighbor small-node device, which is closer to the user equipment than the serving small-node device, is not detected (step A1103b: NO), the user equipment 100 does not transmit the measurement report to the base station 200.

The steps A1103a and A1103b correspond to the step S1103 in FIG. 17.

In the step S1104, the user equipment 100 transmits a measurement report to the base station 200 so as to notify it that the neighbor small-node device, which is closer to the user equipment than the serving small-node device, is detected.

Hereinafter, the serving small-node device is called "Source small-node device" 500S and the neighbor small-node device is called "Target small-node device" 500T.

The base station 200 makes a decision that the user equipment 100 should handover to the neighbor small-node device (the target small-node device) in the step S1105.

In the step S1106, the base station 200 transmits control signaling to the target small-node device 500T for handover preparation. The control signaling may be called handover request for D2UE connection. More specifically, the base station 200 notifies it of parameters for the target small-node device to establish the D2UE connection with the user equipment 100. The parameters described in the step A804a may be included in the ones in the control signaling of the step S1108.

In the step S1107, the target small-node device 500T transmits acknowledgement of the control signaling of the step S1106.

In the step S1108, the base station 200 transmits control signaling to the user equipment 100 and orders for the user equipment 100 to make handover to the target small-node device 500T.

The control signaling may include connection information for the D2UE connection 710. More specifically, the connection information may include at least one of information on measurement configuration for the D2UE connection 710, information on mobility control for the D2UE connection 710, radio resource control information for the D2UE connection 710, and the like.

Furthermore, the radio resource control information for the D2UE connection 710 may include at least one of radio bearer information for the D2UE connection 710, information for PDCP layer configuration in the D2UE connection 710, information for RLC layer configuration in the D2UE connection 710, information for MAC layer configuration in the D2UE connection 710, information for physical layer configuration in the D2UE connection 710, and the like.

More specifically, the parameters described for the step A804c may be included in the radio resource control information for the D2UE connection 710.

In the step S1109, the base station 200 transmits control signaling to the source small-node device 500S and notifies it that the user equipment 100 should make handover to the target small-node device 500T. The source small-node device 500 ends the communications with the user equipment 100 based on the control signaling, i.e. the source small-node device releases the D2UE connection 710.

In the step S1110, the user equipment 100 transmits control signaling to establish a connection between the user equipment 100 and the target small-node device 500T. The control signaling may be a random access signaling. The control signaling may be the same as the one in the step A804c.

In the step S1111, the target small-node device 500T transmits acknowledgement of the control signaling transmitted in the step S1110. As a result, the D2UE connection can be established between the user equipment 100 and the target small-node device.

In the step S1112, the user equipment 100 transmits control signaling to the base station 200 and notifies the base station 200 that the handover to the target small-node device 500T has been successfully conducted.

In the steps S1113, some parts of the traffic data are transferred between the user equipment 100 and the server 600 via the D2UE connection 710 and the target small-node device 500T.

In the step S1114, some parts of the traffic data are transferred between the user equipment 100 and the server 600 via the BS2UE connection 720 and the base station 200. The step S1114 is the same as the step S1102. That is, the step (S1102 and S1114) may be continuously conducted during the procedures described in FIG. 17.

The operations shown in FIG. 17 may be described in terms of the operations in the source small-node device 500S as follows. The operations of the source small-node device 500S comprise transferring some parts of data, which are transferred between the user equipment 100 and the server 600, using the D2UE connection 710 (step S1101), receiving control signaling to notify the source small-node device 500S that the user equipment 100 should make handover to the target small-node device 500T, and ending the D2UE connection 710 with the user equipment 100.

The operations shown in FIG. 17 may be described in terms of the operations in the target source small-node device 500T in the following. The operations of the target small-node device 500T comprise receiving control signaling for handover preparation, which is transmitted by the base station 200 (step S1106), transmitting acknowledgement of the control signaling (step S1107), receiving control signaling to establish a connection between the user equipment 100 and the target small-node device 500 (step S1110), transmitting acknowledgement of the control signaling (step S1111), and transferring some parts of data, which are transferred between the user equipment 100 and the server 600, using the D2UE connection 710 (step S1113).

The operations shown in FIG. 17 may be described in terms of the operations in the user equipment 100 in the following. The operations of the user equipment 100 comprise transferring some parts of data, which are transferred between the user equipment 100 and the server 600, using the D2UE connection 710 with the source small-node device (step S1101), transferring some parts of data, which are transferred between the user equipment 100 and the server 600, using the BS2UE connection 720 (step S1102), making measurements for the D2UE connection (step S1103), transmitting a measurement report to the base station 200 (step S1104), receiving control signaling which orders the user equipment 100 to make the handover to the target small-node device 500T (step S1108), transmitting control signaling to establish a connection between the user equipment 100 and the target small-node device 500T (step S1110), transmitting control signaling to the base station 200 to notify the base station 200 that the handover to the target small-node device 500T has been successfully conducted (step S1112), receiving acknowledgement of the control signaling (step S1111), transferring some parts of data, which are transferred between the user equipment 100 and the server 600, using the D2UE connection 710 with the target small-node device 500T (step S1113), and transferring some parts of data, which are transferred between the user equipment 100 and the server 600, using the BS2UE connection 720 (step S1114). It is noted that the step S1102 is the same as the step S1114, and this procedure may be continuously conducted during all the steps.

The operations shown in FIG. 17 may be described in terms of the operations in the base station 200 in the following. The operations of the base station 200 comprise transferring some parts of data, which are transferred between the user equipment 100 and the server 600, using the BS2UE connection 720 (step S1002), receiving a measurement report transmitted by the user equipment 100 (step S1104), making a decision that the user equipment 100 should handover to the target small-node device 500T (step S1105), transmitting control signaling to the target small-node device 500T for handover preparation (step S1106), receiving acknowledgement of the control signaling (step S1107), transmitting control signaling to the user equipment 100 to order for the user equipment 100 to make the handover to the target small-node device 500T, transmitting control signaling to the source small-node device 500S to notify it that the user equipment 100 should make the handover to the target small-node device 500T, receiving control signaling to notify the base station 200 that the handover to the target small-node device 500T has been successfully conducted (step S1112), and transferring some parts of data, which are transferred between the user equipment 100 and the server 600, using the BS2UE connection 720 (step S1114).

Figure 18:
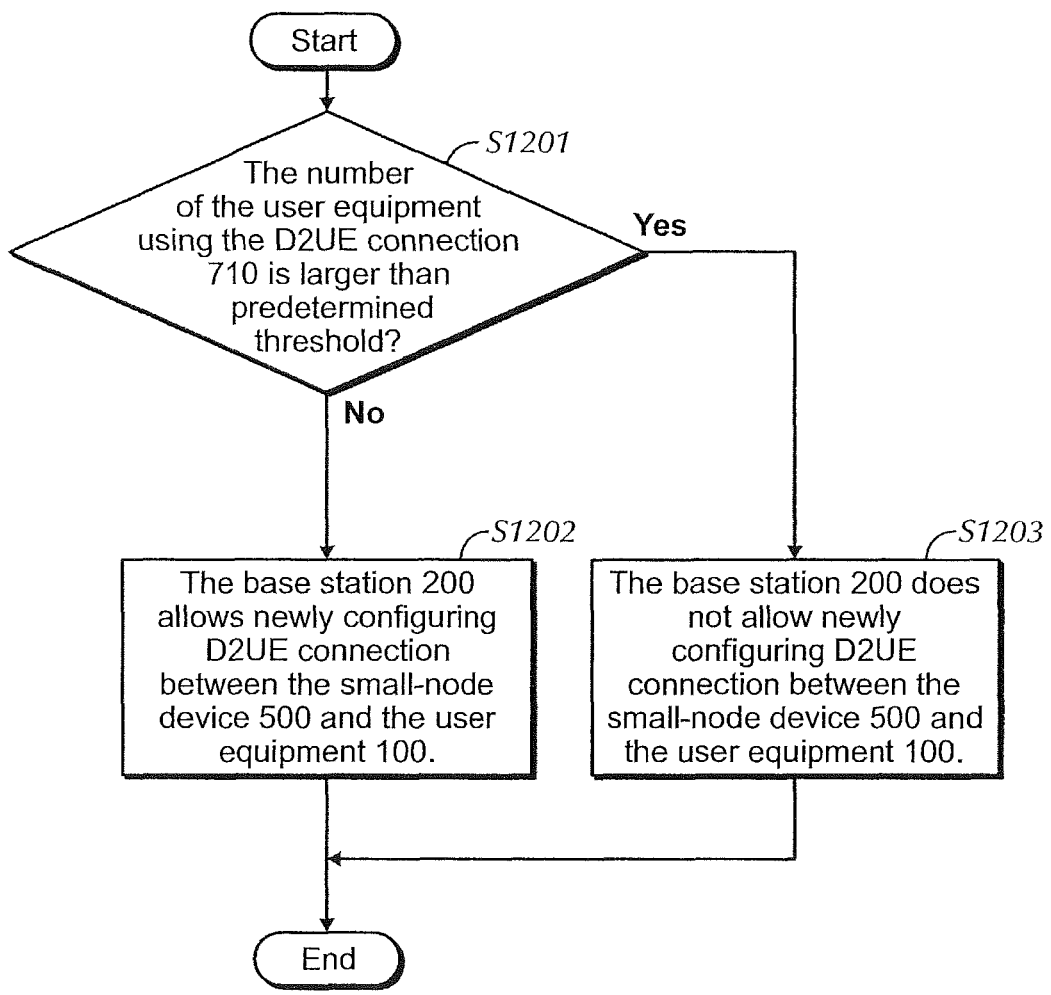
FIG. 18 is a flowchart showing operations in the radio communication system according to one or more embodiments of the present disclosure.

Referring to FIG. 18, an operation of the base station 200 according to one or more embodiments of the present invention is described. The control method described in FIG. 18 is one example of the radio resource control or call admission control for the D2UE connection 710 in one or more embodiments of the present invention.

In the step S1201, the base station 200 determines whether or not the number of the user equipment using the D2UE connection 710 is larger than predetermined threshold.

Alternatively, the base station 200 may define congestion level, which may be determined based on at least one of the number of active user equipment, the number of the D2UE connections, amount of traffic data, interference level in the frequency band, where the D2UE communications operate, and the like, and may determine whether or not the congestion level is higher than predetermined threshold. In other words, the base station 200 may determine whether or not the congestion level is high in the cell in the step S1201.

In a case where the number of the user equipment is not larger than the predetermined threshold (step S1201: NO), the base station 200 allows newly configuring D2UE connection between the small-node device 500 and the user equipment 100 in the step S1202. More specifically, when a traffic data occurs similarly to the step S801 and the user equipment 100 tries to configure a new BS2UE connection with the base station 200 and a new D2UE connection with the small-node device 500, the base station 200 allows configuring the new D2UE connection with the small-node device 500, in addition to the new BS2UE connection with the base station 200. Alternatively, when the user equipment 100 tries to configure a new D2UE connection with the small-node device in a state wherein the user equipment 100 has a BS2UE connection with the base station 200, the base station 200 may allow the new D2UE connection with the small-node device 500.

In a case where the number of the user equipment is larger than the predetermined threshold (step S1201: YES), the base station 200 does not allow newly configuring D2UE connection between the small-node device 500 and the user equipment 100 in the step S1203. More specifically, when a traffic data occurs similarly to the step S801 and the user equipment 100 tries to configure a new BS2UE connection with the base station 200 and a new D2UE connection with the small-node device 500, the base station 200 does not allow configuring the new D2UE connection with the small-node device 500. Here, the base station 200 may allow configuring the new BS2UE connection with the base station 200, but may not allow only the new D2UE connection with the small-node device 500. Alternatively, when the user equipment 100 tries to configure a new D2UE connection with the small-node device in a state wherein the user equipment 100 has a BS2UE connection with the base station 200, the base station 200 may not allow the new D2UE connection with the small-node device 500.

In the above examples, the small-node device 500 has one D2UE connection with one user equipment 100, but it may have more than one D2UE connections with more than one user equipment, similarly to normal base station. The radio resource for each D2UE connection may be shared by the multiple user equipment and may be controlled by the base station 200 or the small-node device 500.

In the above examples, D2UE (the D2UE connection 710) and BS2UE (the BS2UE connection 720) transmissions can operate in different frequency bands, but in other embodiments D2UE may operate concurrently in the same frequency band as the Macro system (BS2UE). In this scenario, some interference mitigation techniques may be utilized in order to achieve co-existence between D2UE and BS2UE in the same frequency band.

For example, according to one or more embodiments of the present disclosure, because the base station 200 configures the D2UE connection 710, the base station 200 is aware that the user equipment 100 will not respond to signaling by the base-station in various frequency/time slots. In some such embodiments the D2UE connection 710 is configured so as to allow transmission slots where BS2UE (the base station 200 to the user equipment 100) communications can be made in order to support continued connection and management by the base station 200. In other words, the user equipment 100 can communicate with the base station 200 in predetermined on-duration, and the user equipment 100 can communicate with the small-node device 500 in the other duration (off-duration).

Alternatively, in other embodiments where the D2UE connection 710 in support of the small-node device 500 to the user equipment 100 communication link occur concurrently in the same band as with transmission of the base station 200, OFDM Resource Elements (RE) in various resource blocks (RBs) are reserved for each link. In one embodiment REs used for control signaling are not used by the D2UE link and thus are left blank in any D2UE link transmission. D2UE link transmissions, including its own control signaling to the user equipment 100, are sent in other REs. In such an embodiment the user equipment 100 is in fact able to receive REs, e.g. control REs, from the base station 200 concurrently with communication from the small-node device 500. The base station may turn off transmissions or reduce transmission power in the BS2UE link in the radio resource, in which transmissions in the D2UE link may occur. The radio resource may be time domain resource or frequency domain resource.

In at least one of the above embodiments, the D2UE link may be similar to normal BS2UE link, i.e. the small-node device 500 may transmit common pilot signals, broadcast signals, synchronization signals, physical layer control signaling and the like. Alternatively, some parts of the signals and channels may be transmitted and others may not be transmitted in the D2UE link. For example, according to one or more embodiments of the present disclosure, common pilot signals and physical layer control signaling may be transmitted in the D2UE link, and other channels and signals, such as broadcast channels/signals, synchronization signals and the like, may not be transmitted in the D2UE link. Alternatively, common pilot signals may be transmitted in the D2UE link, and other channels and signals, such as physical layer control signaling, broadcast channels/signals, synchronization signals and the like, may not be transmitted in the D2UE link. Alternatively, only infrequently-transmitted pilot or synchronization signals may be transmitted in the D2UE link, and other channels and signals, such as common pilot signals, physical layer control signaling, broadcast channels/signals, conventional synchronization signals and the like, may not be transmitted in the D2UE link.

Alternatively, the D2UE link may be a device-to-device (D2D) link. In such a scenario, most of the common signals/channels, such as common pilot signals, broadcast signals, synchronization signals, physical layer control signaling and the like, can be omitted in the D2UE link, and only channels transferring data may be transmitted in the D2UE link. Alternatively, some of channels/signals, such as infrequently-transmitted pilot or synchronization signals and physical layer control signaling and the like, may be transmitted in the D2UE link even in this scenario.

Irrespective of whether the D2UE link is similar to the normal BS2UE link or to the D2D link, the D2UE link may be based on LTE-based radio interface, or may be based on other radio system-based interface. For example, according to one or more embodiments of the present disclosure, the D2UE link may be based on WCDMA or CDMA2000 or WiFi or WiMAX or LTE advanced or TD-SCDMA or TD-LTE.

For example, according to one or more embodiments of the present disclosure, the D2UE connection 710 may be specified based on a WiFi-based radio interface. In this example, a WiFi access point may be regarded as the small-node device 500. That is, the D2UE communication section 504 in the small-node device 500 communicates with the user equipment 100 utilizing the WiFi radio interface, and the radio resource control of the WiFi radio interface may be controlled by the base station 200. The control signaling for the radio resource control may be transmitted in the BS2UE connection 720 and the BS2D connection 730.

Characteristics mentioned above may be described as follows. One of the characteristics in one or more embodiments of the present invention is a mobile station in a mobile communication system, in which a mobile station communicates with a server, and the mobile station comprises a 1st communication unit configured to communicate with the radio base station, a 2nd communication unit configured to communicate with a device. The 1st communication unit is configured to transfer some parts of data, which are transferred between the mobile station and the server, via the radio base station, and the 2nd communication unit is configured to transfer parts of data, which are transferred between the mobile station and the server, via the device.

In the above mentioned mobile station, the 1st communication unit is configured to receive and transmit control signals from and to the radio base station, which control the communication with the device.

In the above mentioned device, the 2nd communication unit is configured to communicate with the device based on parameters signaled by the radio base station. Here, the parameters may indicate time domain resource for the communication with the device.

In the above mentioned mobile station, the 2nd communication unit is configured to offload the data, which is transferred between the mobile station and the server, via the device.

In the above mentioned device, a 1st frequency for communicating with the radio base station is different from a 2nd frequency for communicating with the device.

In the above mentioned device, the 1st communication unit and the 2nd communication unit are configured to conduct communications simultaneously utilizing functions with which the mobile station can transmit/receive signals in different frequency bands simultaneously.

In the above mentioned device, the 1st communication unit and the 2nd communication unit are configured to conduct communications simultaneously in time division multiplexed manner.

One of the characteristics in one or more embodiments of the present invention is a device in a mobile communication system, in which a mobile station communicates with a server via a radio base station or the device, and the device comprises a 1st communication unit configured to communicate with the radio base station, a 2nd communication unit configured to communicate with the mobile station, and a backhaul unit configured to communicate with the server. The 1st communication unit may be configured to receive and transmit control signals from and to the radio base station, which control the communication between the mobile station and the device. The 2nd communication unit is configured to receive some of data which is transferred from the mobile station to the server, and the backhaul unit is configured to transmit it to the server, and the backhaul unit is configured to receive data which is transferred from the server to the mobile station, and the 2nd communication unit is configured to transmit it to the mobile station.

In the above mentioned device, the 2nd communication unit and the backhaul unit are configured to offload the data, which is transferred between the mobile station and the server.

One of the characteristics in one or more embodiments of the present invention is a radio base station in a mobile communication system, in which a mobile station communicates with a server, and the radio base station comprises a 1st communication unit configured to communicate with the mobile station, a 2nd communication unit configured to communicate with a device, and a control unit configured to control the communication between the mobile station and the device. Parts of data, which is transferred between the mobile station and the server, are transferred via the device.

In the above mentioned radio base station, the 1st communication unit is configured to receive and transmit control signals from and to the mobile station, which control the communication between the mobile station and the device.

In the above mentioned radio base station, the 2nd communication unit is configured to receive and transmit control signals from and to the device, which control the communication between the mobile station and the device.

In the above mentioned radio base station, the device is configured to offload the data, which is transferred between the mobile station and the server.

One of the characteristics in one or more embodiments of the present invention is a communication method of a mobile station in a mobile communication system, in which a mobile station communicates with a server, the method comprising the steps:

(step B1) Communicating with the radio base station
(step B2) Communicating with a device
In step B2, parts of data, which is transferred between the server and the mobile station, are transferred via the device.

One of the characteristics in one or more embodiments of the present invention is a communication method of a device in a mobile communication system, in which a mobile station communicates with a server, the method comprising the steps:

(step A1) Communicating with the radio base station
(step A2) Communicating with the mobile station
(step A3) Communicating with the server
In step A1, control signaling for the communication with the mobile station is transmitted. In the step A2 and A3, parts of data, which is transferred between the server and the mobile station, are transferred via the device.

One of the characteristics in one or more embodiments of the present invention is a communication method of a radio base station in a mobile communication system, in which a mobile station communicates with a server via a radio base station, the method comprising the steps:

(step C1) Communicating with the mobile station
(step C2) Communicating with a device
(step C3) Controlling the communication between the mobile station and the device, and in step C1/C2/C3 parts of data, which is transferred between the server and the mobile station, are transferred via the device.

Some more embodiments for mobility procedures and radio resource managements of the invention, such as cell identification, measurements, handover, cell selection/reselection, changing transport formats, call admission control, radio resource control, link adaptation control, power control, releasing connections and the like, are explained in the following. The following procedures are more detailed examples for the above mentioned RRC connection state control for the D2UE connection 710.

In mobile communication systems, mobility procedures, such as cell identification, measurements, handover, cell selection/reselection and the like, are quite important, because mobile communication connectivity should be maintained even when a mobile station (user equipment) moves from one cell to other cells. Here it should be noted that if the mobile station tries to detect neighbor cells and make measurements for the detected neighbor cells very frequently, the connectivity is improved, but battery consumption of the mobile station increases, which degrades service quality in the mobile communication system. That is, the mobile station has to minimize the battery consumptions due to the mobility procedures, simultaneously with achieving good quality mobility performance.

Furthermore, the mobility procedures are quite important also in terms of interference in the mobile communication systems. That is, it is also quite important that the mobile station communicate with a base station with the highest radio link quality. The radio link quality is equivalent to at least one of path loss, pilot signal received power, signal-to-interference ration and the like. If the mobile station does not communicate with the base station with the highest link quality, i.e. it communicates with the second highest quality base station, it may interfere with other communications because its transmit power may be too high for other radio links, as illustrated in FIG. 19.

Figure 19:
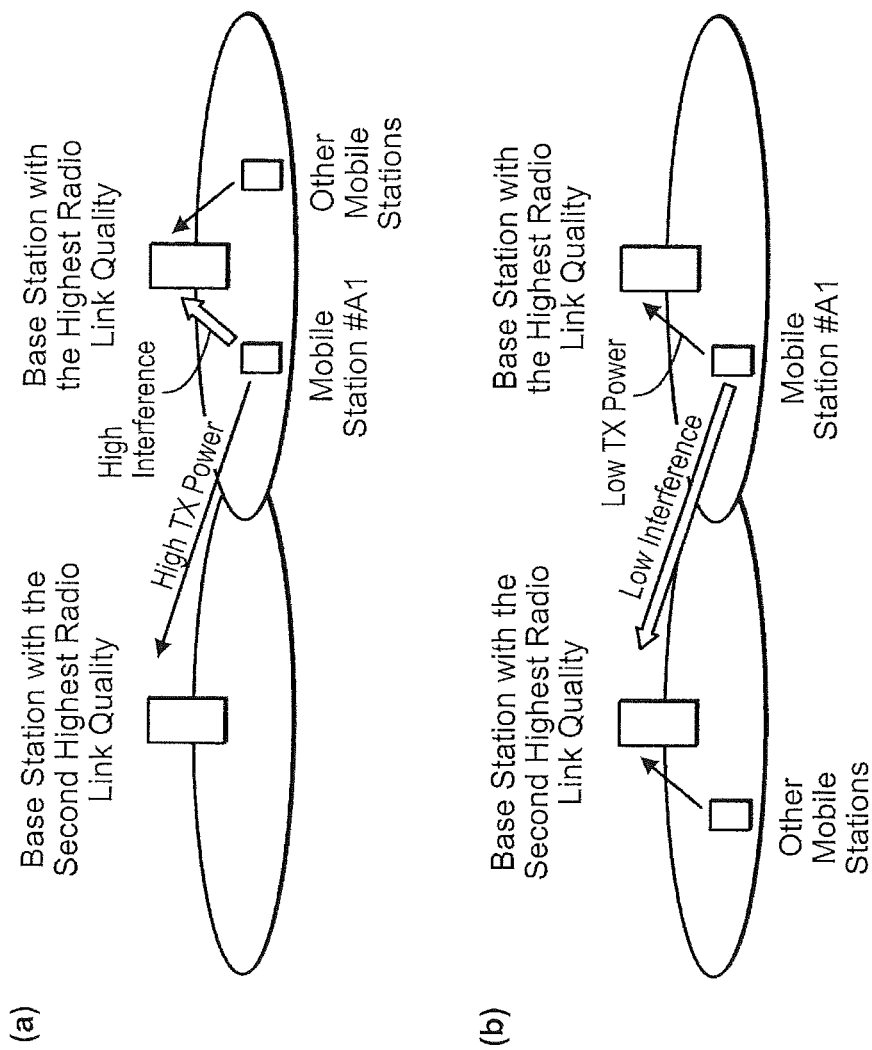
FIG. 19 is an explanatory view showing interference due to bad mobility behaviors according to one or more embodiments of the present disclosure.

In FIG. 19 (a), the mobile station #A1 communicates with the base station with the second highest radio link quality, instead of the base station with the highest radio link quality. As a result, signals transmitted by the mobile station #A1 may interfere with the communication between the base station with the highest radio link quality and other mobile stations. In FIG. 19 (b), however, the mobile station #A1 communicates with the base station with the highest radio link quality, and therefore the signals transmitted by the mobile station #A1 may not interfere with other communications.

The interference may be intra-frequency interference, or may be inter-frequency interference. In the inter-frequency interference case, adjacent channel interference in the transmitter side or receiver blocking characteristics in the receiver side may degrade the quality in other communications.

The interference issues may be handled by not only the mobility procedures, but also other radio resource management procedures.

In short, the mobility procedures and other radio resource management procedures should be appropriately conducted in the mobile communication systems in order to achieve good quality connectivity, long battery life in the mobile stations, less interference in the systems and the like.

In the above mentioned hybrid D2UE and BS2UE system, such mobility procedures and radio resource management procedures are conducted in the D2UE link, in addition to the Macro2UE link. It is noted that because the cell size in the D2UE link is small, mobility performance can be more easily degraded and interference issues can happen more frequently. Therefore, the above mobility procedures and other radio resource management procedures are quite important for the D2UE link. More details of the mobility procedures and other radio resource management procedures in the D2UE link are explained below:

In the following examples, it is assumed that the carrier frequency in the D2UE connection 710 is 3.5 GHz, and the one in the BS2UE connection between the base station 200 and the user equipment 100 is 2 GHz, similarly to the above examples. It is noted that the frequency bands are just examples, and other frequency bands can be applicable in other embodiments.

Figure 20:
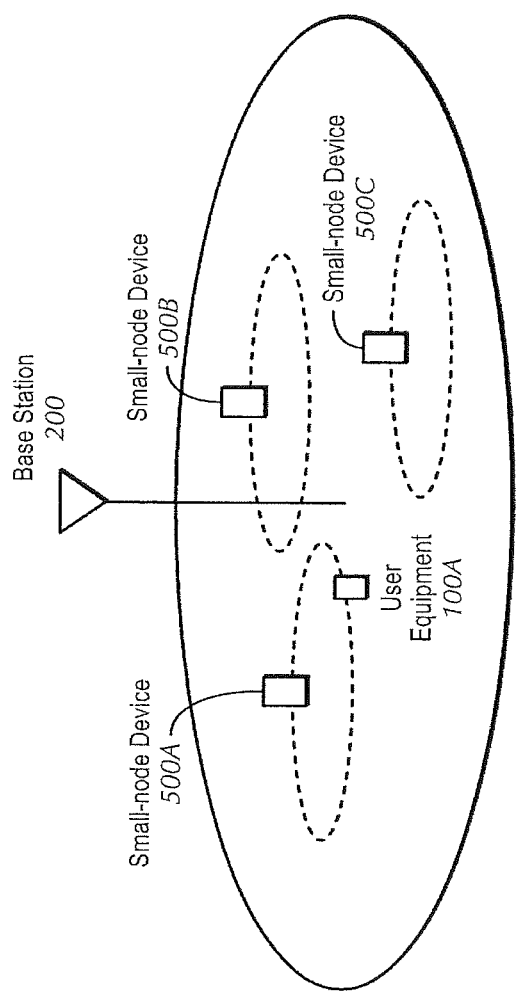
FIG. 20 is an explanatory view showing a communication system according to one or more embodiments of the present disclosure.

FIG. 20 illustrates the radio communication system according to at least one embodiment. It is basically the same as FIG. 1, but is slightly modified compared to FIG. 1 so that the mobility procedures and radio resource managements for the radio communication system can be illustrated. In FIG. 20, three small-node devices (500A, 500B, 500C) are shown for illustrative purpose.

Figure 21:
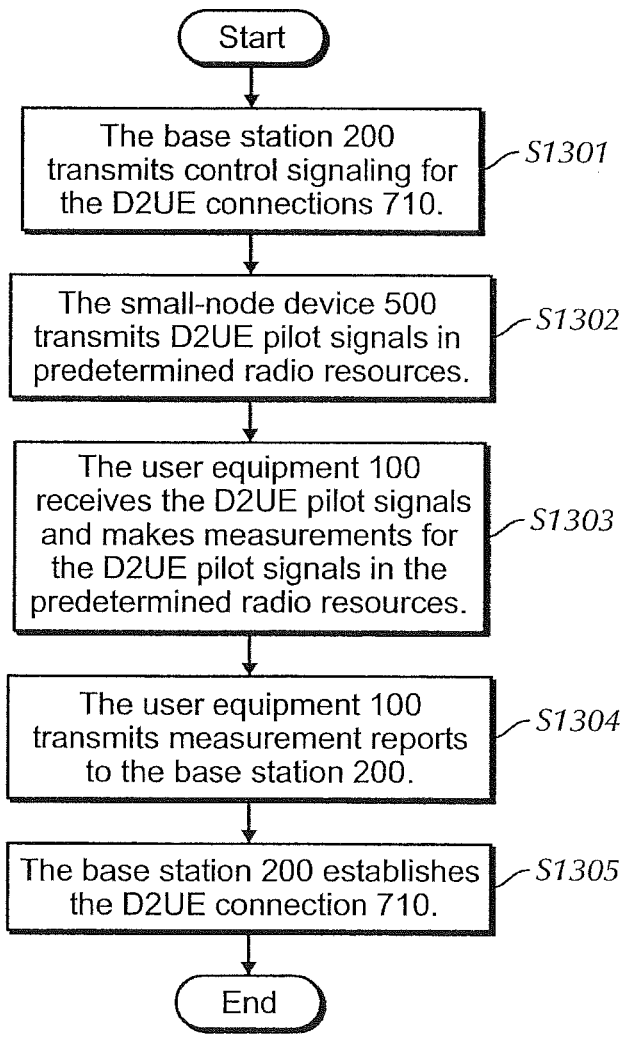
FIG. 21 is a flowchart showing operations in the radio communication system according to one or more embodiments of the present disclosure.

Referring to FIG. 21, an operation of the mobile communication system according to one or more embodiments of the present invention is described. The operation is related to connection establishment in the D2UE connection 710. The operation may correspond to details of steps S803 and S804 in FIG. 14 or steps A803a, A803b, A803c, A804a, A804b, A804c, A804d, A804e, and A804f in FIG. 14A.

In the step S1301, the base station 200 transmits control signaling for the D2UE connection 710 to the user equipment 100. The control signaling may be transmitted in the step A803a in FIG. 14A, instead of the step S1301. Alternatively, the control signaling may be transmitted as parts of broadcast information to the user equipment 100.

The control signaling may include at least one of information on frequency resource for D2UE pilot signals, information on time resource for the D2UE pilot signals, information on code resource for the D2UE pilot signals. Some examples for the D2UE pilot signals are explained later.

The control signaling may include information on transmission power for the D2UE pilot signals. That is, the transmission power for the D2UE pilot signals may be transmitted as one information element of the control signaling. Furthermore, the control signaling may include information on measurement behaviors in the user equipment 100.

In the step S1302, the small-node device 500 transmits the D2UE pilot signals in predetermined radio resources. More specifically, the small-node device 500A, 500B, 500C transmits the D2UE pilot signals in the predetermined radio resources. The radio resources may consist of at least one of time resource, code resource and frequency resource. The information on the predetermined radio resources may be signaled by the control signaling described in the step S1301. In this sense, "predetermined radio resources" correspond to the radio resource indicated by the base station 200.

Figure 22:
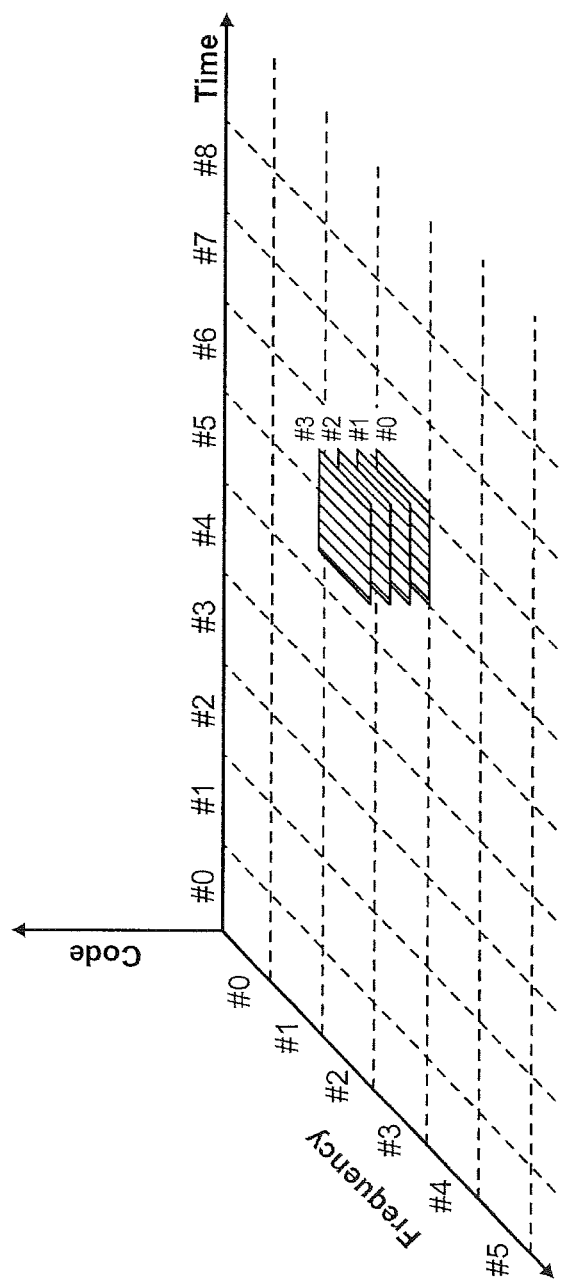
FIG. 22 is an explanatory view showing radio resource for the D2UE pilot signals according to one or more embodiments of the present disclosure.

More details of the D2UE pilot signals are explained below:

FIG. 22 illustrates one example of the radio resources for the D2UE pilot signals. In FIG. 22, the frequency resource #3 is assigned as frequency radio resource, and the time resource #6 is assigned as time radio resource. Furthermore, one code resource is assigned to one small-node device. For example, according to one or more embodiments of the present disclosure, the code resource #0, #1, and #2 may be assigned to the small-node device 500A, 500B, and 500C, respectively. The code resource may be combination of the CAZAC sequence (or Zadoff-Chu sequence) and cyclic shift, as shown below.

It is assumed that time synchronization is achieved for all the D2UE connections, i.e. time slots for all the D2UE connections are aligned with each other.

For the small-node device 500, the time synchronization may be achieved by GPS of each small-node device. Alternatively, the time synchronization may be achieved by the BS2D connections, that is, the time frame timing of the D2UE connections are based on the signals transmitted by the base station 200, and therefore the time frame timing of the D2UE connections are aligned with each other. Other time synchronization technique may be utilized in order to achieve the time synchronization for the D2UE connections. In any case, the time frame timing of the D2UE connections is specified so that the time frame timing of the D2UE connections should be time-synchronized with each other.

For the user equipment 100, the time synchronization may be achieved by the BS2UE connection 720, that is, the time frame timing of the D2UE connections are based on the signals transmitted by the base station 200, and therefore the time frame timing of the D2UE connections is aligned with each other. Other time synchronization technique may be utilized in order to achieve the time synchronization for the D2UE connections.

As a result, the time frame timing of the D2UE connections are time-synchronized with each other for both the small-node device 500 and the user equipment 100.

Figure 22A:
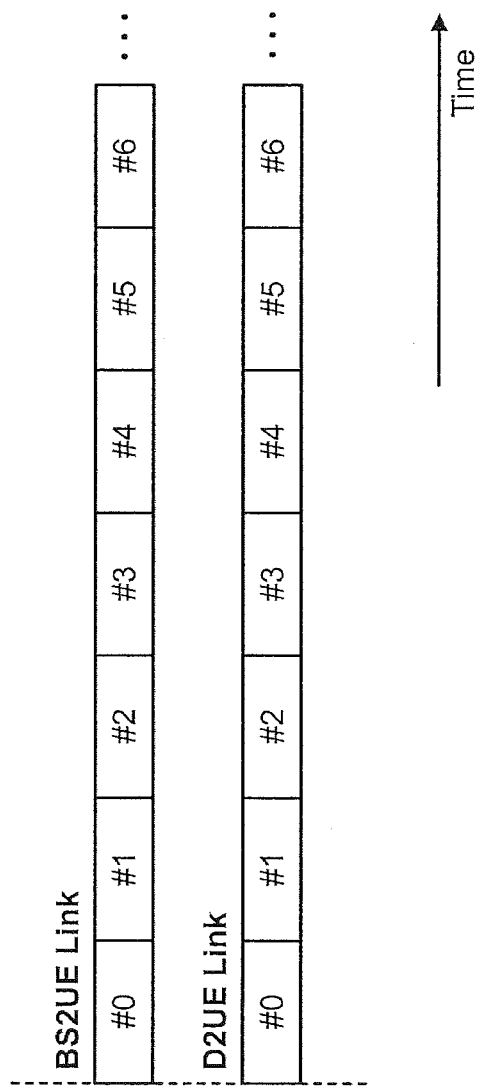
FIG. 22A is an explanatory view showing time synchronization between D2UE link and BS2UE link according to one or more embodiments of the present disclosure.
Figure 22B:
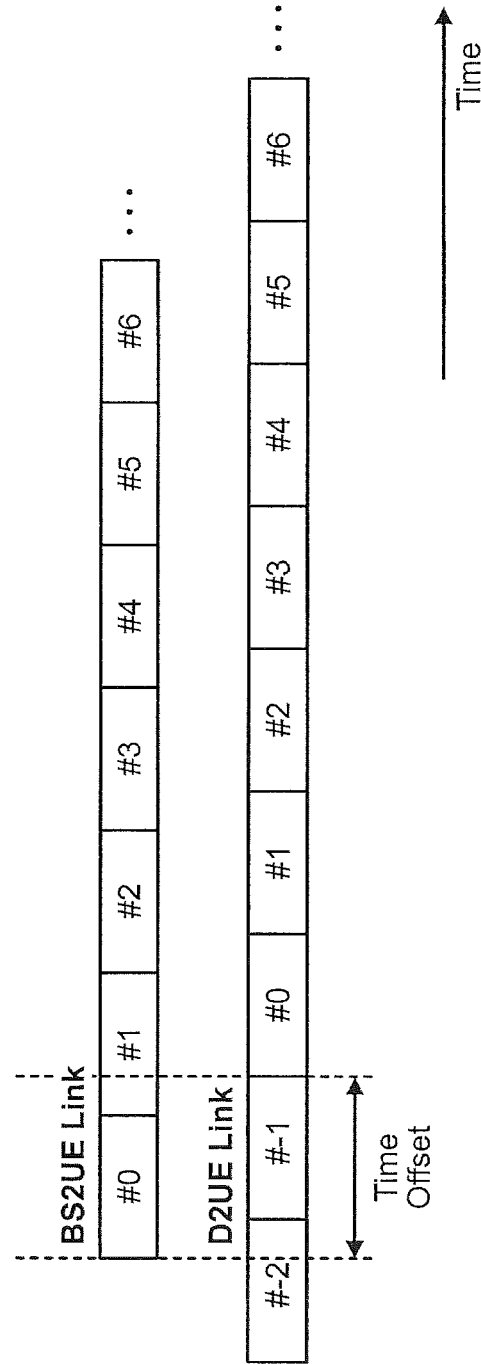
FIG. 22B is an explanatory view showing time synchronization between D2UE link and BS2UE link according to one or more embodiments of the present disclosure.

Time synchronization will be explained further below. For example, according to one or more embodiments of the present disclosure, as illustrated in FIG. 22A, the time slots for the D2UE connections may be completely aligned with those for the BS2UE connections. Alternatively, as illustrated in FIG. 22B, there may be a time offset between the time slots for the D2UE connections and the ones for the BS2UE connections.

Figure 22C:
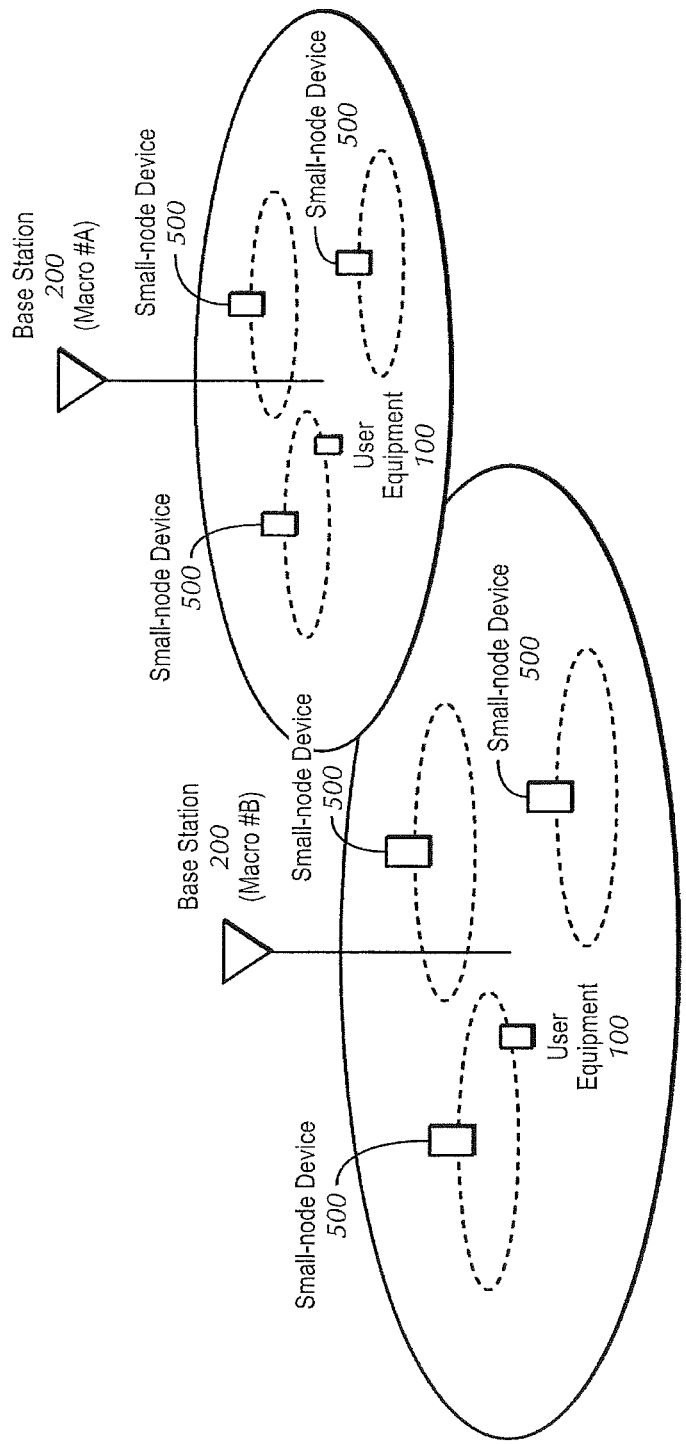
FIG. 22C is an explanatory view showing a communication system according to one or more embodiments of the present disclosure.
Figure 22D:
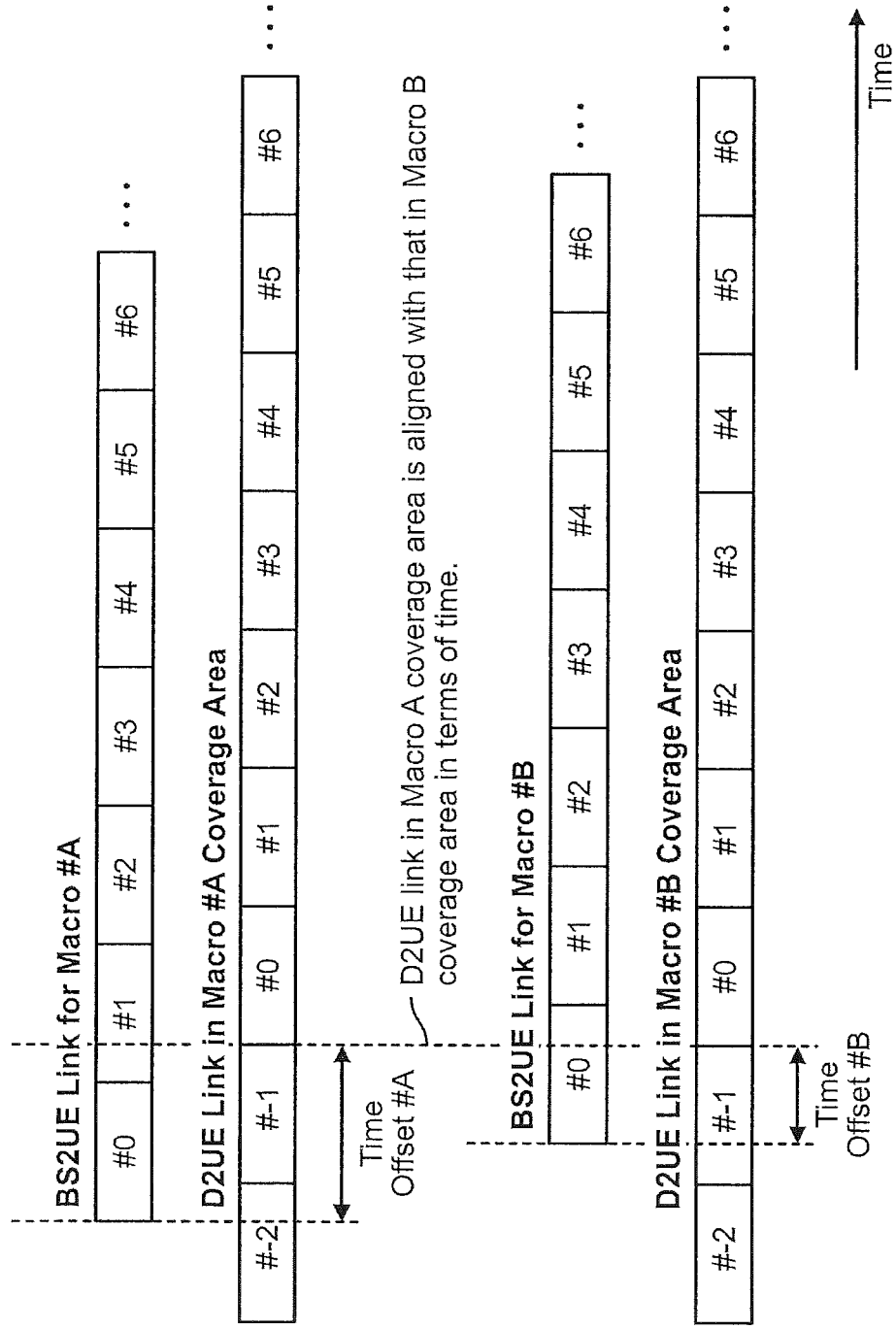
FIG. 22D is an explanatory view showing time synchronization between D2UE link and BS2UE link according to one or more embodiments of the present disclosure.

More specifically, as illustrated in FIGS. 22C and 22D, each time offset between the time slots for the D2UE connections and the ones for the BS2UE connections may be respectively specified for each macro (base station) coverage area, which corresponds to the area supported by each base station 200. FIG. 22C illustrates explanatory views showing two macro (base station) coverage areas, where some small-node devices are deployed. FIG. 22D illustrates explanatory views showing time relation of BSUE connections and D2UE connections. In FIG. 22D, time offset #A is specified for the macro (base station) #A coverage area, and time offset #B is specified for the macro (base station) #B coverage area. Each time offset can be specified so that all D2UE connections can be aligned with each other in terms of time. The base station 200 may inform the user equipment 100 of the time offset value (time offset #A or time offset #B in FIG. 22D) as part of control signaling. Furthermore, the base station 200 may inform the small-node device 500 of the time offset value (time offset #A or time offset #B in FIG. 22D) as part of control signaling. The time offset value may be included in the control signaling in the step S1301. As a result, even if there is no time synchronization for the macro (base station) network, i.e. Macro #A is not aligned with Macro #B in terms of time, D2UE connections in the macro #A coverage area can be aligned with those in the macro #B coverage area, as illustrated in FIG. 22D.

From a viewpoint of a receiver of the user equipment 100, the user equipment 100 has only to decode the D2UE pilot signals transmitted by multiple small-node devices only in the predetermined radio resource (the frequency resource #3 and the time resource #6), and therefore power consumptions for decoding the D2UE pilot signals can be minimized. More detailed examples, according to one or more embodiments of the present disclosure, are shown below. That is, the user equipment 100 does not have to achieve time synchronization with multiple small-node devices because it has already been achieved by the time synchronization with the BS2UE connections, as mentioned above. It can reduce complexity for the cell identification and as a result reduce the power consumption for the cell identification.

Figure 22E:
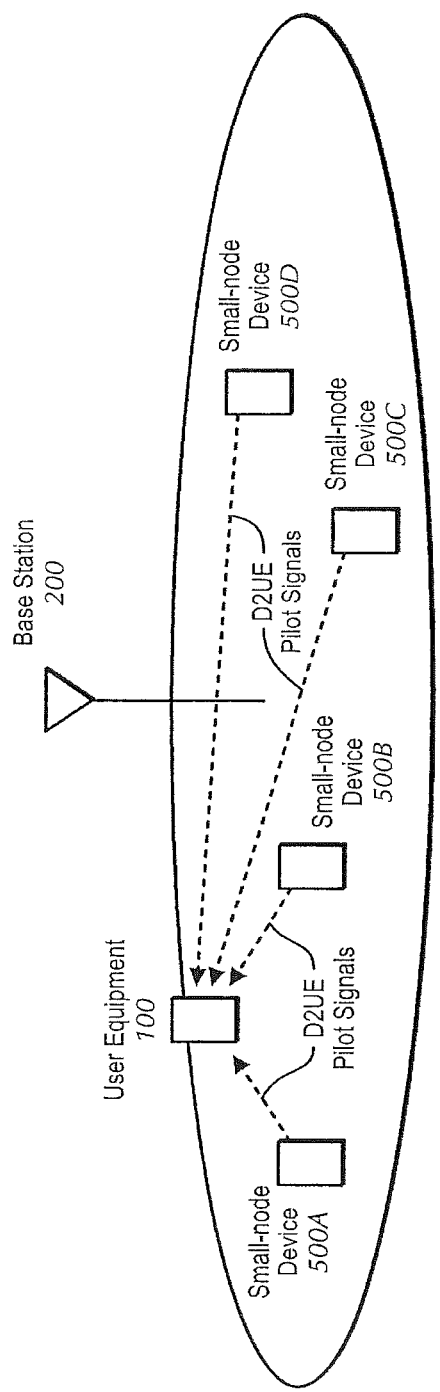
FIG. 22E is an explanatory view showing a communication system in which D2UE pilot signals are transmitted by small-node devices according to one or more embodiments of the present disclosure.

UE behavior for receiving the D2UE pilot signals are further explained below:

As illustrated in FIG. 22E, the small-node devices 500A, 500B, 500C and 500D transmit the D2UE pilot signals to the user equipment 100. As mentioned above, one time and frequency domain resource may be used for all the D2UE pilot signals and different code may be assigned to each pilot signal. For example, according to one or more embodiments of the present disclosure, the code resource #0, #1, #2, and #3 may be assigned to the small-node devices 500A, 500B, 500C and 500D, respectively.

Here, the CAZAC (Constant Amplitude Zero AutoCorrelation) sequence may be used for the code. Additionally, the Zadoff-Chu sequence may be used for the code. Alternatively, the Walsh sequence may be used for the code.

Figure 22F:
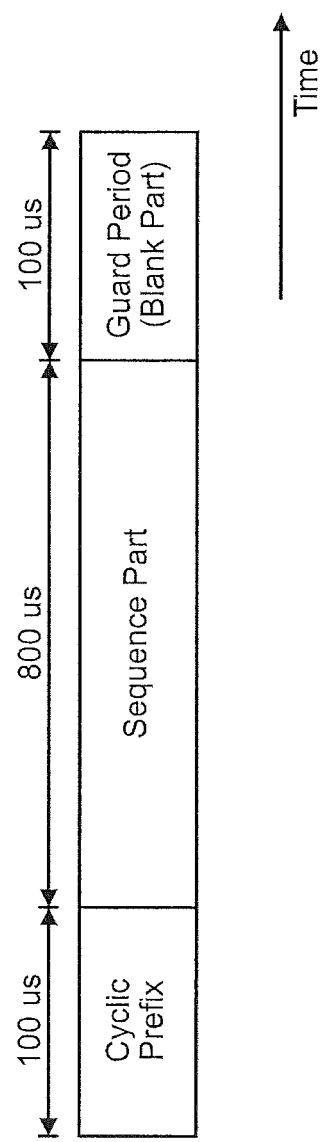
FIG. 22F is an explanatory view showing a physical layer format on the D2UE pilot signal according to one or more embodiments of the present disclosure.

More specifically, the pilot signal may have a physical layer format as illustrated in FIG. 22F. That is, it may consist of cyclic prefix, a sequence part, and a guard period. The guard period may be the same as blank. The above CAZAC sequence may apply to the sequence part.

Figure 22G:
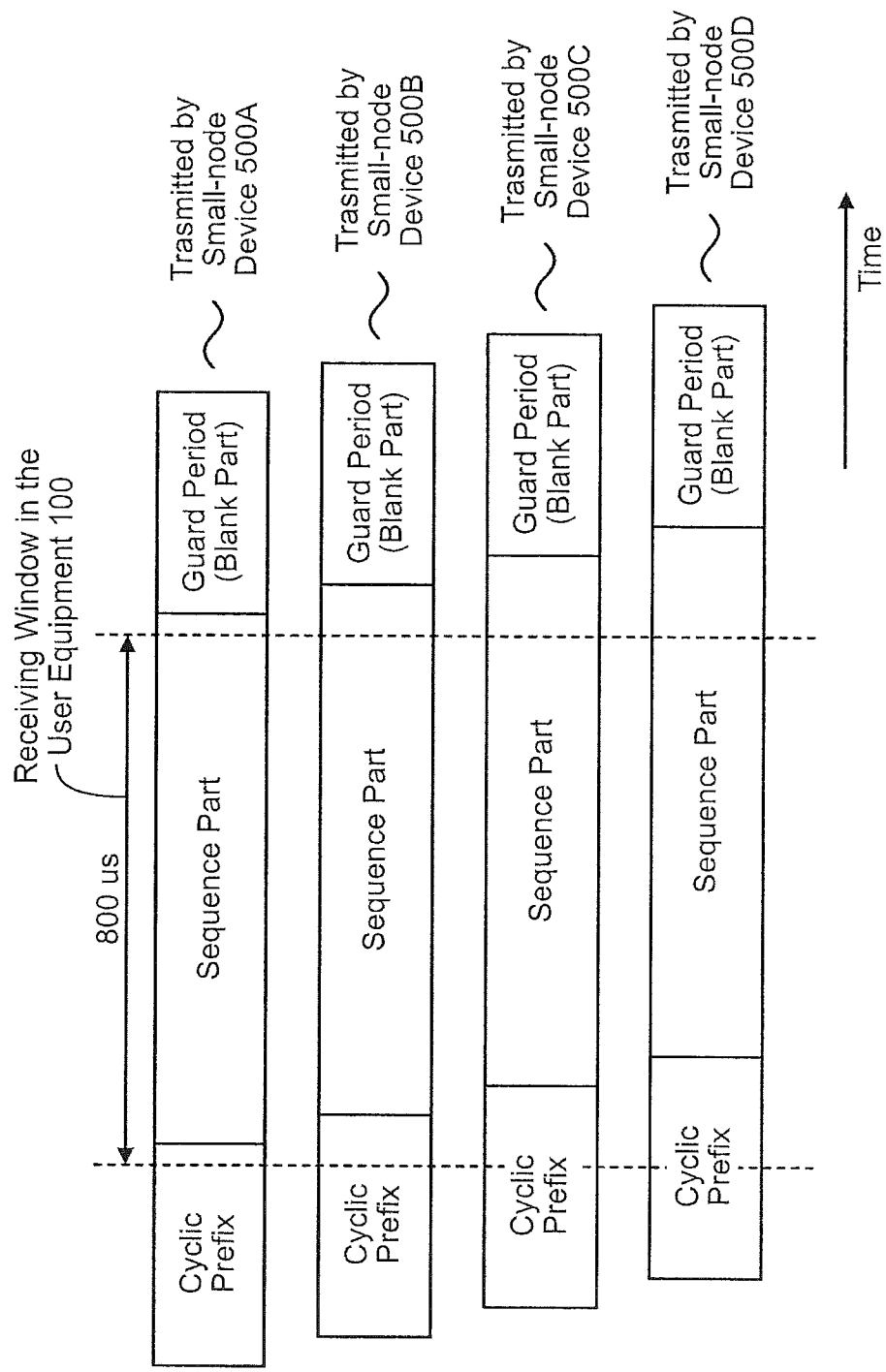
FIG. 22G is an explanatory view showing reception of the D2UE pilot signal in the user equipment 100 according to one or more embodiments of the present disclosure.
Figure 22H:
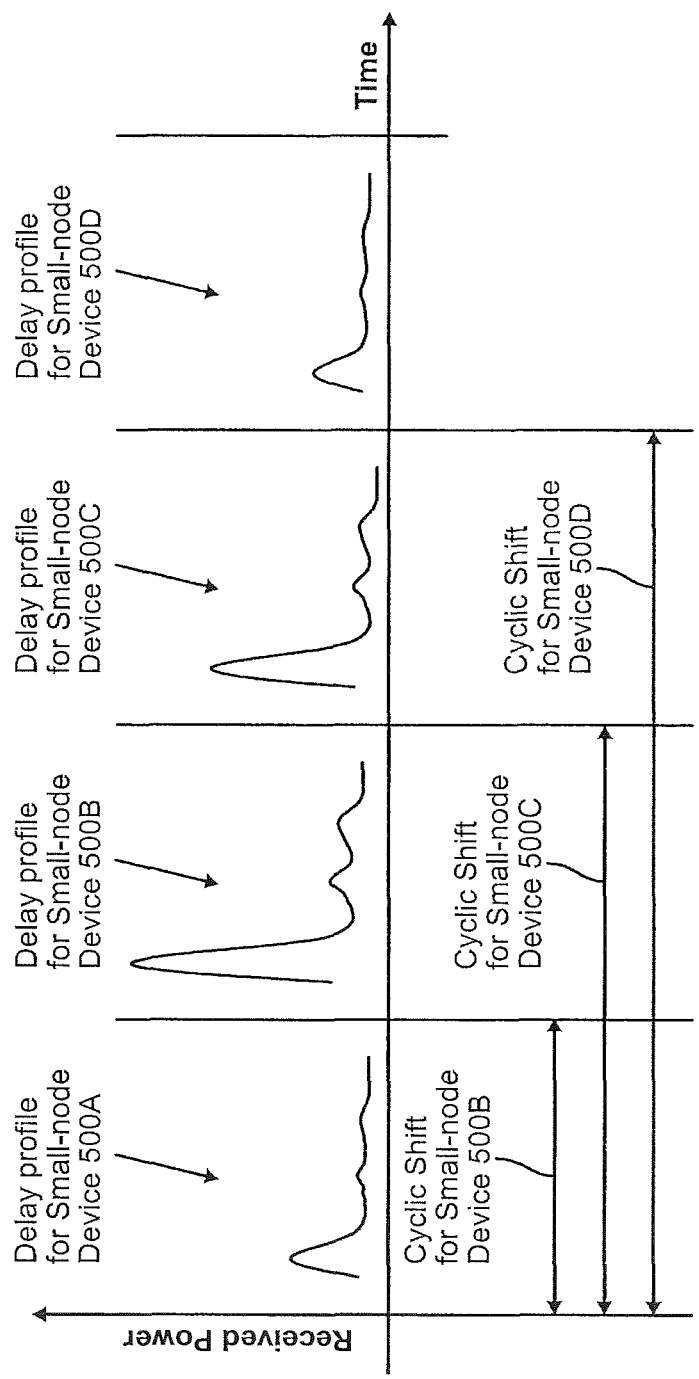
FIG. 22H is an explanatory view showing delay profile derived from the received D2UE pilot signal according to one or more embodiments of the present disclosure.

In this scenario, the user equipment 100 may have a receiving window as illustrated in FIG. 22G, and has only to decode the D2UE pilot signals transmitted by several small-node devices once. The user equipment 100 may obtain delay profiles for each D2UE pilot signal as illustrated in FIG. 22H. The delay profiles for each D2UE pilot signal may be shifted due to the cyclic shift of the Zadoff-Chu sequence, as illustrated in FIG. 22H. It is noted that the cyclic shift for the small-node device 500A is assumed to zero in the figure. As a result, the user equipment 100 can easily make measurements for delay and received power level of the D2UE pilot signal for each small-node device. As a result, UE complexity for cell search and measurements can be reduced.

The cyclic shift may be adjusted based on cell range of the small-node device 500. Alternatively, the cyclic shift may be adjusted based on cell range of the base station 200. In case the cell range is large, time difference among the D2UE pilot signals is large and therefore the cyclic shift may be set to large. On the other hand, in case the cell range is small, time difference among the D2UE pilot signals is small and therefore the cyclic shift may be set to small. The base station 200 may notify the user equipment 100 of the information of the cyclic shift for each small-node device using control signaling. More specifically, the information of the cyclic shift may be included in the control signaling in the step S1301. The base station 200 may notify the small-node device 500 of the information of the cyclic shift for the small-node device 500.

Physical random access channel (PRACH) or physical channel similar to PRACH may be used for the D2UE pilot signals. PRACH is defined as a LTE physical channel in TS 36.211. That is, the small-node device 500 transmits signals similar to a random-access-preamble in the predetermined radio resource. The random access preamble may be assigned dedicatedly to the small-node device 500 by the base station 200. That is, the radio resource for the signals may be assigned by the base station 200.

The D2UE pilot signals may be transmitted infrequently, as described above. For example, according to one or more embodiments of the present disclosure, the D2UE pilot signals may be transmitted once per 1 second. Because time synchronization is achieved by utilizing the BS2UE connections, the D2UE pilot signals do not have to be transmitted frequently. As a result, the user equipment 100 has only to decode the D2UE pilot signals once per 1 second, and the power consumptions for the measurements can be minimized. Furthermore, the D2UE pilot signals are transmitted much less frequently than the common reference signals or the synchronization signals in LTE, and therefore interference caused by the D2UE pilot signals can be minimized. The periodicity of the D2UE pilot signals may be very large, e.g. 1 second or 2 seconds, or may be reasonably large, e.g. 100 milliseconds or 200 milliseconds. In case that the periodicity is very large, the power consumption for measurements and the interference issues can be reduced significantly, but the user equipment 100 may need more time to detect neighbor small-node devices and make measurements for them because it needs some measurement samples to achieve good accuracy. As a result, latency of mobility procedures may be increased. In case that the periodicity is reasonably large, the power consumption for measurements and interference issues may be reduced to some extent, but the latency will be decreased. So, the periodicity of the D2UE pilot signals can be optimized based on the above aspects, such as power consumption for measurements, interference issues, latency of mobility procedures and the like. The periodicity of the D2UE pilot signals may be network configurable and the base station 200 may inform the user equipment 100 of the periodicity by utilizing control signal. It may be included in the control signaling in the step S1301. The base station 200 may inform the small-node device 500 of the periodicity by utilizing control signal.

In case that the user equipment 100 does not support multiple radio frequency components which support simultaneous transmission/reception for a frequency carrier for the BS2UE connection 720 and a frequency carrier for the D2UE connection 710, the user equipment 100 may stop transmitting/receiving signals in the BS2UE connection 720 during the time when the D2UE pilot signals are transmitted, so that it can make measurements for the D2UE connection 710. In this case, the base station 200 may consider such behaviors of the user equipment 100 in its scheduling for the BS2UE connection 720, i.e. the base station 200 may avoid assigning radio resource to the user equipment 100 during time when the D2UE pilot signals are transmitted.

The D2UE pilot signal may be called D2UE sounding reference signal or D2UE synchronization signal.

The D2UE pilot signal may be mapped distributed in the frequency domain so that signal strength fluctuation due to Rayleigh fading may be suppressed and more accurate measurements for the radio link quality may be achieved.

The base station 200 may notify the user equipment 100 of information on the D2UE pilot signal for each small-node device. The information may be included in the control signaling in the step S1301. Some examples, some of which are shown above, of the information are listed below:

Code domain resource for the D2UE pilot signal
For example, index of the Zadoff-Chu sequence
Frequency domain resource for the D2UE pilot signal
Time domain resource for the D2UE pilot signal
Time offset between the D2UE connection and the BS2UE connection
Transmission power of the D2UE pilot signal
Cyclic shift information of the D2UE pilot signal The above information is specified for each small-node device, and therefore may be included in the neighbor cell list for the small-node device. The above information may be signaled by broadcast information in the BS2UE connection or by dedicated signaling in the BS2UE connection.

In the above examples, according to one or more embodiments of the present disclosure, one time domain resource and frequency domain resource are specified as illustrated in FIG. 22. But, more than one time domain resource or frequency domain resource may be configured for the small-node device 500. Especially, in case that there are many small-node devices, the number of code-domain resource may not be sufficient and more than one time domain resource or frequency domain resource may be used.

In the step S1303, the user equipment 100 receives the D2UE pilot signals and makes measurements for the D2UE pilot signals in the predetermined radio resources. That is, the user equipment 100 decodes the D2UE pilot signals transmitted by multiple small-node devices 500 and make measurements for the multiple small-node devices. More specifically, the user equipment 100 obtains radio link quality of D2UE connections between itself and the multiple small-node devices. The radio link quality may be at least one of path loss, received power of the D2UE pilot signal, SIR of the D2UE pilot signal, received quality of the D2UE pilot signal and the like. The user equipment 100 may detect the small-node device which has the highest radio link quality based on the measurements.

The path loss may be derived from the received power of the D2UE pilot signals and the transmission power of the D2UE pilot signals, which are included in the control signaling in the step S1301. The received quality of the D2UE pilot signal may be the ratio of the receive power of the D2UE pilot signal to total received signal strength.

In the step S1304, the user equipment 100 transmits measurement reports to the base station 200. The measurement reports include the measurement results obtained in the step S1303.

More specifically, the measurement reports may include the information on the small-node device with the highest radio link quality. In other words, the user equipment 100 may report the best small-node device in terms of the radio link quality of D2UE connections in the step S1304. The information on the small-node device may include the identification number of the small-node device and the radio link quality of the small-node device.

Furthermore, the measurement report may include information on the small-node device with not-the-highest radio link quality, i.e. the measurement report may include information on the small-node device with the second or third highest radio link quality. The second or third may be an example, and the fourth or more may be included. It may be signaled by the base station 200 in the step S1301 for how many small-node devices the information should be included in the measurement report.

Alternatively the measurement reports may include the small-node device, for which the radio link quality is higher than a threshold. The threshold may be informed the user equipment 100 of by the base station 200 in the step S1301.

Alternatively the measurement reports may include the small-node device, for which the radio link quality is lower than a threshold. The threshold may be informed the user equipment 100 of by the base station 200 in the step S1301.

In the step S1305, the base station 200 establishes the D2UE connection 710. More specifically, the base station 200 establishes the radio link between the user equipment 100 and the small-node device with the highest radio link quality, which is reported in the step S1304.

In the step S1305, the base station 200 may assign the radio resource to the D2UE connection 710, in addition to establishing the radio resource. The radio resource may be at least one of the frequency domain resource, time domain resource, code domain resource, and the like. More specifically, the radio resource may be a carrier frequency for the D2UE connection 710. For example, according to one or more embodiments of the present disclosure, the base station 200 may select the radio resource, which is not used by the small-node device with the second or third highest radio link quality, which is reported in the step S1304. As a result, it can be avoided that the D2UE connection, which is establish in the step S1305, cause interference with other D2UE connections in the neighbor small-node devices. Alternatively, the base station 200 may assign the radio resource, which is not used by other small-node device 500, which is located near the small-node device with the highest radio link quality. The base station may have location information for the small-node device 500.

According to one or more embodiments as illustrated in FIG. 21, lower power consumptions for the measurements can be achieved. Furthermore, interference mitigation can also be realized.

Figure 23:
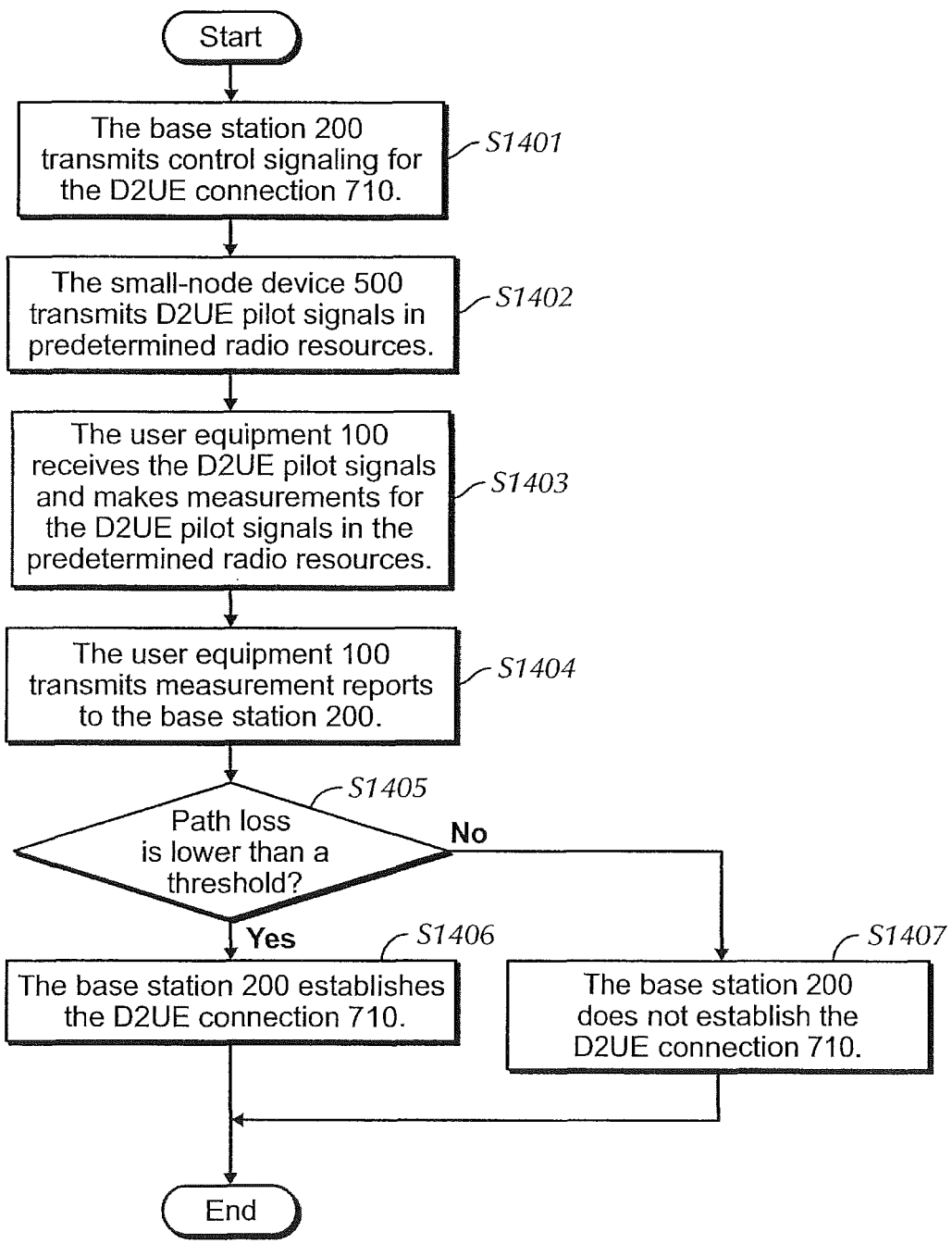
FIG. 23 is a flowchart showing operations in the radio communication system according to one or more embodiments of the present disclosure.

Referring to FIG. 23, an operation of the mobile communication system according to one or more embodiments of the present invention is described. The operation is related to connection establishment in the D2UE connection 710. The operation may correspond to details of step S804 in FIG. 14 or steps A803a, A803b, A803c, A804a, A804b, A804c, A804d, A804e, and A804f in FIG. 14A.

Because the steps S1401 to S1404 are the same as the steps S1301 to S1304 in FIG. 21, explanation of the steps S1401 to S1404 is omitted.

In the step S1405, the base station 200 determines whether or not path loss is lower than a threshold. More specifically, the base station 200 determines whether or not the path loss for the small-node device with the highest radio link quality is lower than the threshold.

In a case where the path loss for the small-node device with the highest radio link quality is lower than the threshold (Step S1405: YES), the base station 200 establishes the D2UE connection 710 in the step S1406. In the step S1406, the base station 200 may assign the radio resource to the D2UE connection 710, in addition to establishing the radio resource, similarly to the step S1305.

In a case where the path loss for the base station with the highest radio link quality is not lower than the threshold (Step S1405: NO), the base station 200 does not establish the D2UE connection 710 in the step S1407. That is, the base station 200 does not order for the user equipment 100 and the small-node device 500 to establish the D2UE connection 710, and as a result the user equipment 100 communicates with the server 600 only in the BS2UE connection 720.

Because the path loss is high and required transmission power is high, the D2UE connection may interfere with other D2UE connections or communications. Such interference issues can be mitigated by utilizing the control illustrated in FIG. 23.

In the step S1405, path loss is used for the determination, but other radio link quality, such as the received power of the D2UE pilot signal, the received quality of the D2UE pilot signal, the SIR of the D2UE pilot signal and the like. In this case, in case that the radio link quality is better than a threshold, the decision should be YES, and otherwise the decision should be NO in the step S1405.

Furthermore, not only the path loss for the small-node device with the highest radio link quality, but also the path loss for the one with the second or third highest radio link quality. More specifically, difference between the highest radio link quality and the second highest radio link quality may be utilized in the determination. That is, in a case where the difference is higher than a threshold, the base station 200 may establish the D2UE connection 710 (S1406), and in a case where the difference is not higher than the threshold, the base station 200 may not establish the D2UE connection 710 (S1407). If the difference is small, the D2UE connection may cause interference with other connections. Therefore, such interference issues may be mitigated by utilizing the above control. The above control may apply to a case where the small-node device with the second or third highest radio link quality has D2UE connections with other user equipment in the radio resources.

Figure 24:
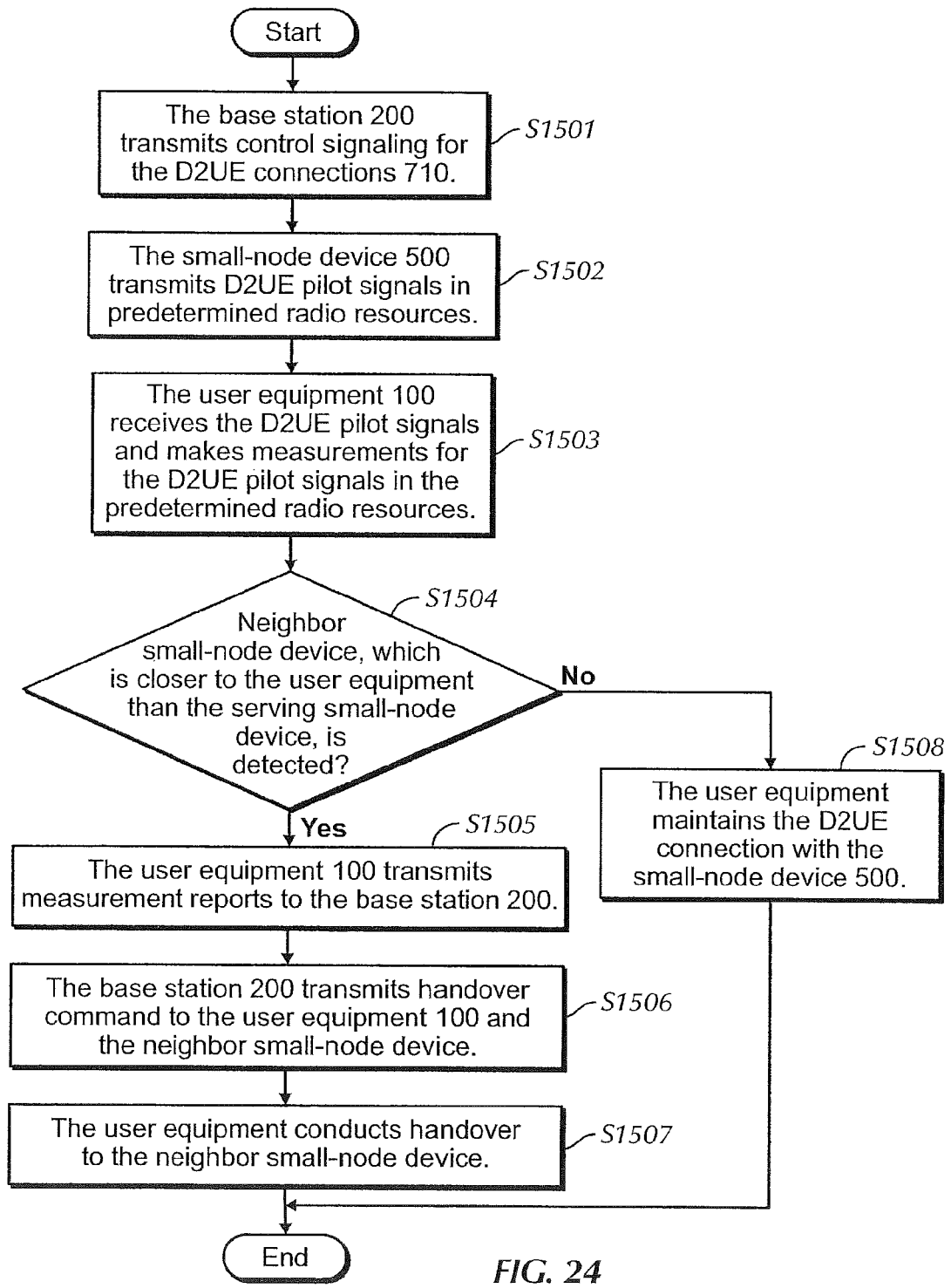
FIG. 24 is a flowchart showing operations in the radio communication system according to one or more embodiments of the present disclosure.

Referring to FIG. 24, an operation of the mobile communication system according to one or more embodiments of the present invention is described. The operation is related to mobility control in the D2UE connection 710. The operation may correspond to the step S1103 to S1112 in FIG. 16.

Because the steps S1501 to S1503 are almost the same as the steps S1301 to S1303. The only difference is that the steps S1301 to S1303 are conducted before the D2UE connection has been established and the steps S1501 to S1503 are conducted while the D2UE connection is established already. Even if the D2UE connection is established already, the user equipment has to make measurements for known or unknown neighbor small-node device. In this sense, the measurements in the steps S1301 to S1303 are equivalent to the steps S1501 to S1503. Therefore, explanation for the steps S1501 to S1503 is omitted.

In the step S1504, the user equipment 100 determines whether or not the neighbor small-node device, which is closer to the user equipment 100 than the serving small-node device, is detected. The serving small-node device means the small-node device (the small-node device 500), which is currently communicating with the user equipment 100. More specifically, the radio link quality of the neighbor small-node device is higher than that of the serving small-node device, it may be determined that the neighbor small-node device is closer to the user equipment 100 than the serving small-node device.

In the determination, hysteresis may be taken into account. More specifically, in a case where the following equation is true, it may be determined that the neighbor small-node device, which is closer to the user equipment 100 than the serving small-node device, is detected.

$$(\text{Radio link quality of Neighbor cell}) > (\text{Radio link quality of Serving cell}) + \text{Hyst}$$

In the equation, Hyst corresponds to the hysteresis. For example, according to one or more embodiments of the present disclosure, Hyst may be 3 dB. Not only the hysteresis, but also time domain hysteresis may be used. The time domain hysteresis may be called time-to-trigger.

In a case where the neighbor small-node device, which is closer to the user equipment than the serving small-node device, is detected (step S1504: YES), the user equipment 100 transmits measurement reports to the base station 200 in the step S1505. The measurement reports report that the neighbor small-node device, which is closer to the user equipment than the serving small-node device, is detected.

In the step S1506, the base station 200 transmits handover command to the user equipment 100. The base station 200 transmits control signaling to the neighbor small-node device 500 for handover preparation. Furthermore, the base station 200 may inform the serving small-node device that the user equipment 100 is handed over to the neighbor small-node device.

In the step S1507, the user equipment 100 conducts handover to the neighbor small-node device.

In a case where the neighbor small-node device, which is closer to the user equipment than the serving small-node device, is not detected (step S1504: NO), the user equipment 100 maintains the D2UE connection with the small-node device 500 in the step S1508.

Figure 25:
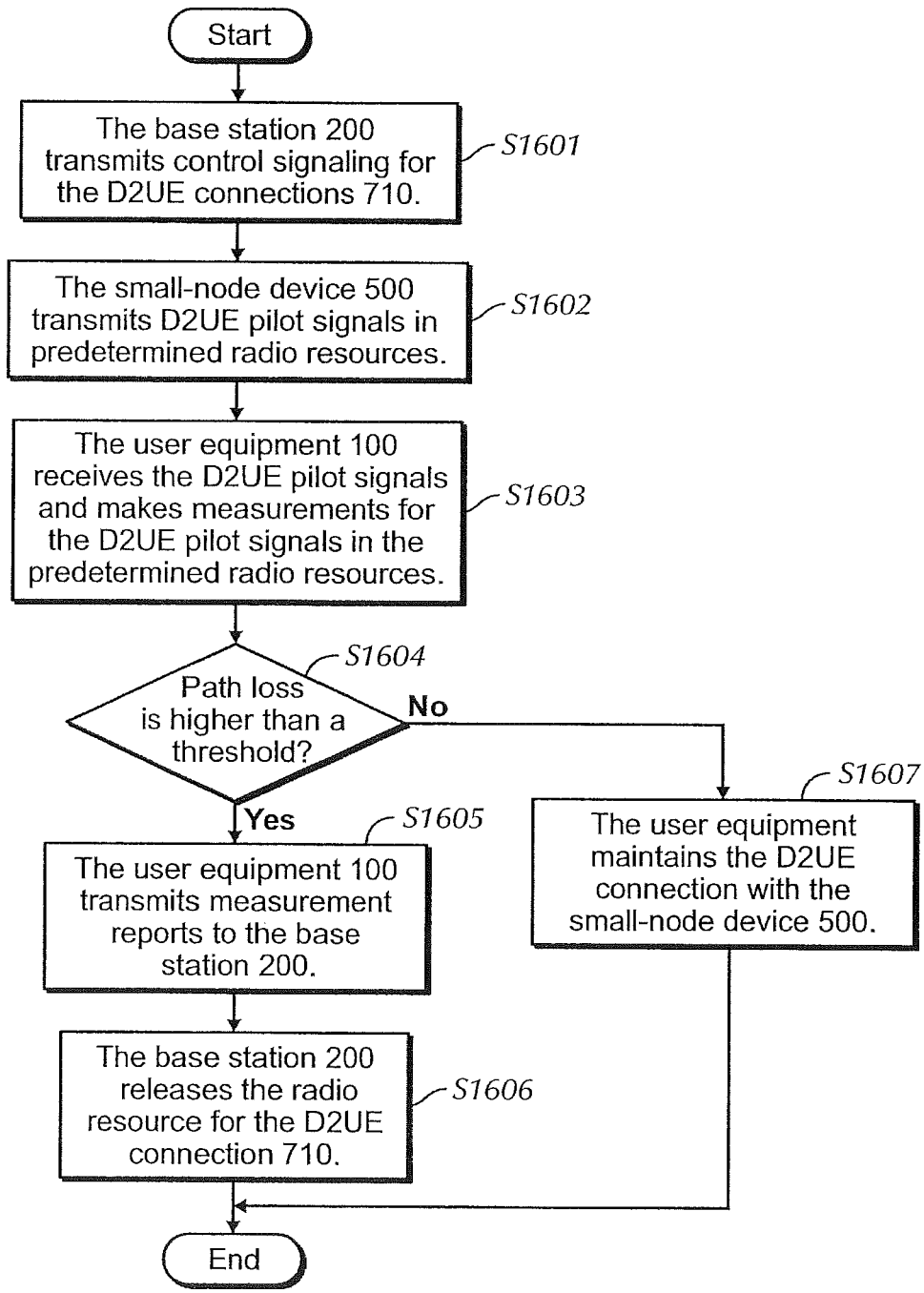
FIG. 25 is a flowchart showing operations in the radio communication system according to one or more embodiments of the present disclosure.

Referring to FIG. 25, an operation of the mobile communication system according to one or more embodiments of the present invention is described. The operation is related to mobility control in the D2UE connection 710. The operation is conducted while the D2UE connection is established already.

Because the steps S1601 to S1603 are almost the same as the steps S1301 to S1303. The only difference is that the steps S1301 to S1303 are conducted before the D2UE connection is established and the steps S1601 to S1603 are conducted while the D2UE connection is established already. Therefore, explanation for the steps S1601 to S1603 is omitted.

In the step S1604, the user equipment 100 determines whether or not path loss is higher than a threshold. More specifically, the user equipment 100 determines whether or not the path loss for the serving small-node device is higher than the threshold. The base station 200 may inform the user equipment 100 of the threshold by using the control signaling in the step S1601.

In the above Step S1602 and 1603, the user equipment 100 makes measurements for the path loss by using the D2UE pilot signals, but other signals or channels may be used for the path loss measurements. For example, according to one or more embodiments of the present disclosure, pilot signals for the channel estimation or demodulation in the D2UE connection 710 may be used for the path loss measurements. The pilot signals for the channel estimation or demodulation may provide better accuracy for path loss measurements than the D2UE pilot signals, which are used for mobility measurements. In case that the path loss are calculated by using other signals or channels, information on the transmission power of the other signals or channels may be included in the other signals or channels. The user equipment 100 may calculate the path loss based on the received power of the other signals or channels and the transmission power of the other signals or channels.

In a case where the path loss for the serving small-node device is higher than the threshold (Step S1604: YES), the user equipment 100 transmits measurement reports to the base station 200 in the step S1605. The measurement reports report that the path loss for the serving small-node device is higher than the threshold.

In the step S1606, the base station 200 releases the radio resource for the D2UE connection 710. More specifically, the base station 200 sends control messages to release the D2UE connection 710. As a result, the D2UE connection 710 is released.

In a case where the path loss for the serving small-node device is not higher than the threshold (Step S1604: NO), the user equipment 100 maintains the D2UE connection with the small-node device 500 in the step S1607.

In the above examples, the path loss is used, but other values which represent the radio link quality may be used. For example, according to one or more embodiments of the present disclosure, at least one of the received power of the pilot signal, the SIR of the pilot signal, the received quality of the pilot signal and the like may be used. In this case, in case that the radio link quality is poorer than a threshold, the decision should be YES, and otherwise the decision should be NO in the step S1604.

Based on the radio resource management described in FIG. 25, the D2UE connection, which may interfere with other communications, can be removed, and therefore good system quality can be maintained.

Figure 25A:
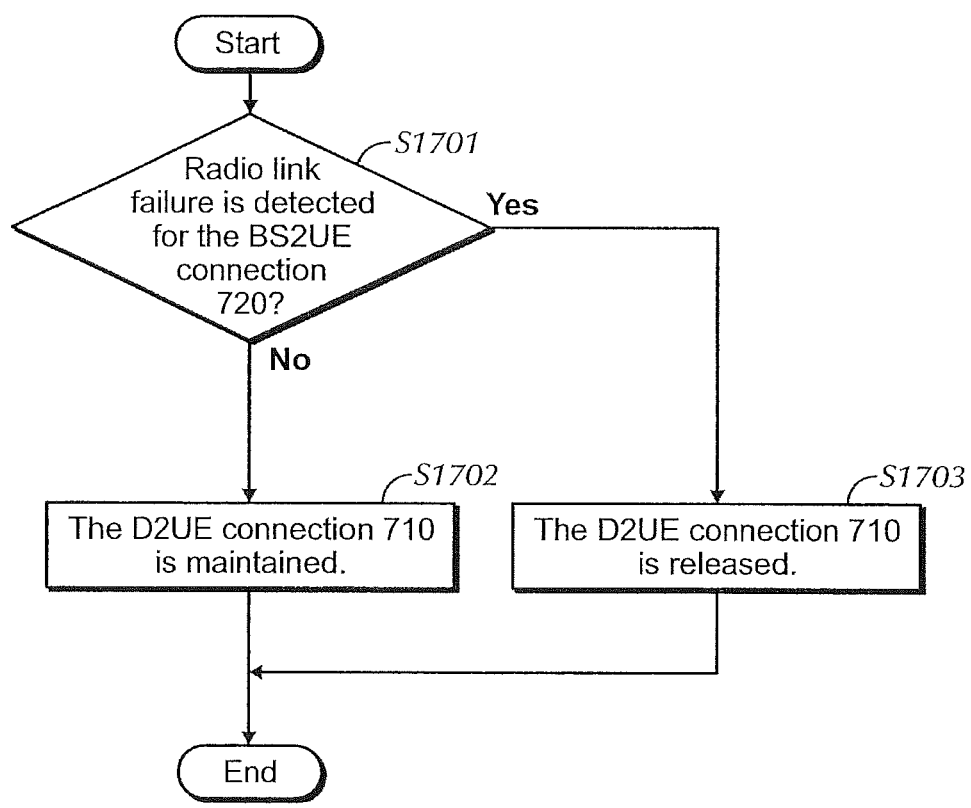
FIG. 25A is a flowchart showing operations in the radio communication system according to one or more embodiments of the present disclosure.
Figure 26:
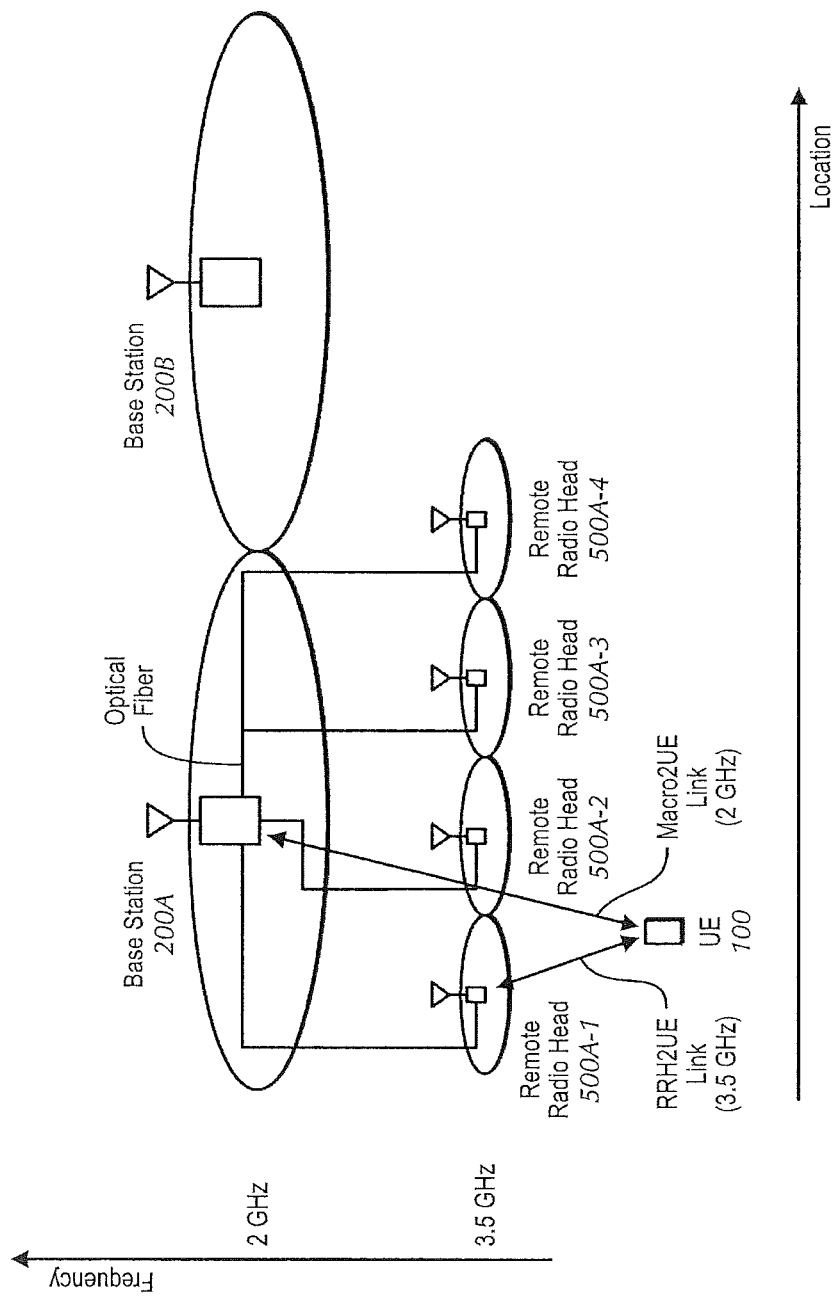
FIG. 26 is an explanatory view showing conventional remote-radio-head based carrier aggregation operations.

Referring to FIG. 25A, an operation for the mobile communication system according to one or more embodiments of the present invention is described. The operation is related to mobility control in the D2UE connection 710. The operation is conducted while the D2UE connection is established already.

In the step S1701, the user equipment 100 determines whether or not radio link failure is detected for the BS2UE connection 720.

For example, according to one or more embodiments of the present disclosure, the radio link failure may be detected based on expiry of a timer, which is utilized to detect radio link failure in physical layer. The timer may be called T310 in the 3GPP specifications. Alternatively, the radio link failure may be detected based on random access scenario indication from MAC layer. The radio link failure may be detected based on indication from RLC layer that the maximum number of retransmissions has been reached.

In a case where the radio link failure is not detected for the BS2UE connection 720 (Step S1701: NO), the D2UE connection 710 is maintained in the step S1702.

In a case where the radio link failure is detected for the BS2UE connection 720 (Step S1701: YES), the user equipment 100 releases the D2UE connection 710 in the step S1703. In the step S1703, the user equipment 100 may stop transmitting signals in the D2UE connection 710, instead of releasing the D2UE connection 710.

Benefits of the operation described in FIG. 25A are described as follows. In case that the user equipment 100 cannot communicate with the base station due to the radio link failure in the BS2UE connection 720, the D2UE connection 710 is also released and therefore the user equipment 100 will not transmit any signals under the conditions where the base station 200 cannot control the D2UE connection 710. That is, it can be avoided that the user equipment 100 transmits interference signal under the conditions that the base station 200 cannot control the D2UE connection 710.

Characteristics mentioned above may be described as follows. One of the characteristics in one or more embodiments of the present invention is a communication method in a mobile communication system, in which a mobile station communicates with a server via a device using D2UE connection for offload purposes in addition to using BS2UE connection:

(1st step) Transmitting pilot signals for the D2UE connection in the device (2nd step) Receiving the pilot signals and making the measurements for radio link quality of the D2UE connections in the mobile station (3rd step) Establishing the D2UE connection based on the measurements in the device and the mobile station In the 1st step, transmission timing of the pilot signals are time synchronized with signals in the BS2UE connection.

One of the characteristics in one or more embodiments of the present invention is a communication method in a mobile communication system, in which a mobile station communicates with a server via a device using D2UE connection for offload purposes in addition to using BS2UE connection:

(1st step) Transmitting pilot signals for the D2UE connection in the device (2nd step) Receiving the pilot signals and making the measurements for path loss of the D2UE connections in the mobile station (3rd step) Establishing the D2UE connection based on the measurements in the mobile station In the 3rd step, the D2UE connection is not established in case that the path loss is higher than a predetermined threshold.

Based on one or more embodiments of the invention, high quality communication connectivity, lower power consumption in mobile stations, and less interference in the hybrid D2UE and BS2UE system can be achieved.

The above procedures conducted by the small-node device 500 may be conducted in the D2UE communication section 504. The above procedures conducted by the user equipment 100 may be conducted in the D2UE communication section 104. The above procedures conducted by the base station 200 may be conducted in the D2UE communication control section 204.

In the embodiments, some of the conventional BS2UE operations may be omitted in the D2UE connection 710. More specifically, at least one of the following operations may be omitted:

Transmitting broadcast channels in DL

Transmitting common reference signals in DL

Transmitting primary synchronization signals/secondary synchronization signals in DL Transmitting paging signals in DL Transmitting dedicated RRC signaling related to RRC procedures, such as connection establishment, connection re-establishment, connection setup, connection reconfiguration, connection release, and the like Transmitting control signaling for handover, such as control information of measurement configuration, measurement control, handover command, handover complete and the like The following operations can be supported by the BS2UE connection 720 and the BS2D connection 730, as mentioned above. As a result, the complexity of the small-node device 500 can be reduced.

Some others of conventional BS2UE operations may be supported in the D2UE connection 710. More specifically, at least one of the following operations may be supported:

Transmitting PDCCH in DL

Transmitting PHICH in DL

Transmitting PCFICH in DL

Transmitting PUCCH in UL

Transmitting PUSCH in UL

Transmitting PRACH in UL

Uplink power control

DL power control

Adaptive modulation and coding for DL and UL

DRX

HARQ (An Example #1, According to One or More Embodiments, for Data Handling During Handover in the D2UE Connection 710)

In case that the user equipment 100 makes the handover from one cell (a source cell) to another cell (a target cell), there are in general some options for handling data which are buffered in the source cell.

One option is that the source cell drops the data which are buffered in the source cell. In this option, user data throughput is degraded after the handover, because the dropped data may affect TCP layer behaviors. For example, TCP layer may try to decrease TCP window size, because it regards the dropped data as the ones caused by congestion. However, the source cell does not forward the buffered data to the target cell, and therefore processing complexity in the source cell and target cell can be minimized.

Another option is that the source cell forwards to the target cell the data which are buffered in the source cell. In this option, user data throughput can be maintained even if the handover is conducted. But, the processing complexity in the source cell and target cell increases.

In terms of the hybrid D2UE and BS2UE system described above, the small-node device 500 provides a small coverage area for the user equipment 100 in the D2UE connection 710, and therefore if the number of handovers in the D2UE connection increases due to high mobility and data dropping happens in each handover, the user data throughput in the D2UE connection may be degraded.

Hereinafter, handover in the D2UE connection is called "D2UE handover". That is, "D2UE handover" corresponds to handover wherein the user equipment 100 changes "D2UE connection with one small-node device" to "D2UE connection with another small-node device".

If the data forwarding is conducted from a source small-node device to a target small-node device in each D2UE handover, the user data throughput can be maintained, but complexity of each small-node device increases.

In the following, some embodiments, where such user throughput degradation can be avoided and complexity of small-node device can be minimized to some extent, are described. Some embodiments are based on the architecture shown in FIG. 9, as described below.

Figure 29:
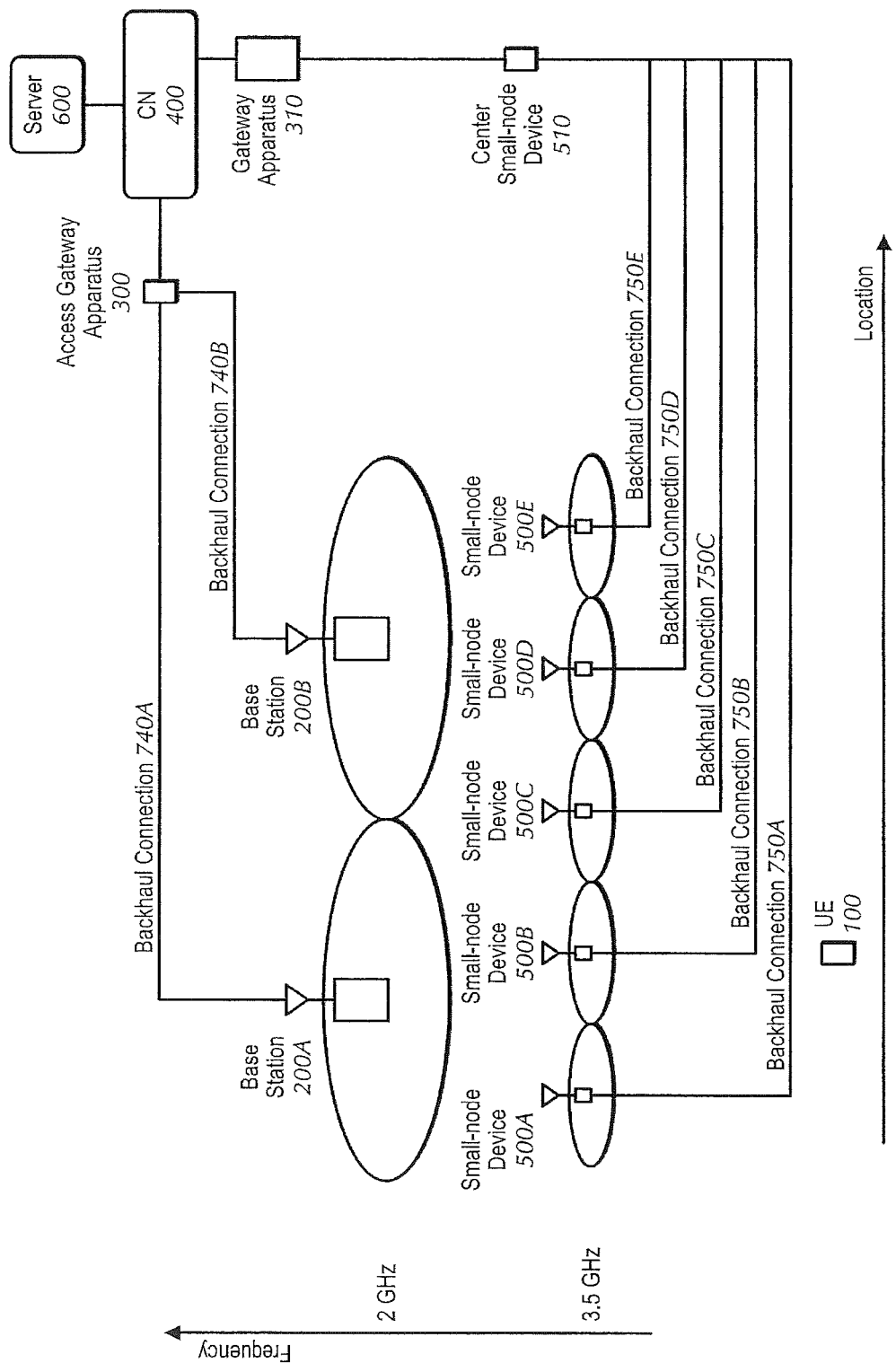
FIG. 29 is an explanatory view showing a communication system according to one or more embodiments of the present disclosure.

FIG. 29 illustrates almost the same system architecture as the one in FIG. 9. The difference between FIG. 9 and FIG. 29 is that the small-node devices, which are connected to a center-small-node device 510, are located in the coverage areas provided by two base stations (the base station 200A and the base station 200B). It is noted that the number of the base stations is just an example, and it may be one or more than two. Furthermore, in FIG. 29, only the server 600 and the core network 400 are illustrated for simplicity, but the center-small-node device 500 may connect to the internet and the server 610 in some embodiments.

Here, the total coverage area provided by the small-node devices 500A/500B/500C/500D/500E is almost the same as the one provided by the base stations 200A/200B, as illustrated in FIG. 29.

Figure 30:
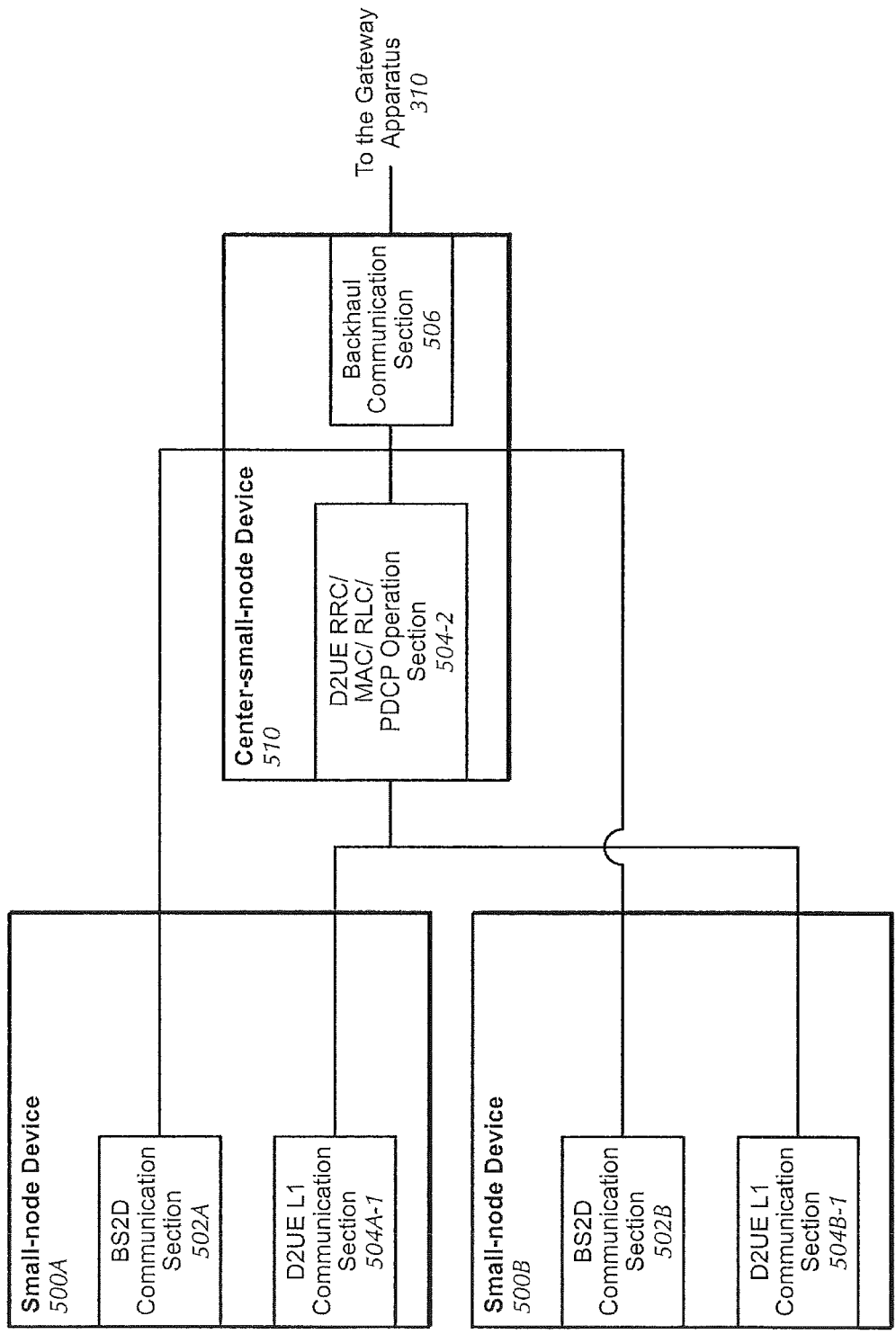
FIG. 30 is a functional block diagram of a small-node device and a center-small-node device according to one or more embodiments of the present disclosure.

In this example, according to one or more embodiments, one PDCP/RLC layer operation for the small-node devices 500A/500B/500C/500D/500E is conducted in the center-small-node device 510, as illustrated in FIG. 30.

In FIG. 30, the small-node device 500A, the small-node device 500B and the center-small-node device 510 are illustrated, and other small-node devices are omitted. Other small-node devices have the same configuration, function and state as the small-node devices 500A/500B.

Comparison between the small-node device 500 illustrated in FIG. 11 and the small-node device 500A/the center-small-node device 510 in FIG. 30 is described in the following. The D2UE communication section 504 in FIG. 11 is divided to a D2UE L1 communication section 504A-1 and a D2UE RRC/MAC/RLC/PDCP operation section 504-2. The D2UE L1 communication section 504A-1 is located in the small-node device 500A, and the D2UE RRC/MAC/RLC/PDCP operation section 504-2 is located in the center-small-node device 510. The Backhaul communication section 506 is located in the center-small-node device 510, instead of the small-node device 500A.

Figure 11:
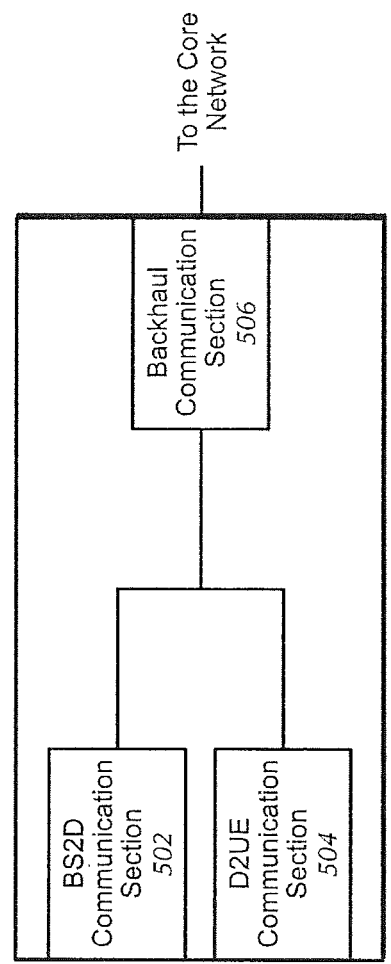
FIG. 11 is a functional block diagram of a small-node device according to one or more embodiments of the present disclosure.

The BS2D communication section 502A, the D2UE RRC/MAC/RLC/PDCP operation section 504-2, and the Backhaul communication section 506 are connected to each other, and communicate with each other, similarly to the BS2D communication section 502, the D2UE communication section 504, and the Backhaul communication section 506 in FIG. 11.

The D2UE L1 communication section 504A-1 is connected to the D2UE MAC/RLC/PDCP communication section 504-2, and they communicate with each other. A connection between the D2UE L1 communication section 504A-1 and the D2UE MAC/RLC/PDCP communication section 504-2 may be an optical fiber.

The D2UE L1 communication section 504A-1 may be a remote radio head. In this case, the D2UE MAC/RLC/PDCP communication section 504-2 conducts baseband processing, such as PDCP operation/RLC operation/MAC operation/coding/decoding and the like, and transmits digital information for baseband signals to the D2UE L1 communication section 504A-1 in the optical fiber. The D2UE L1 communication section 504A-1 converts the digital information to radio frequency signals and transmits them after amplifying the radio frequency signals. Furthermore, the D2UE L1 communication section 504A-1 receives radio frequency signals transmitted by the user equipment 100, converts the radio frequency signals to digital information for baseband signals, and transmits the digital information to the D2UE MAC/RLC/PDCP communication section 504-2 in the optical fiber.

Alternatively, some parts of the baseband processing may be conducted by the D2UE L1 communication section 504A-1, and others may be conducted by the D2UE MAC/RLC/PDCP communication section 504-2 conducts. How to divide the baseband processing between the D2UE L1 communication section 504A-1 and the D2UE MAC/RLC/PDCP communication section 504-2 is not limited to the above examples.

Description of the BS2D communication section 502A is almost the same as the one of the BS2D communication section 502 in FIG. 11, and therefore is omitted here.

Functions supported by the D2UE L1 communication section 504A-1 and the D2UE RRC/MAC/RLC/PDCP operation section 504-2 are almost the same as the ones supported by the D2UE communication section 504 in FIG. 11.

More specifically, the D2UE RRC/MAC/RLC/PDCP operation section 504-2 manages the D2UE connection 710 between the small-node device 500 and the user equipment 100, i.e. the D2UE RRC/MAC/RLC/PDCP operation section 504-2 establishes/configures/re-configures/re-establishes/releases the D2UE connection 710 between the small-node device 500 and the user equipment 100. The management of the D2UE connection 710 is based on the control signaling transmitted by the base station 200. The D2UE RRC/MAC/RLC/PDCP operation section 504-2 manages the D2UE connection for the small-node device 500A/500B/500C/500D/500E, which are connected to the center-small-node device 510.

The D2UE RRC/MAC/RLC/PDCP operation section 504-2 buffers data to be transmitted in downlink and data received in uplink for the small-node devices 500A/500B/500C/500D/500E. Because the D2UE RRC/MAC/RLC/PDCP operation section 504-2 has one section to buffer data for the small-node devices 500A/500B/500C/500D/500E, which are connected to the center-small-node device 510, no data drops occur and no data forwarding is needed in case of the D2UE handover among the small-node devices 500A/500B/500C/500D/500E.

Referring to FIG. 17, more specific operations for data buffering are explained below. The D2UE RRC/MAC/RLC/PDCP operation section 504-2 buffers data to be transmitted to the user equipment 100, in case the user equipment 100 makes the D2UE handover from the small-node device 500A to the small-node device 500B. The small-node device 500A and 500B correspond to the source small-node device 500A and the target small-node device 500B, respectively.

Just before or just after or at the same timing as S1108, the D2UE L1 communication section 504A-1 stops transmitting downlink data, and the downlink data is buffered in the D2UE RRC/MAC/RLC/PDCP operation section 504-2. Just after or at the same time as the step S1111, the D2UE L1 communication section 504B-1 starts transmitting the downlink data which is buffered in the D2UE RRC/MAC/RLC/PDCP operation section 504-2. Alternatively, the D2UE L1 communication section 504B-1 may start transmitting the downlink data which is buffered in the D2UE RRC/MAC/RLC/PDCP operation section 504-2 just after or at the same time as the step S1112.

That is, data dropping in a source small-node device and data forwarding from a source small-node device to a target small-node device can be avoided by buffering data in a common buffer in the D2UE RRC/MAC/RLC/PDCP operation section 504-2.

The D2UE RRC/MAC/RLC/PDCP operation section 504-2 may buffer uplink data as well as downlink data for the D2UE connection.

The buffer in the D2UE RRC/MAC/RLC/PDCP operation section 504-2 may be a buffer of MAC layer or may be a buffer of RLC layer or may be a buffer of PDCP layer. Alternatively, the buffer may be a mixture of at least one of MAC layer buffer, RLC layer buffer and PDCP layer buffer. More specifically, the buffer may be a buffer of PDCP/RLC layer. Alternatively, the buffer may be a buffer of PDCP/RLC/MAC layer.

The D2UE RRC/MAC/RLC/PDCP operation section 504-2 may not have one section to buffer data, but more than one section to buffer data. Configurations for the section to buffer data may not be limited to one specific configuration, and various kinds of configurations may be possible. For example, according to one or more embodiments of the present disclosure, the D2UE RRC/MAC/RLC/PDCP operation section 504-2 may have two sections to buffer data, and the two sections very closely communicate with each other so that the two sections can be regarded as one logical section to buffer data. The number of two is just an example, and the D2UE RRC/MAC/RLC/PDCP operation section 504-2 may have more than two sections to buffer data.

The D2UE RRC/MAC/RLC/PDCP operation section 504-2 may conduct a link adaptation for the D2UE connection 710, such as power control and adaptive modulation and coding. The link adaptation may be conducted based on parameters which are signaled from the base station 200. The D2UE RRC/MAC/RLC/PDCP operation section 504-2 may conduct a link adaptation of the D2UE connection for the small-node device 500A/500B/500C/500D/500E, which are connected to the center-small-node device 510. Alternatively, the D2UE L1 communication section 504A-1 may conduct a link adaptation for the D2UE connection 710 for the small-node device 500A.

The D2UE L1 communication section 504A-1 transmits data to the user equipment 100 and receives data from the user equipment 100 utilizing the D2UE connection 710 between the small-node device 500A and the user equipment 100. As described above, data for some of the radio bearers may be transmitted in the D2UE connection 710.

The D2UE L1 communication section 504A-1 transmits the downlink data to the user equipment 100 using the D2UE connection 710. The downlink data is transferred from the server 600 via the core network 400, the Backhaul communication section 506 and the D2UE RRC/MAC/RLC/PDCP operation section 504-2.

The D2UE L1 communication section 504A-1 receives the uplink data from the user equipment 100 using the D2UE connection 710. The uplink data is transferred to the server 600 via the D2UE RRC/MAC/RLC/PDCP operation section 504-2, the Backhaul communication section 506 and the core network 400.

The D2UE L1 communication section 504A-1 also conducts measurements for the D2UE connection 710 for the small-node device 500A. Description of the measurements is the same as the one in the D2UE communication section 504, and therefore is omitted here. The D2UE L1 communication section 504A-1 reports the measurement results to the base station 200 via the D2UE RRC/MAC/RLC/PDCP operation section 504-2, the BS2D communication section 502 and the BS2D connection 730.

Figure 31:
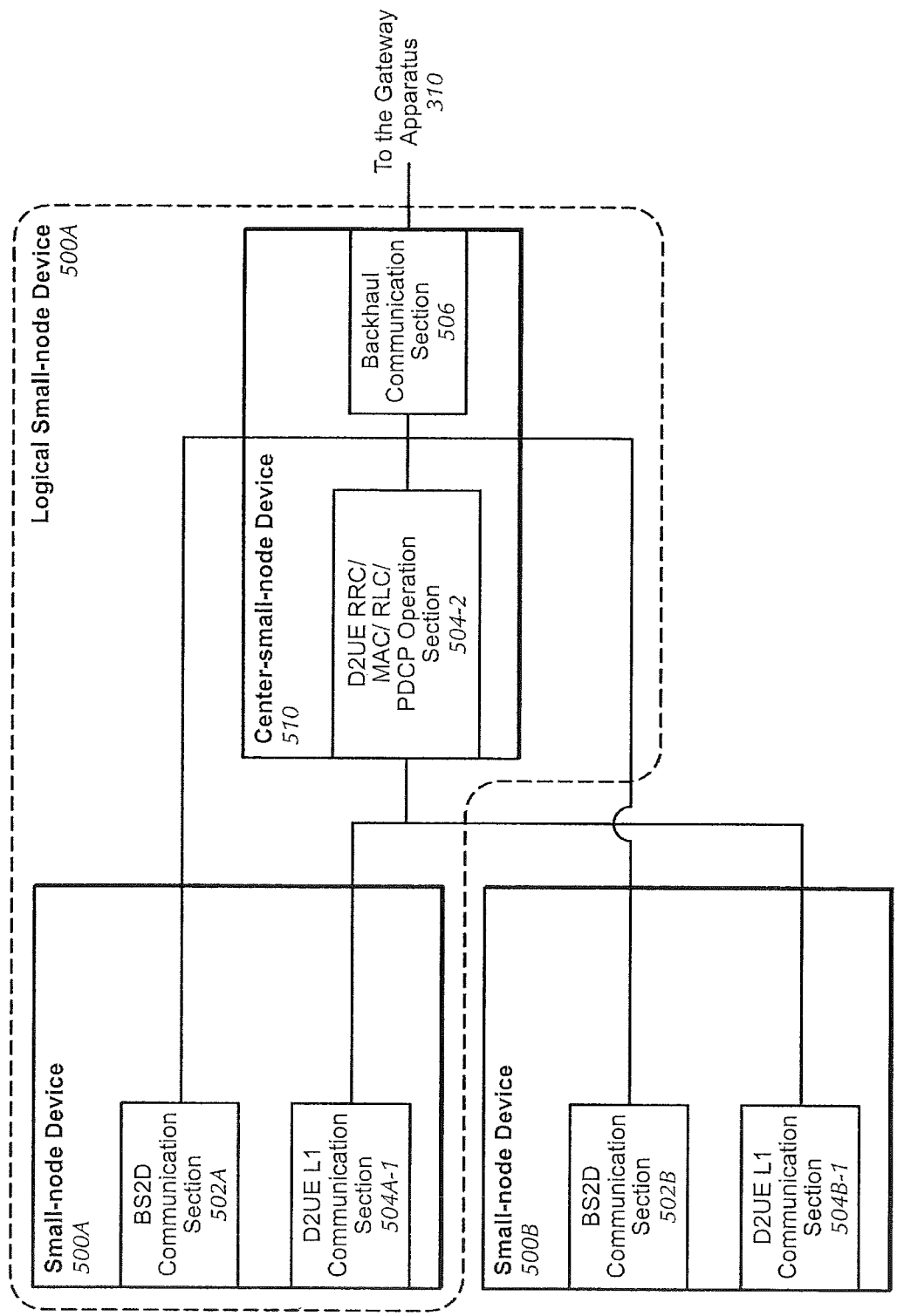
FIG. 31 is a functional block diagram of a small-node device and a center-small-node device according to one or more embodiments of the present disclosure.

Components enclosed in a dashed line in FIG. 31 may be regarded as a logical small-node device 500A, which has the same configuration, function and state as the small-node device 500 described in FIG. 11.

The BS2D communication section 502A is located in the small-node device 500A in FIG. 30, but some parts of the BS2D communication section 502A may be located in the small-node device 500A, and others are located in the center-small-node device 510, similarly to the D2UE L1 communication section 504A-1 and the D2UE RRC/MAC/RLC/PDCP operation section 504-2.

Figure 32:
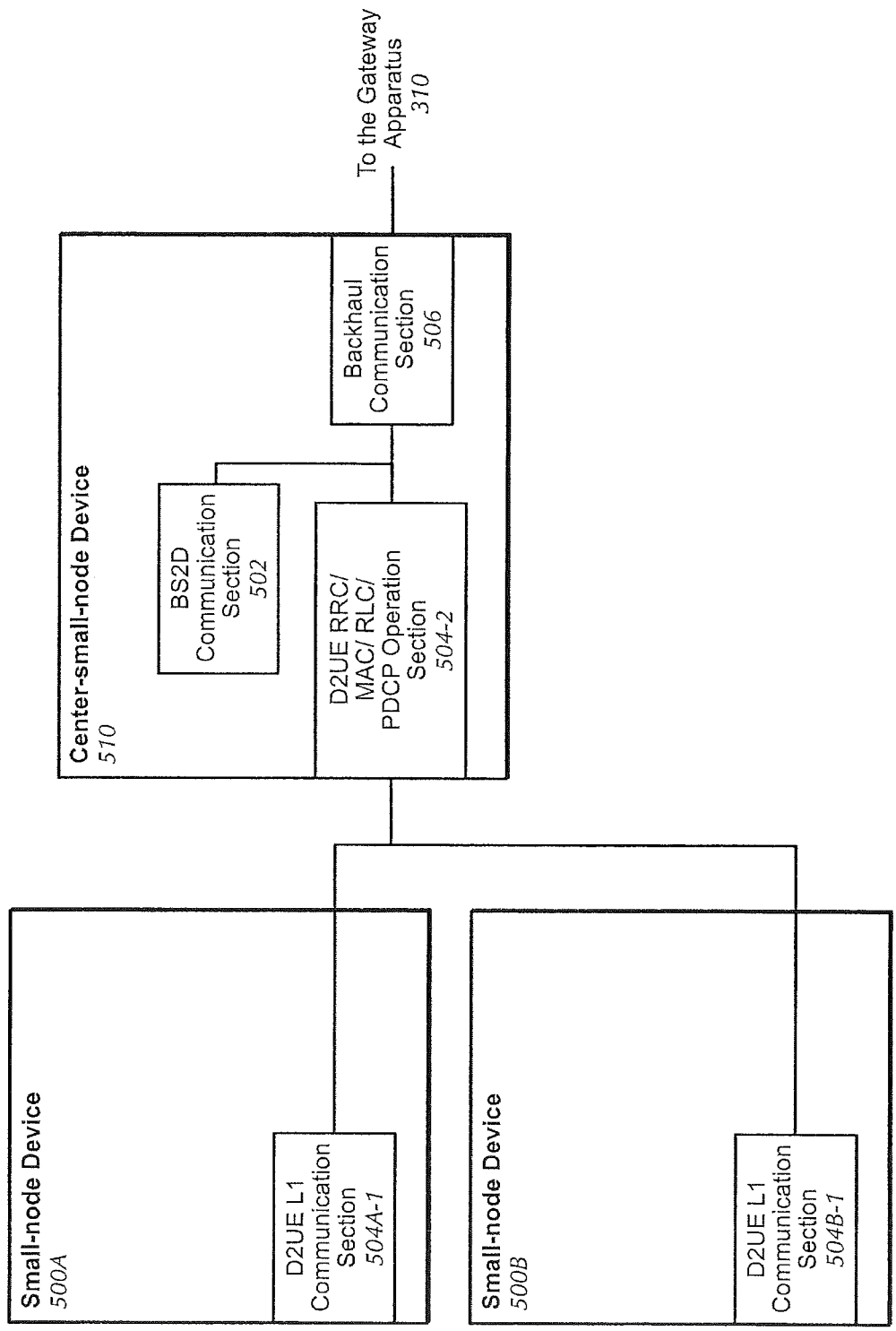
FIG. 32 is a functional block diagram of a small-node device and a center-small-node device according to one or more embodiments of the present disclosure.

Alternatively, the BS2D communication section 502 may be located in the center-small-node device 510, as illustrated in FIG. 32. In this architecture, the BS2D communication section 502 supports functions of the BS2D communication sections 502A/502B/502C/502D/502E for the small-node devices 500A/500B/500C/500D/500E, respectively.

Figure 32A:
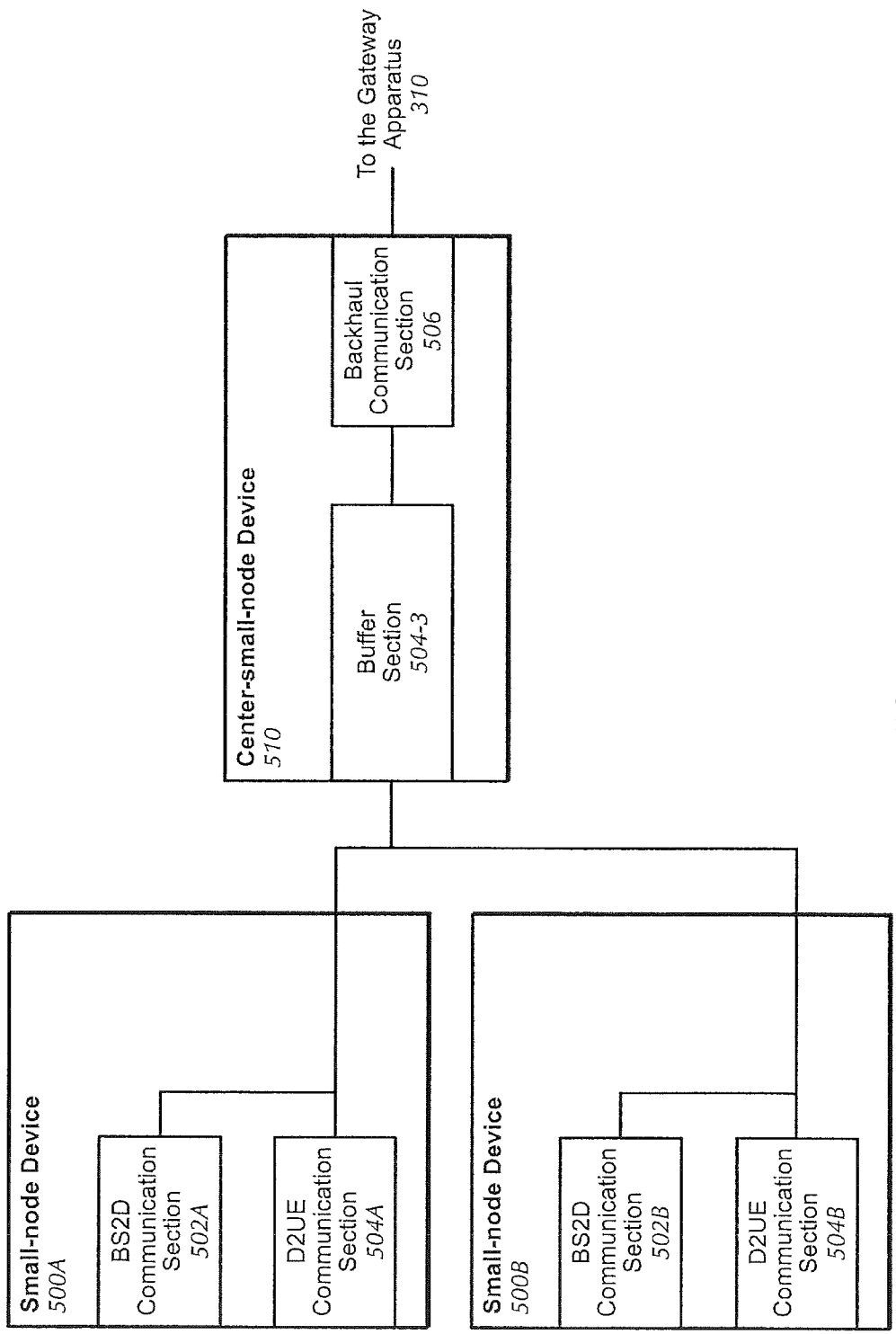
FIG. 32A is a functional block diagram of a small-node device and a center-small-node device according to one or more embodiments of the present disclosure.

Alternatively, only buffer section 504-3 may be located in the center-small-node device 510. The other functions for the D2UE L1 communication section 504A-1 and the D2UE RRC/MAC/RLC/PDCP operation section 504-2, which are described in FIG. 30, may be located in the small-node device 500A, as illustrated in FIG. 32A. In the figure, D2UE communication section 504A handles the other functions for the D2UE L1 communication section 504A-1 and the D2UE RRC/MAC/RLC/PDCP operation section 504-2, which are described in FIG. 30. The BS2D communication section 502A, the D2UE communication section 504A, and the buffer section 504-3 are connected with each other, and communicate with each other.

The buffer section 504-3 may be a buffer of PDCP/RLC layer. Alternatively, the buffer section 504-3 may be a buffer of MAC layer or a buffer of RLC layer or may be a buffer of PDCP layer. Alternatively, the buffer section 504-3 may be a mixture of at least one of MAC layer buffer, RLC layer buffer and PDCP layer buffer. Alternatively, the buffer section 504-3 may be a buffer of PDCP/RLC/MAC layer.

Figure 32B:
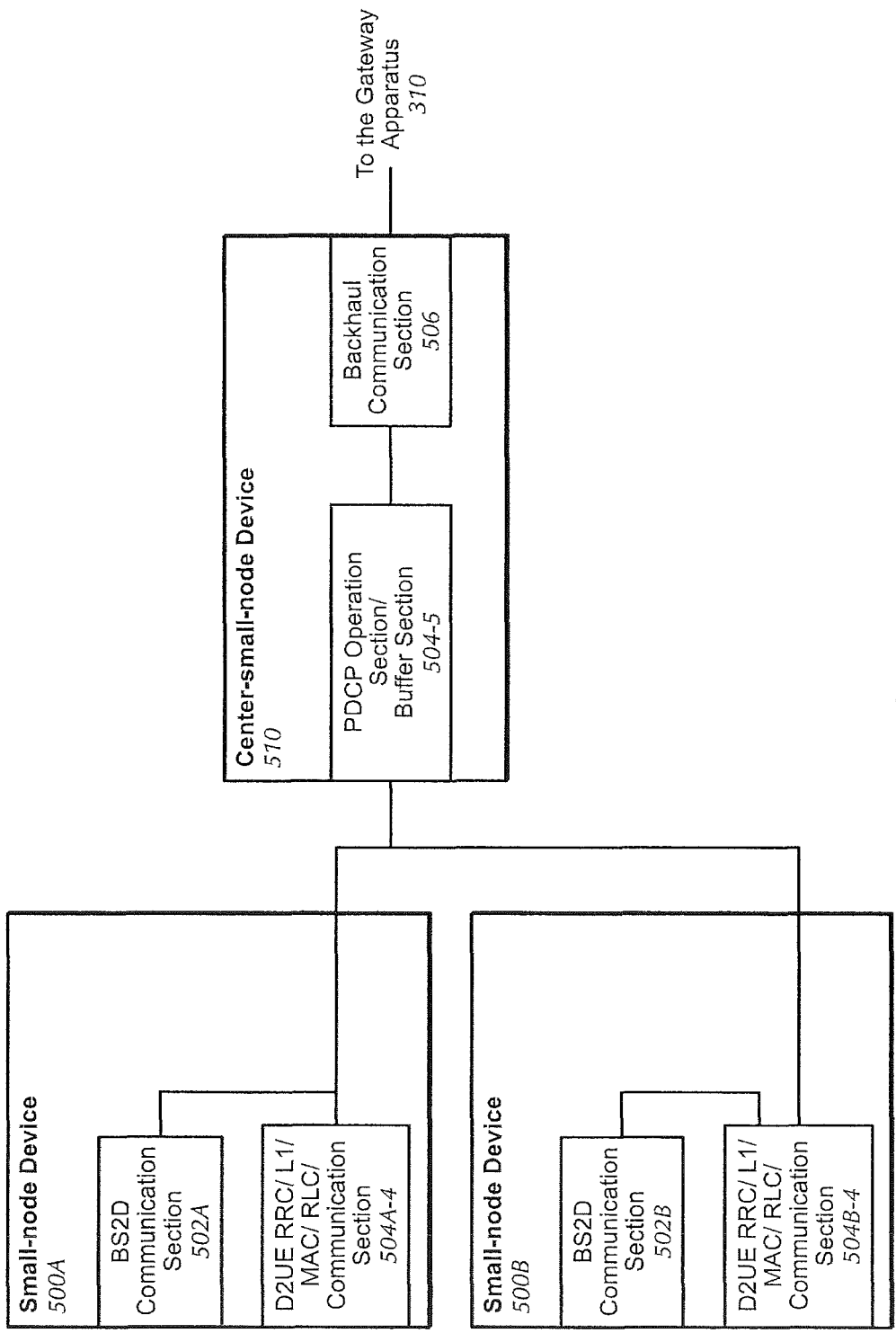
FIG. 32B is a functional block diagram of a small-node device and a center-small-node device according to one or more embodiments of the present disclosure.

More specifically, the center-node small-node device 510 may have a PDCP operation section/Buffer section 504-5 and the small-node device 500A may have a D2UE RRC/L1/MAC/RLC communication section 504A-4, as illustrated in FIG. 32B. That is, the PDCP operation section/Buffer section 504-5 handles the PDCP operation and buffers downlink data and uplink data in PDCP layer, and the D2UE RRC/L1/MAC/RLC communication section 504A-4 handles the other functions for the D2UE L1 communication section 504A-1 and the D2UE RRC/MAC/RLC/PDCP operation section 504-2, which are described in FIG. 30. The D2UE RRC/L1/MAC RLC communication section 504A-4 handles:

Managing the D2UE connection 710 between the small-node device 500 and the user equipment 100.

Establishing/configuring/re-configuring/re-establishing/releasing the D2UE connection 710.

Handling L1/MAC/RLC operations for the D2UE connection 710.

Description for the small-node device 500A/the center-small-node device 510 is the same as the one for the small-node device 500B/the center-small-node device 510, and therefore it is omitted.

In summary, the data dropping does not occur and the data forwarding is not needed in the D2UE handover from the small-node device 500A to the small-node device 500B in a set of the small-node devices 500A/500B and the center-small-node device 510. The center-small-node device 510 can buffer data to be transferred in the D2UE connection between the user equipment 100 and the small-node device 500A and data to be transferred in the D2UE connection between the user equipment 100 and the small-node device 500B.

(An Example #2, According to One or More Embodiments: Multiple-D2UE-Connection Operation)

In case the user equipment 100 makes the handover from one cell (a source cell) to another cell (a target cell), some control signals for the handover are transmitted. The control signals correspond to RRC signals in conventional cellular network. For example, according to one or more embodiments of the present disclosure, the user equipment 100 transmits to the base station a measurement report which indicates that a neighbor cell radio link quality is better than the serving cell radio link quality. Furthermore, the base station transmits to the user equipment a handover command which instructs that the user equipment 100 should make the handover to the neighbor cell which has better radio link quality than the serving cell.

In terms of the hybrid D2UE and BS2UE system described above, the operation shown in FIG. 17 is conducted for the D2UE handover. The small-node device 500 provides a small coverage area for the user equipment 100 in the D2UE connection 710. Therefore in case the number of handovers in the D2UE connection increases due to high mobility, a lot of control signals are transmitted frequently. It may increase control signal processing complexity in the base station 200. Furthermore, if the base station 200 may exchange control signals with a core node for the handover, control signal processing complexity in the core node also increases.

In the following, some embodiments, where such control signal processing complexity can be minimized, are described. Some embodiments are based on the architecture shown in FIG. 29.

In this example, according to one or more embodiments, it is assumed that the user equipment 100 has multiple connections with multiple small-node devices, instead of having a single connection with one small-node device. The control signal processing complexity can be reduced by having such multiple connections with multiple small-node devices.

For example, according to one or more embodiments of the present disclosure, if the user equipment 100 has multiple connections with the small-node devices 500A/500B/500C/500D/500E in FIG. 29, control signals for D2UE handover are not transmitted for the D2UE handover from the small-node device 500A to 500B, from the small-node device 500B to 500C, from the small-node device 500C to 500D, and from the small-node device 500D to 500E. That is, transmitting control signals for four D2UE handovers can be omitted, and as a result the control signal processing complexity can be reduced.

Of course, in case the user equipment 100 cannot communicate with all the small-node devices simultaneously, it should be decided at one time occasion which small-node device the user equipment 100 should communicate with. Here, "communicating with a small-node device" means "transmitting data to and receive data from a small-node device". But, such decision can be conducted in a lower layer such as the L1/L2 layer, instead of the RRC layer.

More specifically, such a decision of selecting the small-node device with which the user equipment 100 should communicate may be regarded as a part of MAC layer scheduling. Alternatively, such a decision of selecting the small-node device with which the user equipment 100 should communicate may be regarded as a part of transmission point selection in physical layer.

Figure 33:
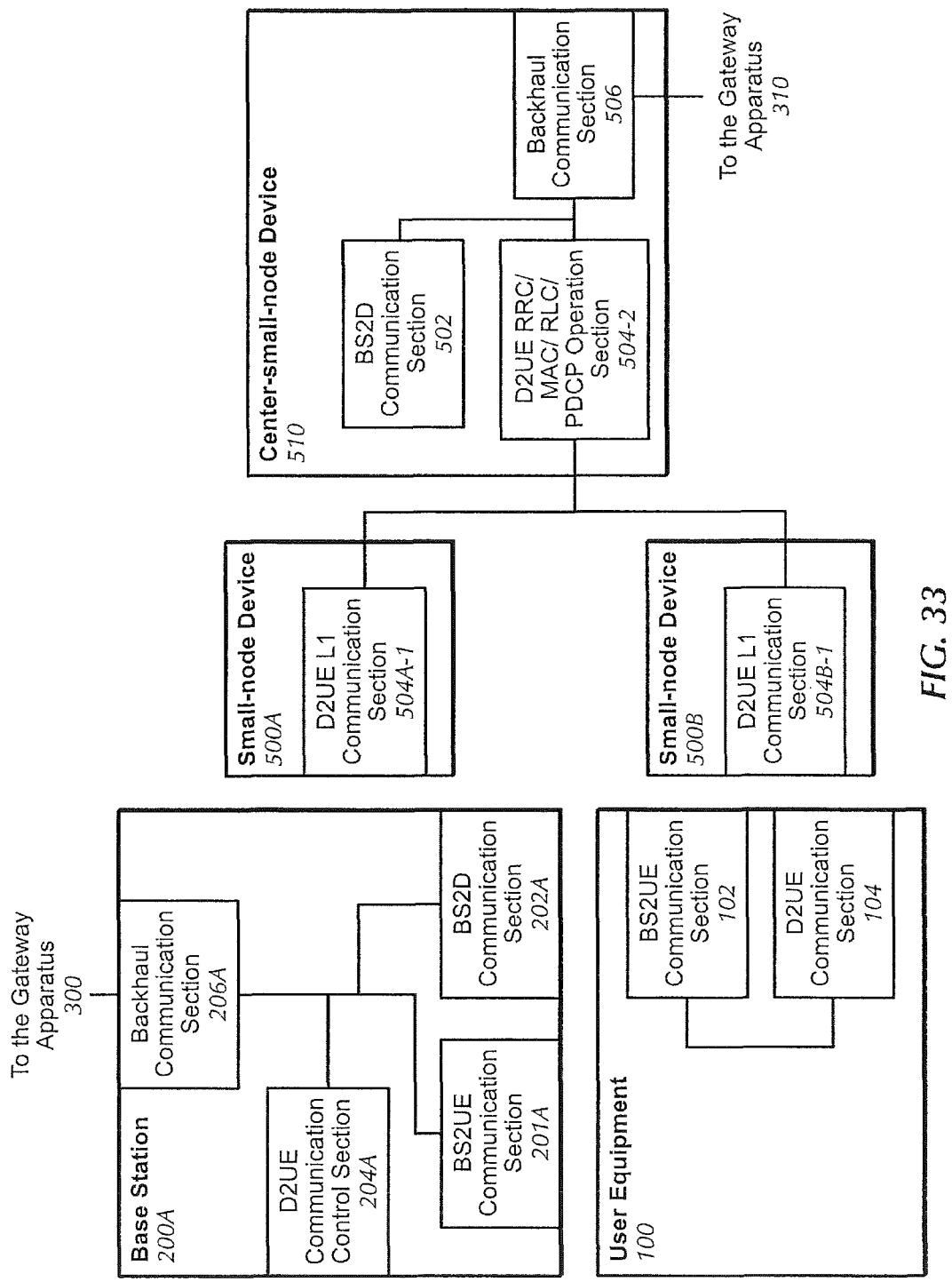
FIG. 33 is a functional block diagram of a small-node device, a functional block diagram of a center-small-node device, a functional block diagram of a user equipment, a functional block diagram of a base station according to one or more embodiments of the present disclosure.

In FIG. 33, the small-node device 500A, the small-node device 500B and the center-small-node device 510 are illustrated, and other small-node devices are omitted. Other small-node devices have the same configuration, function, and state as the small-node devices 500A/500B. Furthermore, the base station 200A and the user equipment 100 are also illustrated in FIG. 33.

The small-node devices 500A/500B and the center-small-node device 510 are almost the same as those in FIG. 32, and therefore only additional functions/operations compared to those in FIG. 32 are described below.

Figure 12:
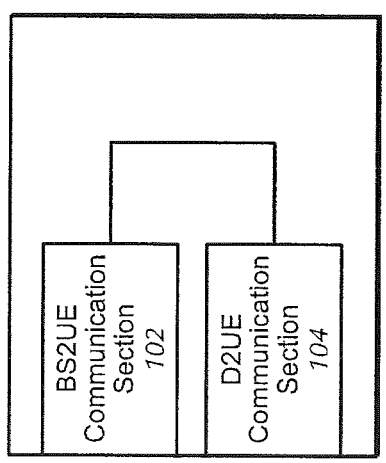
FIG. 12 is a functional block diagram of a user equipment according to one or more embodiments of the present disclosure.

The user equipment 100 is almost the same as the one in FIG. 12, and therefore only additional functions/operations compared to those in FIG. 12 are described below.

Figure 13:
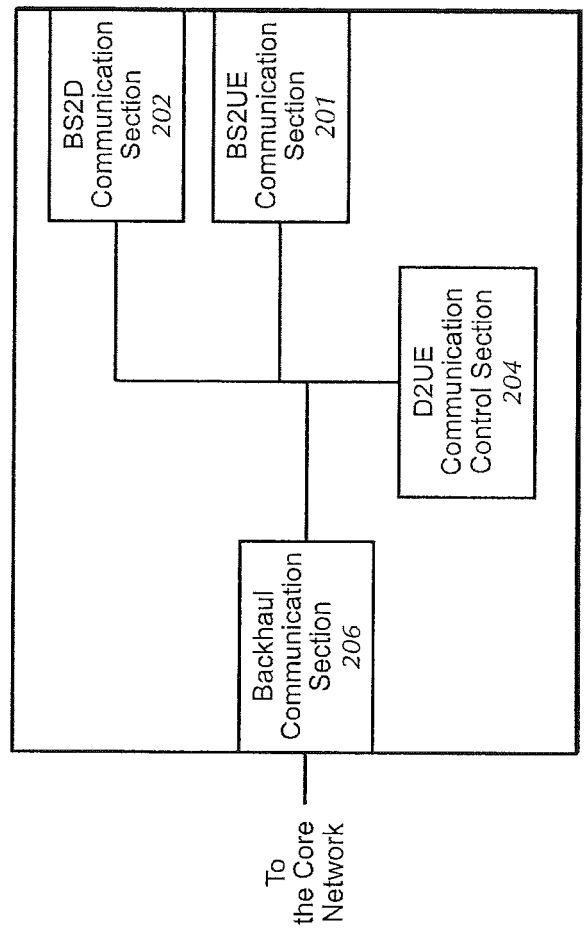
FIG. 13 is a functional block diagram of a base station according to one or more embodiments of the present disclosure.

The base station 200A is almost the same as the base station 200 in FIG. 13, and therefore only additional functions/operations compared to those in FIG. 13 are described below.

Figure 34:
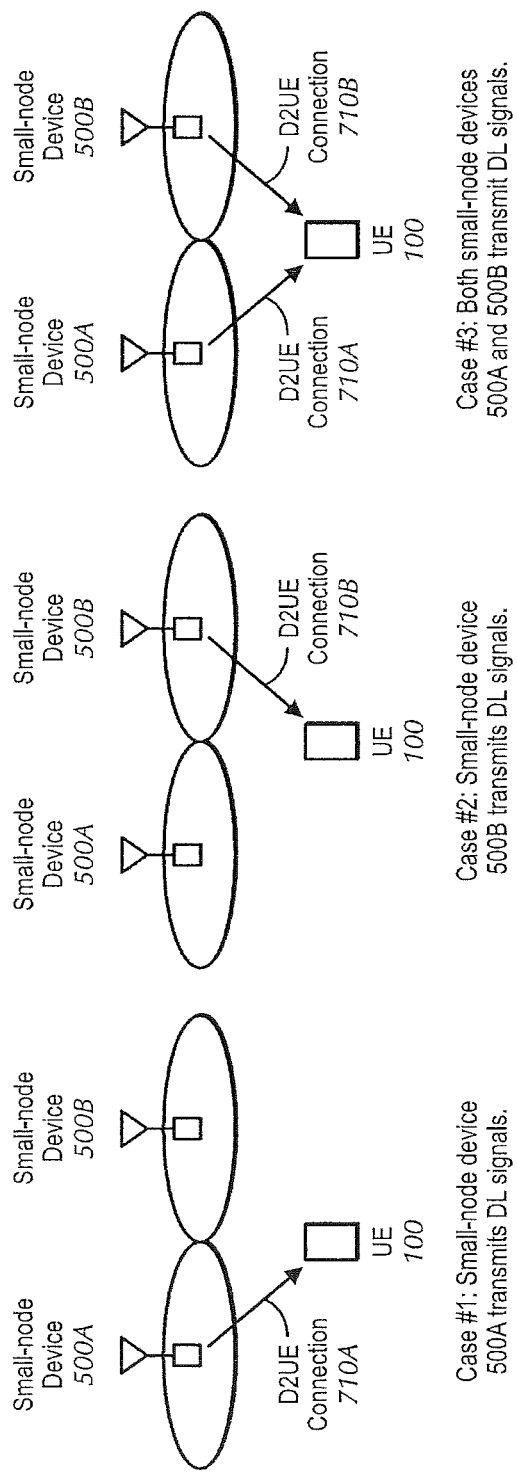
FIG. 34 is an explanatory view showing DL transmission according to one or more embodiments of the present disclosure.

FIG. 34 illustrates DL transmissions of one or more embodiments of the present disclosure with multiple D2UE connections.

In this example, according to one or more embodiments of the present disclosure, it is assumed that the user equipment 100 has multiple connections (a D2UE connection 710A and a D2UE connection 710B) with the small-node device 500A and the small-node device 500B, respectively. The number of multiple connections is two as an example in the following description and it may not be limited to two. That is, it may be more than two.

In Case #1, the small-node device 500A transmits DL signals to the user equipment 100 in the D2UE connection 710A. In Case #2, the small-node device 500B transmits DL signals to the user equipment 100 in the D2UE connection 710B. In Case #3, the small-node device 500A and the small-node device 500B transmit DL signals to the user equipment 100 simultaneously.

More specifically, the D2UE L1 communication section 504A-1 transmits the DL signals in the small-node device 500A, and the D2UE L1 communication section 504B-1 transmits the DL signals in the small-node device 500B. And, the D2UE communication section 104 receives the DL signals in the user equipment 100.

Here, the DL signals are dedicated to the user equipment 100. That is, the DL signals are signals specific to the user equipment 100. For example, according to one or more embodiments of the present disclosure, the DL signals are scrambled by a random sequence which is specific to the user equipment 100. On the other hand, the DL signals are not dedicated to the small-node device 500A or to the small-node device 500B. For example, according to one or more embodiments of the present disclosure, the DL signals are not scrambled by a random sequence which is specific to the small-node device 500A or to the small-node device 500B. In other words, the small-node device 500A and the small-node device 500B utilize the same random sequence for scrambling.

The random sequence specific to the user equipment 100 may be generated based on identification number of the user equipment 100. Alternatively, the random sequence specific to the user equipment 100 may be indicated by the base station 200A or the base station 200B. The information of the random sequence may be a part of the information of downlink physical shared channel for the D2UE connection 710.

As a result, the user equipment 100 does not need to identify which small-node device is transmitting the DL signals. That is, the user equipment does not see difference among Case #1, Case #2, and Case #3 when it receives the DL signals.

Pilot signals, which are used in channel estimation for DL signals, are also transmitted with the DL signals, and the pilot signals are scrambled similarly to the DL signals. That is, the pilot signals transmitted from each small-node device are scrambled by a random sequence which is specific to the user equipment 100. The small-node device 500A utilizes the same random sequence for scrambling the pilot signals as the small-node device 500B, in terms of the user equipment 100. The pilot signals may be called "reference signals" or "demodulation reference signal".

The D2UE MAC/RLC/PDCP communication section 504-2 selects which small-node device should transmit DL signals to the user equipment 100 in one time frame. The time frame may be the same as the sub-frame in LTE. The sub-frame in LTE corresponds to 1 msec. The time frame may be 10 msec or other values, instead of 1 msec, and may not be limited to the above examples For example, according to one or more embodiments of the present disclosure, the D2UE MAC/RLC/PDCP communication section 504-2 selects the small-node device 500A as a small-node device which should transmit DL signals to the user equipment 100, processes baseband signals of the DL signals, and transmits the baseband signals to the D2UE L1 communication section 504A-1 for a time frame. The D2UE L1 communication section 504A-1 converts the baseband signals to radio frequency signals, amplifiers the radio frequency signals and transmits them.

The D2UE MAC/RLC/PDCP communication section 504-2 selects a small-node device, which should transmit DL signals to the user equipment 100, by utilizing radio link quality of each D2UE connection. The radio link quality may be at least one of signal-to-interference, path loss, received power, transmitted power and the like. The radio link quality may be calculated by utilizing received D2UE pilot signals.

More specifically, in case the radio link quality between the user equipment 100 and the small-node device 500A is better than the one between the user equipment 100 and the small-node device 500B, the D2UE MAC/RLC/PDCP communication section 504-2 selects the small-node device 500A as shown in Case #1.

Alternatively, in case the path loss between the user equipment 100 and the small-node device 500A is larger than the one between the user equipment 100 and the small-node device 500B, the D2UE MAC/RLC/PDCP communication section 504-2 selects the small-node device 500B as shown in Case #2.

Alternatively, in case the D2UE pilot received power between the user equipment 100 and the small-node device 500A is almost the same as the one between the user equipment 100 and the small-node device 500B and it is not so large, the D2UE MAC/RLC/PDCP communication section 504-2 selects both the small-node devices 500A and small-node device 500B as shown in Case #3 so that the user equipment 100 can receive the DL signals with higher received power.

The radio link quality may be estimated by received D2UE pilot signals. Alternatively, the radio link quality may be estimated by received UL pilot signals, such as sounding reference signals.

The D2UE MAC/RLC/PDCP communication section 504-2 selects a small-node device, which should transmit DL signals to the user equipment 100, among the small-node devices which are indicated by a control signal transmitted by the base station 200. The small-node devices may be called a "small-node device group". That is, the base station 200 notifies the D2UE MAC/RLC/PDCP communication section 504-2 of identification number of each small-node device, which is included in the small-node device group, and the D2UE MAC/RLC/PDCP communication section 504-2 selects one or some of the small-node devices as the ones which actually communicate with the user equipment 100 at a time frame. The base station 200 may notify the user equipment 100 as well of the identification number of each small-node device, which is included in the small-node device group. The control signal is described later.

As a result, the best radio link quality transmission point which transmits DL signals can be selected dynamically without D2UE handovers. In other words, the best radio link quality transmission point which transmits DL signals can be selected dynamically without any RRC layer control signals.

Figure 35:
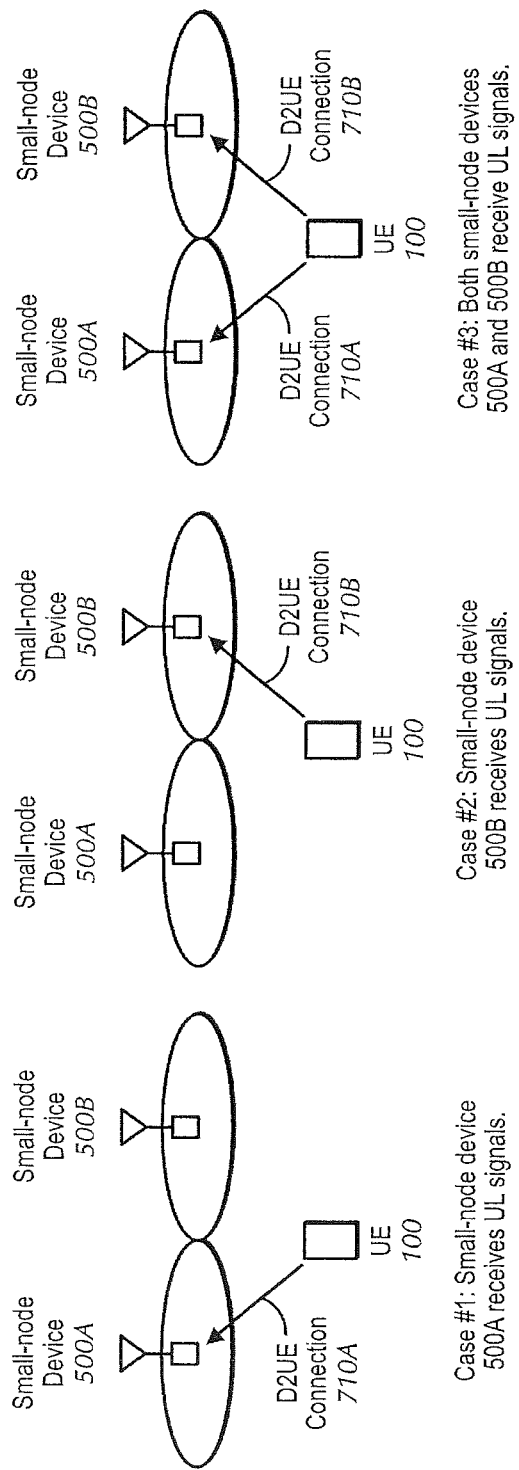
FIG. 35 is an explanatory view showing UL transmission according to one or more embodiments of the present disclosure.

FIG. 35 illustrates UL transmissions of one or more embodiments of the present disclosure with multiple D2UE connections.

In this example according to one or more embodiments of the present disclosure, it is assumed that the user equipment 100 has multiple connections (a D2UE connection 710A and a D2UE connection 710B) with the small-node device 500A and the small-node device 500B, respectively. The number of multiple connections is two as an example in the following description and it may not be limited to two. That is, it may be more than two.

In Case #1, the small-node device 500A receives UL signals transmitted by the user equipment 100 in the D2UE connection 710A. In Case #2, the small-node device 500B receives UL signals transmitted by the user equipment 100 in the D2UE connection 710B. In Case #3, the small-node device 500A and the small-node device 500B receive UL signals transmitted the user equipment 100 simultaneously.

More specifically, the D2UE L1 communication section 504A-1 receives the UL signals in the small-node device 500A, and the D2UE L1 communication section 504B-1 receives the UL signals in the small-node device 500B. And, the D2UE communication section 104 transmits the UL signals in the user equipment 100.

Here, the UL signals are dedicated to the user equipment 100. That is, the UL signals are signals specific to the user equipment 100. For example, according to one or more embodiments of the present disclosure, the UL signals are scrambled by a random sequence which is specific to the user equipment 100. On the other hand, the UL signals are not dedicated to the small-node device 500A or to the small-node device 500B. For example, according to one or more embodiments of the present disclosure, the UL signals are not scrambled by a random sequence which is specific to the small-node device 500A or to the small-node device 500B. In other words, the small-node device 500A and the small-node device 500B utilize the same random sequence for scrambling.

The random sequence specific to the user equipment 100 may be generated based on identification number of the user equipment 100. Alternatively, the random sequence specific to the user equipment 100 may be indicated by the base station 200A or the base station 200B. The information of the random sequence may be a part of the information of uplink physical shared channel for the D2UE connection 710.

As a result, the user equipment 100 does not need to identify to which small-node device it is transmitting the UL signals. That is, the user equipment does not see difference among Case #1, Case #2, and Case #3 when it transmits the UL signals.

Pilot signals, which are used in channel estimation for UL signals, are also transmitted with the UL signals, and the pilot signals are scrambled similarly to the UL signals. That is, the pilot signals transmitted from each small-node device are scrambled by a random sequence which is specific to the user equipment 100. The small-node device 500A utilizes the same random sequence for scrambling the pilot signals as the small-node device 500B, in terms of the user equipment 100. The pilot signals may be called "reference signals" or "demodulation reference signal".

The D2UE MAC/RLC/PDCP communication section 504-2 selects which small-node device should receive UL signals transmitted by the user equipment 100 in one time frame. The time frame may be the same as the sub-frame in LTE. The sub-frame in LTE corresponds to 1 msec. The time frame may be 10 msec or other values, instead of 1 msec, and may not be limited to the above examples.

For example, according to one or more embodiments of the present disclosure, the D2UE MAC/RLC/PDCP communication section 504-2 selects the small-node device 500A as a small-node device which should receive UL signals to the user equipment 100, processes baseband signals of UL grant signals for assigning the UL signals' radio resource, and transmits the baseband signals to the D2UE L1 communication section 504A-1 for a time frame. The D2UE L1 communication section 504A-1 converts the baseband signals to radio frequency signals, amplifiers the radio frequency signals and transmits them. The user equipment 100 receives the UL grant signals and transmits the UL signals by utilizing the radio resource indicated by the UL grant signals. Transmission timing of UL signals may be delayed compared to reception timing of the UL grant signals. For example, according to one or more embodiments of the present disclosure, in case the UL grant signals are received at Sub-frame #N, the UL signals may be transmitted at Sub-frame #N+4. The D2UE L1 communication section 504A-1 receives radio frequency signals of the UL signals, converts them to baseband signals, and transmits them to the D2UE MAC/RLC/PDCP communication section 504-2. The D2UE MAC/RLC/PDCP communication section 504-2 receives the baseband signals and conduct baseband processing, such as decoding, MAC layer operations, RLC layer operations, PDCP layer operations, and the like.

The D2UE MAC/RLC/PDCP communication section 504-2 selects a small-node device, which should receive UL signals transmitted by the user equipment 100, by utilizing radio link quality of each D2UE connection. The radio link quality may be at least one of signal-to-interference, path loss, received power, transmitted power and the like. The radio link quality may be calculated by utilizing received D2UE pilot signals.

More specifically, in case the radio link quality between the user equipment 100 and the small-node device 500A is better than the one between the user equipment 100 and the small-node device 500B, the D2UE MAC/RLC/PDCP communication section 504-2 selects the small-node device 500A as shown in Case #1.

Alternatively, in case the path loss between the user equipment 100 and the small-node device 500A is larger than the one between the user equipment 100 and the small-node device 500B, the D2UE MAC/RLC/PDCP communication section 504-2 selects the small-node device 500B as shown in Case #2.

Alternatively, in case the D2UE pilot received power between the user equipment 100 and the small-node device 500A is almost the same as the one between the user equipment 100 and the small-node device 500B and it is not so large, the D2UE MAC/RLC/PDCP communication section 504-2 selects both the small-node devices 500A and the small-node device 500B as shown in Case #3 so that total received power of the UL signals in the small-node devices 500A and 500B can increase.

The radio link quality may be estimated by received D2UE pilot signals. Alternatively, the radio link quality may be estimated by received UL pilot signals, such as sounding reference signals.

The D2UE MAC/RLC/PDCP communication section 504-2 selects a small-node device, which should receive UL signals to the user equipment 100, among the small-node devices which are indicated by a control signal transmitted by the base station 200. The small-node devices may be called a "small-node device group". That is, the base station 200 notifies the D2UE MAC/RLC/PDCP communication section 504-2 of identification number of each small-node device, which is included in the small-node device group, and the D2UE MAC/RLC/PDCP communication section 504-2 selects one or some of the small-node devices as the ones which actually communicate with the user equipment 100 at a time frame. The base station 200 may notify the user equipment 100 as well of the identification number of each small-node device, which is included in the small-node device group. The control signal is described later.

As a result, the best radio link quality transmission point which receives UL signals can be selected dynamically without D2UE handovers. In other words, the best radio link quality reception point which receives UL signals can be selected dynamically without any RRC layer control signals.

In the above description for UL signals, the D2UE MAC/RLC/PDCP communication section 504-2 may select a small-node device which transmits UL grant signals, instead of selecting a small-node device which receives UL signals transmitted by the user equipment.

As mentioned above, in case the user equipment 100 has D2UE connections with a lot of small-node devices, the number of control signals for D2UE handover can be reduced. In the above mentioned embodiments, the D2UE pilot signals may need to be detected not only with high radio link quality, but also with low radio link quality.

Figure 36:
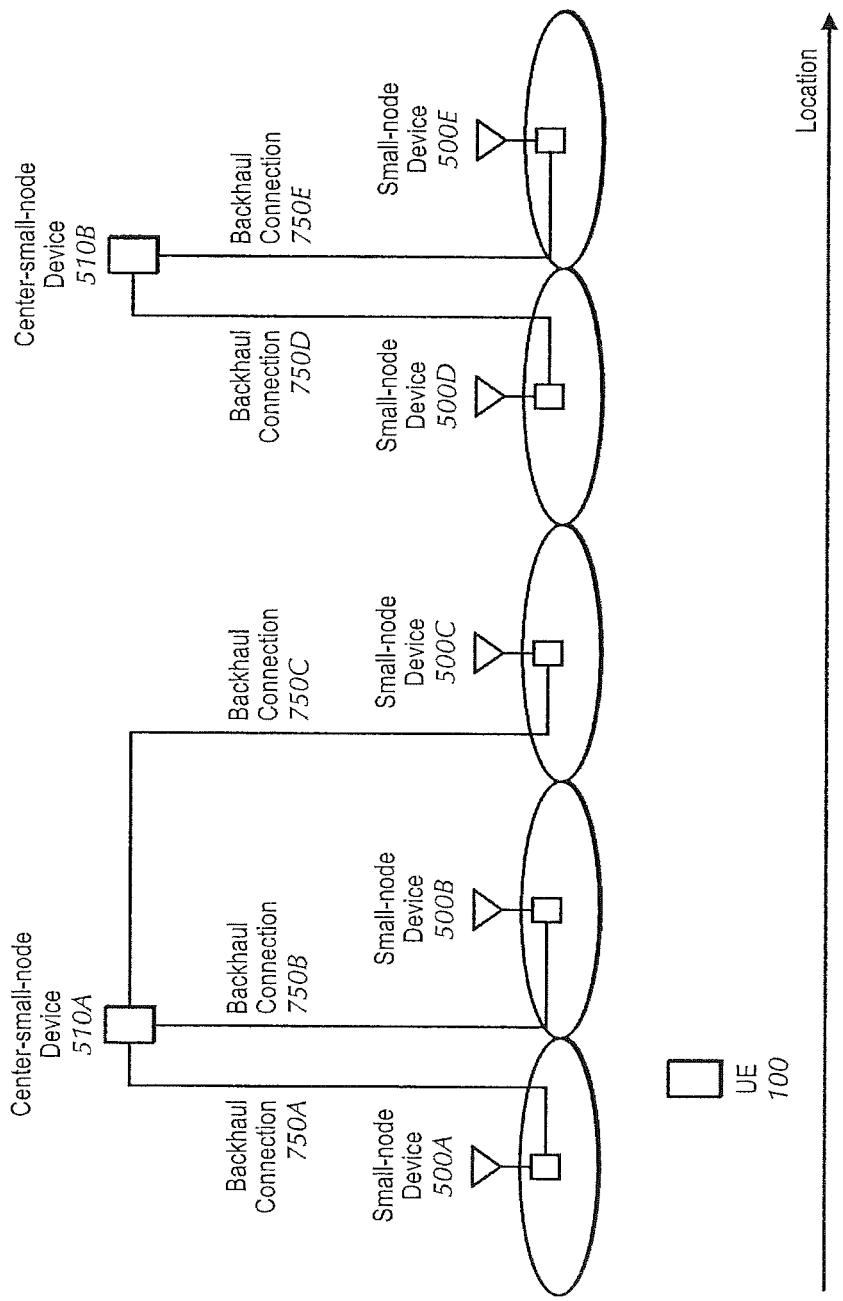
FIG. 36 is an explanatory view showing a communication system according to one or more embodiments of the present disclosure.

As illustrated in FIG. 36, there is a case where some of small-node devices are connected to one center-small-node device and others are connected to another center-small-node device. More specifically, the small-node devices 500A/500B/500C are connected to the center-small-node device 510A, and the small-node device 500D/500C are connected to the center-small-node device 510B. In this case, the user equipment 100 cannot have multiple connections with the small-node device 510C and with the small-node device 510D simultaneously, because the center-small-node device connected to the small-node device 510C is different from the one connected to the small-node device 510D.

That is, the user equipment 100 cannot always have multiple connections with all the small-node devices which are closed to the user equipment 100 in terms of radio link quality. Therefore, the user equipment 100 needs to be informed of information for small-node devices with which the user equipment 100 can have multiple D2UE connections. The information may be identification number of small-node device. Alternatively, the information may be identification number of D2UE pilot signal.

The information for small-node devices with which the user equipment 100 can have multiple D2UE connections may be regarded as the information for small-node devices with which the user equipment 100 can communicate.

In some embodiments, the base station 200 transmits to the user equipment 100 a control signal for indicating the information for small-node devices which the user equipment 100 can have multiple D2UE connections. In case illustrated in FIG. 36, for example, according to one or more embodiments of the present disclosure, the control signal notify the user equipment of the identification number of the small-node device 500A/500B/500C, which the user equipment can have multiple connections with.

More specifically, the information may be included in the control signaling of the step A804c in FIG. 14A. Alternatively, it may be included in the control signaling of the step A803a. Alternatively, the information may be included in the control signaling of the step S1005 in FIG. 16. Alternatively, it may be included in the step S1108 in FIG. 17.

Alternatively, the information for small-node devices which the user equipment 100 can have multiple D2UE connections may be transmitted to the user equipment 100 as a MAC layer control signal in the BS2UE connection 720.

Furthermore, the base station 200 may transmit the center-small-node device 510 control signals for indicating the information for small-node devices which the user equipment 100 can have multiple D2UE connections.

More specifically, the information may be included in the control signaling of the step A804a in FIG. 14A. Alternatively, it may be included in the control signaling of the step S1004 in FIG. 16. Alternatively, it may be included in the control signaling of the step S1106 in FIG. 17.

The information may be included in a control signal which is exchanged with two base stations, in case that the user equipment 100 makes a handover between the two base stations in the BS2UE connection. The control signal may be called "handover request".

In addition to the information for the small-node devices which the user equipment 100 can have multiple D2UE connections, information for the random sequence for scrambling the DL signals/UL signals may be included in the above mentioned control signaling.

Figure 37:
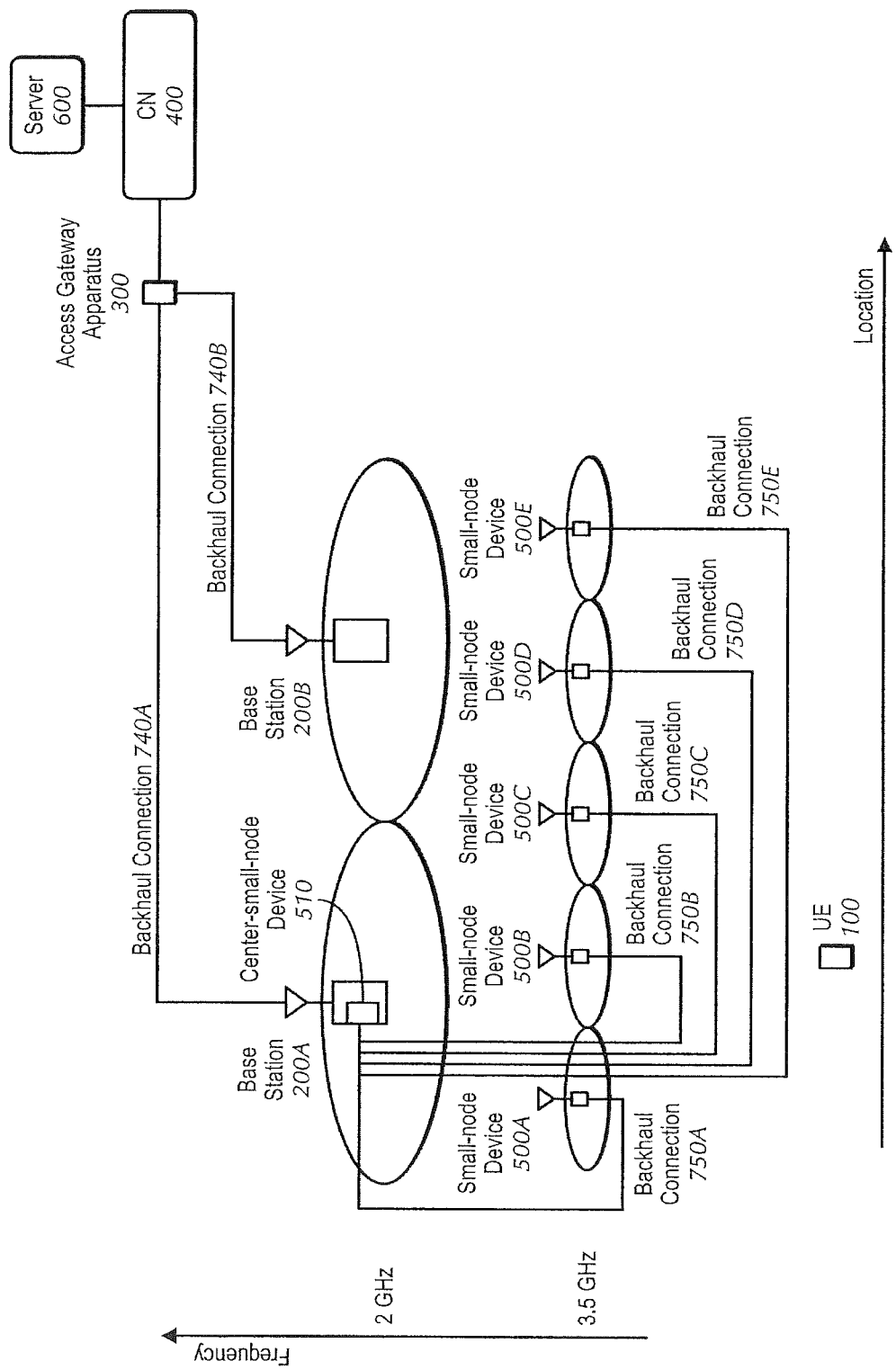
FIG. 37 is an explanatory view showing a communication system according to one or more embodiments of the present disclosure.

In some other embodiments, the center-small-node device 510 may be located in the base station 200A, as illustrated in FIG. 37. The architecture may be regarded as a mixture of FIGS. 8 and 9. In case that the base station 200A has a lot of baseband processing capability, the configuration in FIG. 37 is also feasible. The difference from the conventional carrier aggregation is that the user equipment 100 can communicate with the small-node devices, such as the small-node devices 500D/500E, when the user equipment 100 is located in the coverage area of the base station 200B, instead of the base station 200A. This is because the base station 200B and the center-small-node device do not have to have a single PDCP/RLC operation in the hybrid D2UE and BS2UE architecture and do not have to have very tight inter-working between the D2UE and BS2UE link from a physical and MAC layer point of view.

In the figure, the center-small-node device 510 is located in the base station 200A, but it is not limited to the above example. The center-small-node device 510 may be located in the base station 200B.

One of the characteristics in one or more embodiments of the present invention is a device in a mobile communication system, in which a mobile station communicates with a server, comprising a 1st communication unit for communicating with a first radio base station using a first; multiple 2nd communication units for communicating wirelessly with the mobile station using multiple second links, respectively; a buffering unit for buffering data; and a 3rd communication unit for communicating with the server using a third link; wherein the 1st communication unit exchanges with the radio base station a first control signal for establishing the multiple second links; the multiple 2nd communication units establish the multiple second links, respectively, on receiving the first control signal, the multiple 2nd communication units receive a first data in the multiple second links, respectively, which is sent by the mobile station to the server, the 3rd communication unit transmit the first data to the server in the third link, and the 3rd communication unit receives a second data which is sent by the server to the mobile station, the multiple 2nd communication unit transmit the second data to the mobile station, the buffering unit buffers the first data and the second data for the multiple 2nd communication units.

Here, the radio base station corresponds to the base station 200. The mobile station corresponds to the user equipment 100. The device corresponds to a set of the small-node devices 500A/500B and the center-small-node device 510. The first link corresponds to the BS2D connection 730. The second link corresponds to the D2UE connection 710. The third link corresponds to the backhaul connection 750.

Here, the multiple second links may be regarded as one link, because the mobile-station-specific signals are transmitted in the multiple second links as described above.

In the above mentioned device, one of the multiple 2nd communication units transmits the second data to the mobile station at a time frame. The time frame may be 1 sub-frame or 1 radio frame.

In the above mentioned device, more than one of the multiple 2nd communication units transmits the second data to the mobile station at a time frame. The time frame may be 1 sub-frame or 1 radio frame.

In the above mentioned device, the first data and the second data are scrambled by a sequence specific to the mobile station in the second links.

In the above mentioned device, identification number of each of the multiple 2nd communication units is included in the first control signal.

One of the characteristics in one or more embodiments of the present invention is a mobile station in a mobile communication system, in which a mobile station communicate with a server, comprising a 1st communication unit for communicating wirelessly with a first radio base station using a first link; and a 2nd communication unit for communicating wirelessly with multiple devices using multiple second links, respectively; wherein the 1st communication unit exchanges with the first radio base station a first control signal for establishing the multiple second links, the 2nd communication unit establishes the multiple second links on receiving the first control signal, the 2nd communication unit transmits a first user data with the final destination to the server via the multiple second links, and the 2nd communication unit receives a second user data originated from the server via the multiple second links.

Here, the radio base station corresponds to the base station 200. The mobile station corresponds to the user equipment 100. The device corresponds to the small-node device 500. The first link corresponds to the BS2UE connection 720. The second link corresponds to the D2UE connection 710.

Here, the multiple second links may be regarded as one link, because the mobile-station-specific signals are transmitted in the multiple second links as described above.

In the above mentioned mobile station, one of the devices transmits the second user data to the mobile station at a time frame.

In the above mentioned mobile station, more than one of the devices transmits the second user data to the mobile station at a time frame.

In the above mentioned mobile station, the first data and the second data are scrambled by a sequence specific to the mobile station in the multiple second links.

In the above mentioned mobile station, identification number of each of the devices is included in the first control signal.

One of the characteristics in one or more embodiments of the present invention is a radio base station in a mobile communication system, in which a mobile station communicate with a server, comprising a 1st communication unit for communicating with multiple devices using a first link; a 2nd communication unit for communicating wirelessly with a mobile station using a second link; and a control unit for determining how to configure multiple third links between the multiple devices and the mobile station, respectively; wherein the 1st communication unit exchanges with the multiple devices a first control signal for establishing the multiple third links, the 2nd communication unit exchanges with the mobile station a second control signal for establishing the multiple third links, a first data is transferred from the mobile station with the final destination to the server via the multiple third links, a second data originated from the server is transferred to the mobile station via the multiple third links, and identification number of each of the multiple devices is included in the first control signal and second control signal.

Here, a radio base station corresponds to the base station 200. A mobile station corresponds to the user equipment 100. A device corresponds to the small-node device 500. A first link corresponds to the BS2D connection 730. A second link corresponds to the BS2UE connection 720. The third link corresponds to the D2UE connection 710.

Here, the multiple third links may be regarded as one link, because the mobile-station-specific signals are transmitted in the multiple third links as described above.

The operation of the above-described base station 200, the user equipment 100 and the small-node device 500 may be implemented by a hardware, may also be implemented by a software module executed by a processor, and may further be implemented by the combination of the both.

The software module may be arranged in a storing medium of an arbitrary format such as RAM (Random Access Memory), a flash memory, ROM (Read Only Memory), EPROM (Erasable Programmable ROM), EEPROM (Electronically Erasable and Programmable ROM), a register, a hard disk, a removable disk, and CD-ROM.

Such a storing medium is connected to the processor so that the processor can write and read information into and from the storing medium. Such a storing medium may also be accumulated in the processor. Such a storing medium and processor may be arranged in an Application-Specific Integrated Circuit or ASIC. Such ASIC may be arranged in the base station apparatus 200, the user equipment, and the small-node device 500. As a discrete component, such a storing medium and processor may be arranged in the base station 200, the user equipment 100, and the small-node device 500.

Generally, according to one or more embodiments of the present disclosure, a device in a mobile communication system, in which a mobile station communicates with a server, may include, at least, a 1st communication unit for communicating with a radio base station using a first link, multiple 2nd communication units for communicating wirelessly with the mobile station using a second link, a buffering unit for buffering data, and a 3rd communication unit for communicating with the server using a third link.

Additionally, the 1st communication unit exchanges with the radio base station a first control signal for establishing the second link; the multiple 2nd communication units establish the second link on receiving the first control signal, the multiple 2nd communication units receive a first data in the second link which is sent by the mobile station to the server, the 3rd communication unit transmit the first data to the server in the third link, the 3rd communication unit receives a second data which is sent by the server to the mobile station, the multiple 2nd communication units transmit the second data to the mobile station, and the buffering unit buffers the first data and the second data for the multiple 2nd communication units.

Thus, one or more embodiments of the present invention has been explained in detail by using the above-described embodiments. However, it is obvious that for persons skilled in the art, the present invention is not limited to the embodiments explained herein. Specifically, the description of the specification is intended for explaining the example only and does not impose any limited meaning to the present invention.

ABBREVIATIONS

LTE Long Term Evolution
PHY Physical
D2UE Device to UE
Macro2UE Macro to UE
UE User equipment
NAS Non Access Stratum
RRC Radio Resource Control
TDD Time Division Duplex
FDD Frequency Division Duplex
D2D Device to Device
CN Core Network While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. In a cellular telecommunications network, a mobile station to receive offloaded data from multiple small-node devices, comprising:
   at least one macro-base-station-to-the-user-equipment (BS2UE) communication section to receive both control-plane data and first user-plane data from a base station over a wireless BS2UE communication link; and
   a small-node-device-to-the-user-equipment (D2UE) communication section to receive second user-plane data from a server through a plurality of small-node devices using a wireless D2UE communication link,
   wherein the BS2UE communication section receives a first control-plane message from the base station over the wireless BS2UE communication link,
   wherein the D2UE communication section establishes the wireless D2UE communication link responsive to the first control-plane message;
   and wherein the second user-plane data is scrambled by a sequence specific to the mobile station in the wireless D2UE communication link.

2. The mobile station of claim 1, wherein identification numbers of the plurality of small-node devices are included in a first control signal.

3. The mobile station of claim 1, wherein an identification number of the sequence is included in a first control signal.

* * * * *